United States Patent [19]

Cleveland et al.

[11] 3,872,444

[45] Mar. 18, 1975

[54] TERMINAL CONTROL UNIT

[75] Inventors: James Leonard Cleveland, Kingston; Richard Alfred Jones, Redhook; Theodore Edwin Larson, Saugerties; Kenneth Rogers McNary, Hyde Park; James Theodore Zahorsky, Saugerties, all of N.Y.

[73] Assignee: International Business Machines Corporation, Armonk, N.Y.

[22] Filed: Feb. 23, 1973

[21] Appl. No.: 335,269

[52] U.S. Cl. ........................................... 340/172.5
[51] Int. Cl. ......... G06f 3/04, G06f 3/12, G06f 3/14
[58] Field of Search ................. 340/172.5, 324 AD; 178/17.5

[56] References Cited

UNITED STATES PATENTS

| | | | |
|---|---|---|---|
| 3,274,561 | 9/1966 | Hallman | 340/172.5 |
| 3,406,380 | 10/1968 | Bradley | 340/172.5 |
| 3,413,613 | 11/1968 | Bahrs | 340/172.5 |
| 3,417,202 | 12/1968 | Kolpek | 178/31 |
| 3,525,079 | 8/1970 | Cuccio | 340/172.5 |
| 3,573,741 | 4/1971 | Gavril | 340/172.5 |
| 3,675,209 | 7/1972 | Trost | 340/172.5 |
| 3,680,054 | 7/1972 | Bunker et al. | 340/172.5 |
| 3,702,462 | 11/1972 | United Kingdom | 340/172.5 |
| 3,710,328 | 1/1973 | Hunter | 340/172.5 |
| 3,715,727 | 2/1973 | Yu | 340/172.5 |

*Primary Examiner*—Gareth D. Shaw
*Assistant Examiner*—James D. Thomas
*Attorney, Agent, or Firm*—Edwin Lester

[57] ABSTRACT

A display system having a buffered control unit for controlling a plurality of buffered terminal devices, the terminal devices being either display devices, printer devices or a combination of both. A copy operation is performed by the control unit to control the transfer of data from the buffer of one terminal device to the buffer of another terminal device attached to the control unit, the terminal device whose buffer is copied being termed the "FROM" terminal device and the terminal device that receives the copied data being termined the "TO" terminal device. The copy operation of the control unit is controlled in accordance with a copy control character which identifies the type of data to be copied and can also selectively designate, to the "TO" terminal device, a start print operation, specify the printout format and that an audible alarm is to be sounded. The "FROM" terminal device may be locked so that the data in its buffer may not be copied by providing a word in the first location of the "FROM" terminal device buffer which designates its data as protected data.

16 Claims, 30 Drawing Figures

| | | | |
|---|---|---|---|
| Fig. 4a | Fig. 4b | Fig. 4c | Fig. 4d |
| Fig. 4e | Fig. 4f | Fig. 4g | Fig. 4h |
| Fig. 4i | Fig. 4j | Fig. 4k | Fig. 4l |

| Fig.5a | Fig.5b |
|---|---|

PATENTED MAR 18 1975

3,872,444

SHEET 20 OF 25

TERMINAL CONTROL UNIT

BACKGROUND OF THE INVENTION

This invention relates to a display system for multiple terminal devices and, more particularly, to a buffered control unit for controlling the transfer of data from one buffered terminal device to another buffered terminal device attached to the same control unit.

In multi-terminal display systems in current use when it is desired to copy the data from one terminal device to another terminal device, it is necessary for the data processing system which is controlling the display system to execute a program which requires a series of transmissions between the data processor and the display system. Thus, the data processor must designate the "FROM" terminal device and issue a command to read the data from the terminal device. This information must then be transmitted over a communication link to the display system. The display system after it receives this information selects the "FROM" terminal device and when it is ready with the data must interrupt the data processor to signal that the data to be copied is ready for transmission back to the data processor. The data may then be passed over the communication link at a speed which may be slower than the operating speed of the display system and the data is then stored in the main storage of the data processing system. Following this, the data processor must now designate the "TO" terminal device and issue another command to write the data back to the designated "TO" terminal device. Once again the communication link must be invoked to transmit the data to the display system and the selected "TO" terminal device. If the data from the "FROM" terminal device is to be copied to many other terminal devices attached to the control unit of the display system, then the above sequence of operations must be performed for each copy operation. Total data transmission time may become exececssive with this type of operation and short response time may not be able to be maintained either.

SUMMARY OF THE INVENTION

In the present invention, a buffered terminal control unit is provided, responsive to a single message from a data processor, to execute an entire copy operation within the control unit and between the selected "FROM" and "TO" terminal devices. The message from the data processor includes an address character designating the address of the "TO" terminal device, a command character designating that a copy operation is to be performed, a copy control character designating the type of data to be copied to the "TO" terminal device, the format of a printout, that a print operation is to be started and that an audible alarm may be sounded at the "TO" terminal device and another address character designating the address of the FROM terminal device. The terminal devices are each connected by a single coax cable to the terminal control unit. After the terminal control unit receives the message from the data processor, a control word is composed by the control unit and serially transmitted over the coax cable to the selected "FROM" terminal device requesting that the data in the buffer of the "FROM" device be transferred back over the coax connection to the buffer of the terminal control unit. After the data is completely stored in the buffer of the terminal control unit, the first word of the device message is examined to determine whether the message is protected and may not be copied to the selected "TO" device. If it is a protected message, then the entire copy operation is aborted and this condition is signalled to the data processor. If the data is not protected, then the copy operation may proceed and the message may be modified or not in accordance with the copy control character as the message is recycled in the buffer of the terminal control unit. After the recycle operation is completed, a control work is composed by the control unit and serially transmitted over the coax connected to the selected "TO" terminal device designating that a write operation is to be performed to the selected "TO" terminal device. The control unit then serially transfers the message from the selected "FROM" device, now stored in the buffer of the terminal control unit over the coax connection to the buffer of the selected "TO" terminal device where it may be displayed if the selected "TO" terminal device is a display device. After the transfer of data has been completed, the control unit composes another control word in accordance with the information contained in the copy control character for specifying that an audible alarm is to be sounded at the display terminal device. If the selected "TO" terminal device is a printer terminal device, the control unit will also compose another control work in accordance with information contained in the copy control character for specifying the printout format, that the print operation is to be started and that an audible alarm is to be sounded. The control work is then serially transmitted over the coax connection to the selected "TO" terminal device to perform the designated functions.

Accordingly, a primary object of the invention is to provide a terminal control unit which permits data in the buffer of any terminal device attached to the control unit to be copied to the buffer of any other attached terminal device.

Another object of the invention is to provide a terminal control unit which permits a display image at a display device attached to the control unit to be copied for printout at a printer device attached to the same control unit.

A further object of the invention is to provide a terminal control unit for multi-terminal devices which minimizes data transmission time.

Still another object of the invention is to provide a terminal control unit which prevents data from being copied from one terminal device attached to the control unit to another attached terminal device when the data is protected.

Still a further object of the invention is to provide a terminal control unit which modifies data in accordance with a control character when the data is being copied from one terminal device attached to the control unit to any other attached terminal device.

Still another object of the invention is to provide a terminal control unit which permits data to be copied from the buffer of a display device attached to the control unit to the buffer of an attached printer and the printout formatted in accordance with a control character.

Still a further object of the invention is to operate a terminal control unit independently of a data processor to copy data from one attached terminal device to another attached terminal device.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 4 illustrates how FIGS. 4*a* through 4*l*, inclusive, may be placed to form a composite block diagram.

FIGS. 4*a* through 4*l*, taken together, comprise a detailed schematic diagram of the terminal control unit of the present invention.

GENERAL DESCRIPTION OF THE DISCLOSED EMBODIMENT

Figure 1:
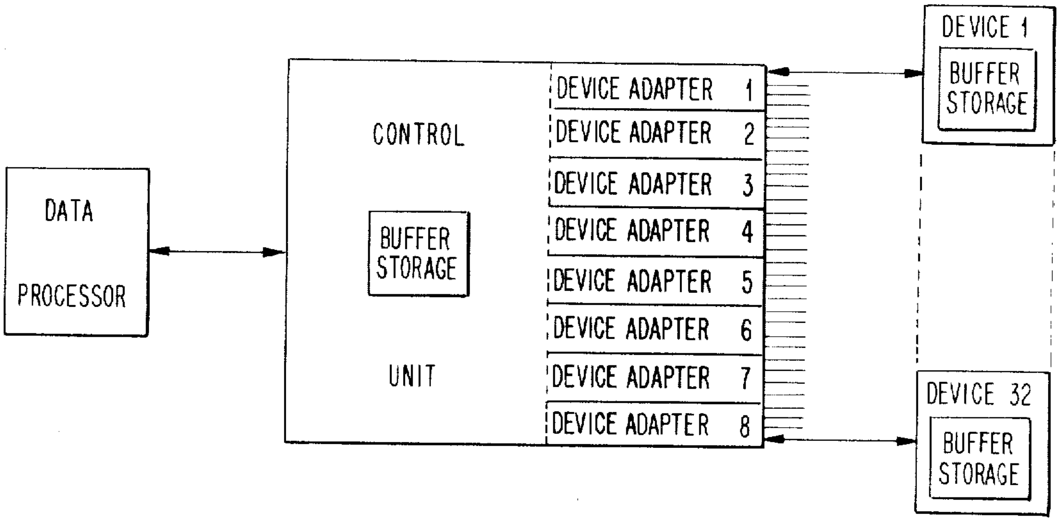
FIG. 1 is a block diagram of a display system.

FIG. 1 shows a block diagram of a display system connected to a data processor. The display system consists of a terminal control unit servicing up to 32 terminal devices, which can be display terminal devices and/or printer terminal devices. The terminal control unit includes a buffer storage which operates as a repository for data transfers between the data processor and one of the terminal devices and for data transfers between terminal devices during a copy operation. The storage capacity of the buffer storage may be of any chosen size, e.g., 480/1920 data words. Also, included in the terminal control unit are up to eight device adapters, each providing the terminal control unit with the facilities necessary to communicate with, and service up to four terminal devices.

The display type terminal device provides image display of data transmitted from the data processor or from another terminal device attached to the terminal control unit. The display terminal device also includes a buffer storage for storing data to be displayed and may also have a storage capacity of any chosen size, e.g., 480/1920 data words. Each such display terminal device is connected to the terminal control unit through a single-coaxial cable.

The printer type terminal device provides printed copy of data transmitted from the data processor or of data copied from a display terminal device. The printer terminal device also includes a buffer storage for storing data to be printed and may also have a storage capacity of any chosen size, e.g., 480/1920 data words. Each such printer terminal device is connected to the terminal control unit through a single-coaxial cable.

An audible alarm can be installed on any of the terminal devices and can be signalled to be sounded whenever called for under program control.

ATTRIBUTE WORD

The data processor can communicate with a terminal device using one of two basic methods. In one method, the data is unformatted and an operator at a display terminal device uses the displayed data in a free-form manner. In the second method, the display image is completely or partially formatted by data fields with the beginning of a field defined by a control character termed the attribute word. The attribute word defines the characteristics or attributes of the data words that follow them. Each attribute word plus all the data words following it up to but not including the next attribute word is called a field. While attribute words may be stored in the buffer storage of a terminal device they are neither displayed or printed but simply appear as a space. Attribute words have the following format and in addition to defining the start of a field also function to define the field characteristics for all data words contained in that field.

| 1 | 2 | 3 | 4 | 5 | 6 | 7 | 8 |
|---|---|---|---|---|---|---|---|
| X | X | U/P | A/N | X | X | X | X |

While the attribute may define a number of field characteristics only two indicated above are used in the present invention. Thus, bit 3 designates whether the field is an unprotected field (Bit 3=0) or a protected field (Bit 3=1) and whether the data in the field is alphanumeric (Bit 4=0) or numeric only (Bit 4=1).

COMMANDS AND ORDERS

The data processor controls the terminal control unit with a set of commands and orders. The commands may consist of the usual type of write commands, read commands, and control commands, one of the latter being a copy command which is the subject of the present invention. Orders are included in write data messages either alone or intermixed with display or print data. One type of order is executed as it is received by the terminal control unit and is used to position, define, and format data being written into the buffer storage, to erase selected unprotected data in the buffer storage or to reposition a cursor (which is a special symbol displayed beneath a character or character position at the display terminal device to indicate to an operator where the next character may be entered). Another type of order specifies printer format and is stored in the buffer storage as data and executed only when encountered in a print field of unspecified length during a printout operation. Orders of the latter type are termed the NL and EM printer orders. When a NL order is encountered in the buffer storage, the printer is caused to step to the next line for printout. When an EM order is encountered, the printing operation is terminated and none of the data following the EM order is printed.

COPY CONTROL CHARACTER

Figure 2:
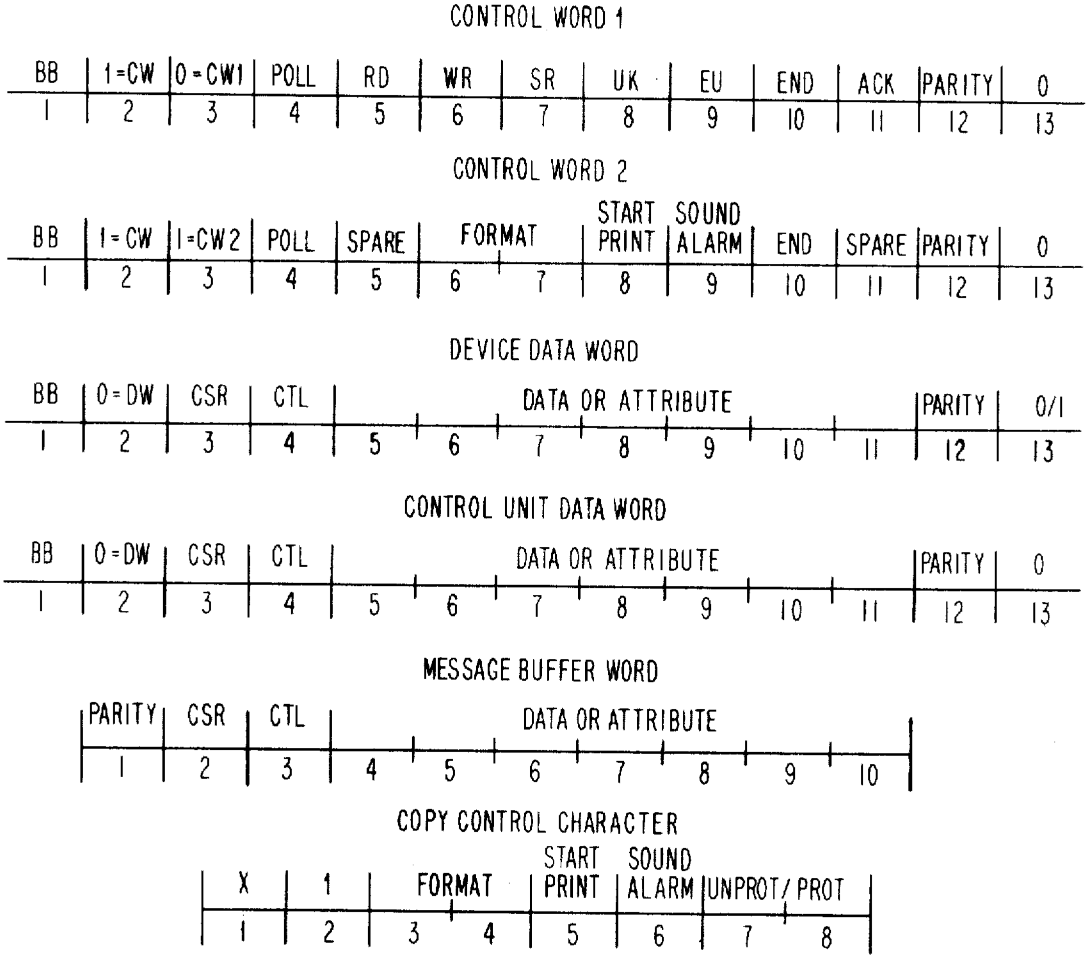
FIG. 2 is a diagram of the work formats used in the present invention.

Another type of control character used during a copy operation is one which is termed the copy control character (CCC) having a format shown in FIG. 2. The functions of each bit of the CCC used in the present invention is shown in the following Table 1.

TABLE 1

| BIT | EXPLANATION | |
|---|---|---|
| 3,4 | Defines the printout format as follows: | |
| | = 00 - | The NL and EM orders in the data field determine the print line length |
| | = 01 - | Specifies a 40 character print line length |
| | = 10 - | Specifies a 64 character print line length |
| | = 11 - | Specifies an 80 character print line length |
| 5 | = 1 - | Start Printer. Initiates a printout operation after data transfer to the selected device is completed |
| 6 | = 1 - | Sound Alarm. Signals the terminal device to sound an audible alarm after data transfer to the selected device is completed |
| 7,8 | Defines the type of data to be copied as follows: | |
| | = 00 - | Only attribute words are to be copied |
| | = 01 - | Only attribute words and unprotected alphanumeric fields are to be copied |
| | = 10 - | Only attribute words and protected alphanumeric fields are to be copied |
| | = 11 - | All fields are to be copied |

MESSAGE BUFFER WORD

A data word stored in the storage buffer of the terminal control unit is termed a message buffer word and has a format as shown in FIG. 2. The function of each bit of the message buffer word is shown in the following Table 2:

TABLE 2

| BIT | EXPLANATION |
|---|---|
| 1 | Odd Parity, assigned by the terminal control unit and taken over bits 3-10 |
| 2 | = 1 - Cursor Position |
| 3 | = 0 - Data Word |
| | = 1 - Attribute Word |
| 4-10 | - Data bits if a data word |
| | - Attribute bits if an attribute word |

CONTROL UNIT DATA WORD

Data words are transmitted serially by bit from the terminal control unit to the selected terminal device as thirteen bit data words and each such word is termed a control unit data word having a format shown in FIG. 2. The first bit is termed a busy bit and is always a 1 bit to indicate the 1st bit of a transmitted word. Bit 2 replaces the parity bit and is always a 0 bit to indicate that the work is a data word rather than a control word. Bits 4–11 are identical to that of the message words. As the first eleven bits of the control unit data word are serially transmitted to the selected terminal device, a parity bit is generated and transmitted as bit 12 of the control unit data word. Bit 13 is always transmitted as a 0 bit.

DEVICE DATA WORD

Data words are received serially by bit in the terminal control unit from a selected terminal device as thirteen bit data words and each such word is termed a device data word having a format shown in FIG. 2. The format is identical to that of the control unit data word except for bit 13 which may be a 0 or 1 bit to indicate the capacity of the storage buffer in the terminal device, i.e., 0=480 words and 1=1920 words.

CONTROL WORD

Control words containing control information are transmitted serially by bit from the terminal control unit to the selected terminal device as thirteen bit control words for signalling the terminal device to perform specified operations. These are two types of control words that are transmitted having a format shown in FIG. 2. Bit 2 of these words contain a 1 bit to indicate that it is a control word rather than a data word. Bit 3 in control word 1 is a 0 bit to identify it as the control word 1 while bit 3 in control word 2 is a 1 bit to identify it as the control word 2. The function of various ones of these bits used in the present invention will be described hereinafter.

Figure 3:
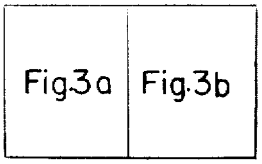
FIG. 3 illustrates how FIGS. 3*a* and 3*b* may be placed to form a composite block diagram.
Figure 3A:
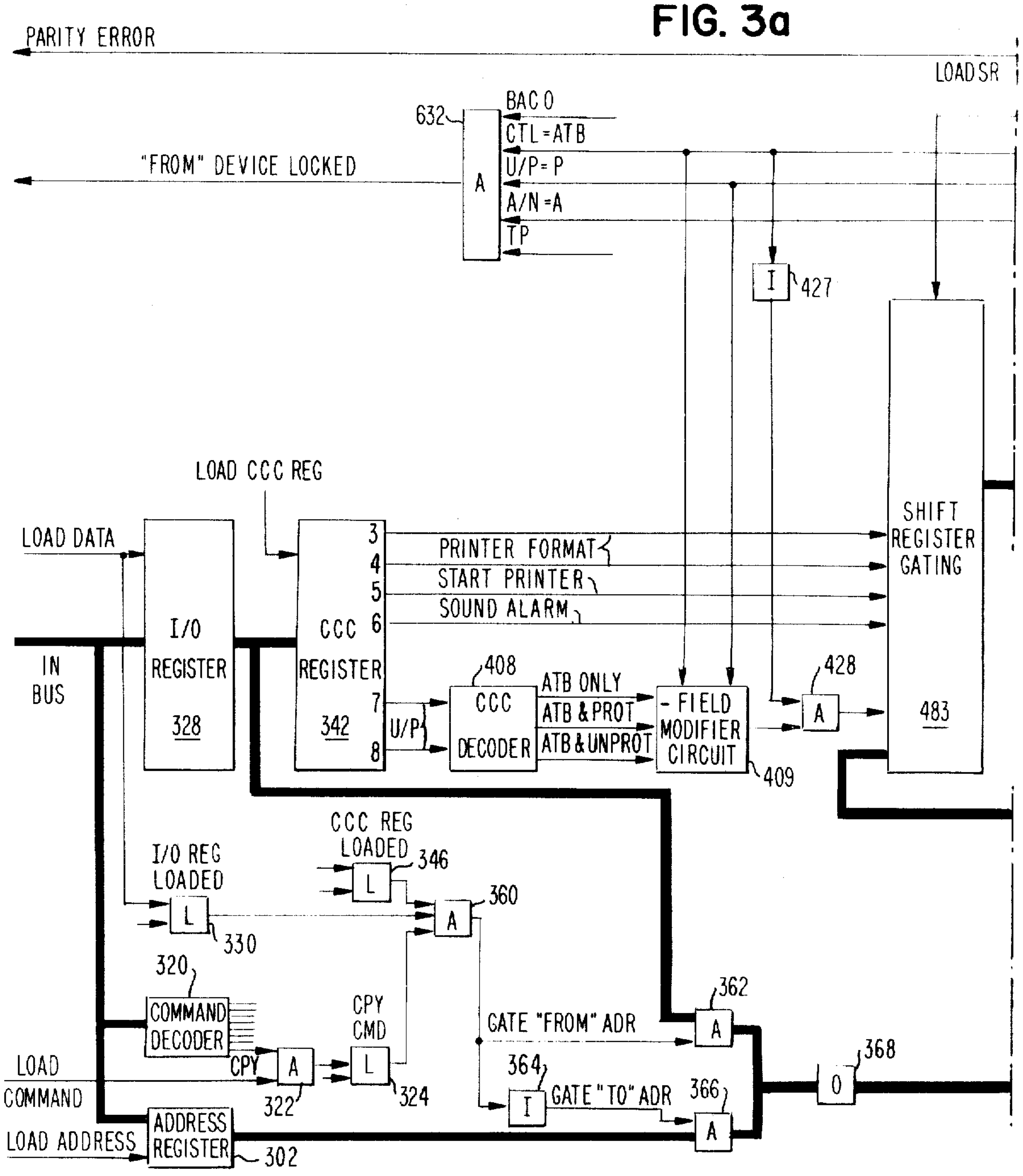
FIGS. 3*a* and 3*b*, taken together, comprise a block diagram of the terminal control unit of the present invention.

Referring now to FIG. 3*a* taken together with FIG. 3*b*, there is shown a general block diagram of the terminal control unit constituting the present invention and will be described to provide a general understanding of the operation of the unit when performing a copy operation. Not all of the details of the terminal control unit are shown in this diagram in order to simplify the explanation of the operation of the control unit. However, all of the details are shown in FIGS. 4*a*–4*l* and a more detailed description will follow taken in connection with the timing diagrams of FIGS. 5*a*–5*b*, 6*a*–6*b* and 7*a*–7*e*.

The copy operation performed by the terminal control unit controls the transfer of data from the storage buffer of one terminal device to the storage buffer of another terminal device attached to the control unit, the copy operation being controlled in accordance with a copy control character. The terminal control unit is stepped through six sequences of operation in order to complete the entire operation. The functions performed in each of these sequences are briefly described as follows:

Sequence 0 — Receive Copy Message from Data Processor
Sequence 1 — Transmit Read Poll (CW1) to "FROM" Device
Sequence 2 — Receive "FROM" Device Data Words
Sequence 3 — Recycle Storage Buffer per CCC
Sequence 4 — Transmit Write Poll (CW1) to "TO" Device
Sequence 5 — Transmit "FROM" Device Data Words per CCC to "TO" Device
Sequence 6 — Transmit CW2 per CCC to "TO" Device

SEQUENCE 0

Figure 3B:
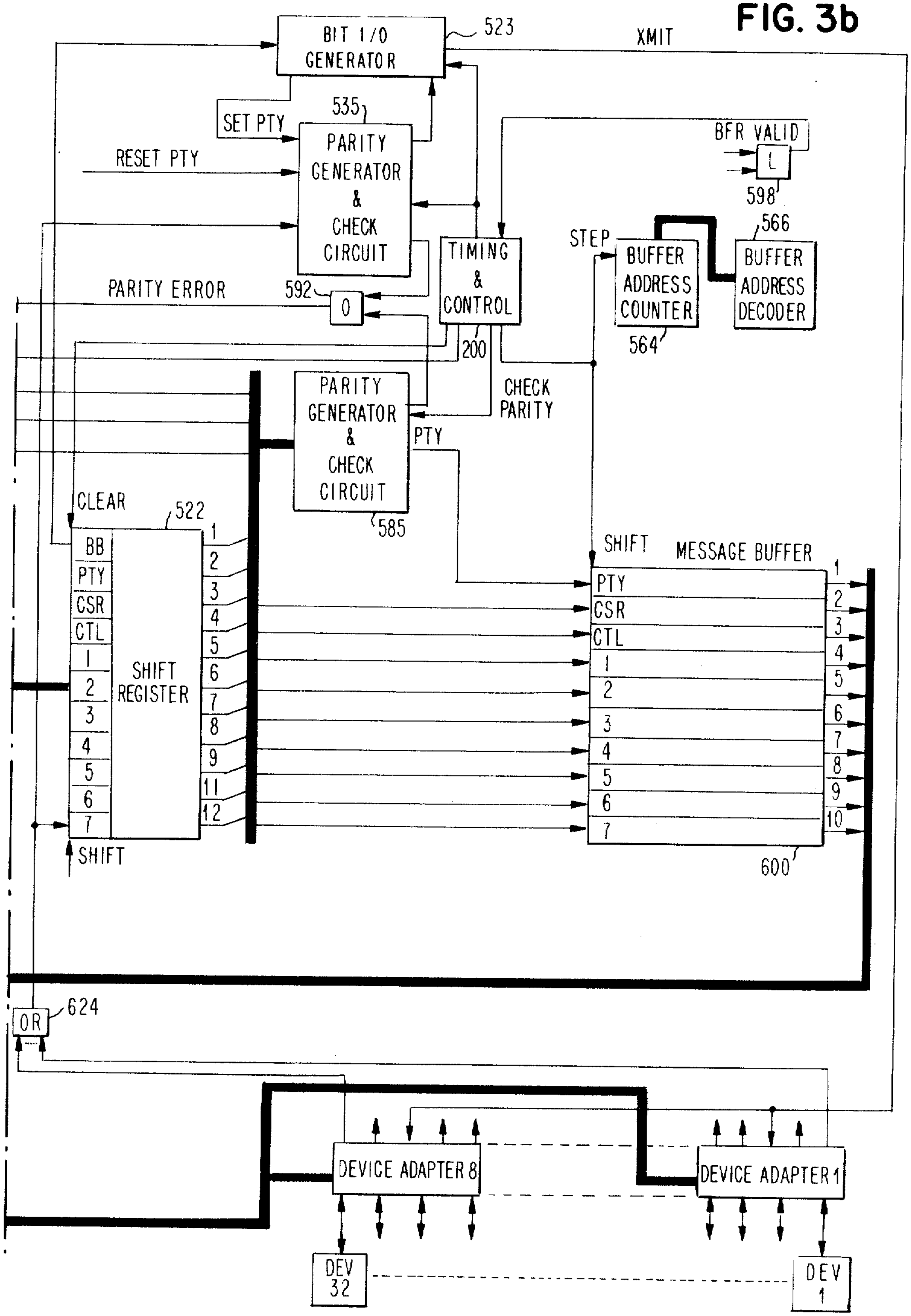

Referring now to FIGS. 3*a* and 3*b*, the "TO" address is received on the In Bus after which a positive pulse is received on the Load Address line to load the "TO" address into the address register 302. The Copy Command is next received on the In Bus and is decoded by the command decoder 320 causing a positive signal to be applied via the copy line to condition the AND circuit 322. A positive pulse is then received on the Load Command line and passed via the now conditioned AND circuit 322 to turn on the Copy Command latch 324 indicating that the Copy Command has been received and causing a positive signal to be applied to one input of the AND circuit 360. The Copy Control character is next received on the In Bus after which a positive pulse is received on the Load Data line to load the CCC into the I/O Register 328 and turn on the I/O Register Loaded latch 330. The I/O Register Loaded latch 330 in being turned on indicates that data has been stored in the I/O Register 328.

Circuits (not shown) detect that the Copy Command latch 324 and I/O Register Loaded latch 330 have been turned on and that the CCC Register Loaded latch 346 has not been turned on to cause, at the proper time, a positive pulse to be applied to the Load CCC Register line causing the CCC now in the I/O register 328 to be transferred to the CCC Register 342. A positive pulse is then applied to turn on the CCC Register Loaded latch 346 which in being turned on indicates that the CCC has been loaded into the CCC Register 342 and causing a positive signal to be applied to a second input of the AND circuit 360. The I/O Register 328 and I/O Register Loaded latch 330 are then reset in preparation for receiving the next data word on the In Bus which is the "FROM" address. A positive pulse is again received on the Load Data line to load the "FROM" address into the I/O Register 328 and to turn on the I/O Register Loaded latch 330. The I/O Register Loaded latch 330 in being turned on indicates that the "FROM" address has been stored in the I/O Register 328 and causes a positive signal to be applied to the remaining input of the AND circuit 360. The AND circuit 360 is now effective to apply a positive signal via the Gate "FROM" address line to condition the AND circuits 362 and via inverter 364 to apply a negative signal via the Gate "TO" address line to decondition the AND circuits 366. Accordingly, the "TO" address presently stored in the address register 302 is blocked from being transferred to the device adapters while the "FROM" address presently stored in the I/O register 328 is effectively passed via the AND circuit 362, the OR circuit 368 and the device address bus to address decoders in the device adapters to uniquely select one of the 32 terminal devices as the "TO" device which the terminal control unit is to communicate with.

SEQUENCE 1

In the sequence 1 operation the control unit is switched to a transmit mode of operation and creates a 13 bit read poll control word (CW1) which is serially transferred from the control unit to the selected "FROM" device to signal the device to transfer the contents of its buffer storage back to the control unit.

At the proper time, the timing and control 200 applies a positive pulse to the clear input of the shift register 522 clearing all stages of the shift register in preparation for creating the read poll control word, the shift register 522 being a serializer/deserializer type of shift register having 11 stages as indicated at the output thereof. Circuits (not shown) are now effective to set a 1 bit into stages 1, 2 and 5 of the shift register 522. Referring to the format of control word 1 in FIG. 2, it will be noted that a 1 bit in the first position indicates the presence of a busy bit, the 1 bit in the second position indicates that the word being created is a control word and the 1 bit in the 5th position indicates that the control word is a read poll word. The Bit I/O generator 532 detects the presence of a 1 bit in the busy bit position of the shift register 522 and generates a 1 bit on the transmit line which is applied via the appropriately conditioned device adapter and the coax cable to the selected "FROM" device. The Bit I/O generator 523 also applies a positive signal on the set parity line to initiate a word parity bit as the control word is serially transmitted to the selected "FROM" device. A positive pulse is then applied to the shift input of the shift register 522 to cause the contents of the shift register to be shifted 1 position. After the shift has occurred, a 1 bit is inserted into the 11th stage of the shift register and will later be used to provide an indication when the contents of the shift register has been completely shifted out and is effectively empty. Thus, 10 shift pulses after the occurrence of the first pulse, the 1 bit which is presently inserted in the 11th stage will appear in the first stage of the shift register 522 and all other stages will contain 0 bits. This condition will be used to advance the operation of the sequence and inhibit further production of shift pulses to the shift register 522. Thus, in a manner previously described as each shift pulse is applied to the shift register 522, the contents of the first stage is sampled by the Bit I/O generator 523 to transmit a 1 bit or a 0 bit via the transmit line and the appropriately conditioned device adapter to the selected "FROM" device and to continue creation of the work parity bit. At the time of the 12th bit, the timing and control 200 signals the parity generator 535 to pass the parity bit to the Bit I/O generator 523 to transmit the generated word parity bit via the transmit line and the appropriate device adapter to the selected "FROM" device. At the 13th bit time, the timing and control 200 signals the Bit I/O generator 523 to transmit a 0 bit as the 13th bit via the transmit line and the appropriate device adapter to the selected "FROM" device to complete the transmission of the 13 bit read poll control word. At the end of this sequence, the timing and control 200 applies a positive pulse to the clear input of the shift register 522 to clear the contents of the shift register and to reset the parity generator 535. The control unit now switches to a receive mode and awaits reception of the contents of the buffer storage of the selected "FROM" device. The selected "FROM" device receives the 13 bit read poll control word (CW1), decodes this word to detect that it is a control word and that a read poll operation is being requested. At the proper time, the selected "FROM" device begins transmitting the data word contents of its buffer storage to the control unit. The data words are transmitted as 13 bit device data words having a format as shown in FIG. 2 in a serial-by-word, serial-by-bit fashion over the coax line connected to the control unit. The control unit also resets the Buffer Address Counter to a count of 0.

SEQUENCE 2

In this sequence of operation, the control unit receives the entire contents of the buffer storage of the selected "FROM" device in a serial-by-word, serial-by-bit fashion. The device message is passed from the selected "FROM" device over the coax connection and the appropriately conditioned device adapter and OR circuit 624 to the 11th stage of the shift register 522. The first 11 bits of each data word are shifted into the shift register 522 and are also effectively applied to the parity generator 535 for generating a word parity bit over these 11 bits which is then compared with the 12th bit, the parity bit being transmitted from the selected "FROM" device to determine whether a parity error has occurred for the data word received from the selected "FROM" device. If an error is detected, the parity generator and check circuit 535 applies a positive signal via the OR circuit 592 and the parity error line to signal the occurrence of the parity error. If no parity error is detected, then operation of the terminal control unit proceeds to cause the device data word preesently stored in the shift register 522 to be shifted into the message buffer 600 as a message buffer word.

The message buffer 600 is a buffer storage which may consist of FET dynamic shift registers which circulate the stored data in a closed loop which includes the shift register gating circuits 483 and the shift register 522. The buffer address counter 564 is synchronized with the buffer storage circulation loop and identifies storage addresses by successive counts which are decoded by the buffer address decoder 566 to produce positive signal outputs when the buffer address counter 564 steps to specified counts. While the capacity of the message buffer 600 may be chosen to be any size, let it be assumed, for illustrative purposes, that the capacity of the message buffer 600 is 480 data words with each buffer position containing 10 bits as indicated at the output thereof.

A memory cycle is next taken during the timing and control 200 applies a shift pulse to cause the 3rd–11th bits of the device data word in shift register 522 and the generated word parity bit from the parity generator and check circuit 585 to be shifted into the 1st word position of the message buffer 600. As the message buffer 600 is shifted to cause the first message buffer word to be shifted into the 1st word position, a message buffer word is also made available at the output of the buffer and applied to the shift register gating circuit 483. The positive pulse output of the timing and control 300 is also effectively applied to step the buffer address counter 564 to a count of 1. Following this, the timing and control 200 applies a positive pulse to the clear input line of the shift register 522 to clear the contents of the shift register. The timing and control 200 then applies a positive pulse via the load SR line to the shift register gating circuit 483 to cause the message buffer word read out of the message buffer 600 to be loaded into the shift register 522. This word will be replaced by the next device data word received from the selected "FROM" device which will then be shifted into the 2nd word position in the message buffer 600. Accordingly, the timing and control 200 again applies a positive pulse to the clear input of the shift register 522 effectively clearing the old message buffer word out of the shift register in preparation for receiving the 2nd device data word from the selected "FROM" device. In a similar manner, each successive device data word received from the selected "FROM" device is received serially-by-bit into the shift register 522 and parity checked to determine if there is a parity error after which it is shifted into the message buffer 600 as a message buffer word and the buffer address counter is stepped to the next count. During the last memory cycle, the timing and control 200 again applies a positive pulse to the shift input line of the message buffer 600 causing the 480th message buffer word to be shifted into the buffer while the first message buffer word of the selected "FROM" device message now appears at the output of the buffer and is applied to the shift register gating circuits 483. The positive pulse is also effectively applied to step the buffer address counter 564 from a count of 479 back to a count of 0 indicating that 480 message buffer words have been shifted into the message buffer 600. The timing and control 200 again applies a positive pulse to the clear input line of the shift register line 522 to clear the 480th device data word out of the register in preparation for receiving the first message buffer word presently in the input of the shift register gating circuits 483. At the appropriate time, timing and control 200 then applies a positive pulse to the load SR line to cause the 1st message buffer word to be gated via the shift register gating circuit 483 into the shift register 522.

Assuming that the entire message from the selected "FROM" device has been shifted into the message buffer 600 without detecting any parity errors, then when the buffer address counter 564 steps back to a count of 0, the buffer valid latch 598 is turned on to apply a positive signal to the timing and control 200 to indicate the buffer valid condition. At this time, since the message buffer has been validly loaded, the I/O register loaded latch 330 is reset since the "FROM" address will no longer be needed. Also, at this time, since the 1st message buffer word of the selected "FROM" device message is presently stored in the shift register 522, a parity check is made to determine whether a parity error occurred while this word was being shifted through the message buffer 600 and the shift register gating circuit 483 into the shift register 522. Accordingly, parity generator and check circuit 585 samples stages 4–11 of the shift register 522 to generate a parity bit which is now compared with the parity bit in stage 2 to determine whether a parity error has occurred. The timing and control 200 applies a positive pulse via the check parity line to the parity generator and check circuit 585 to check whether a parity error has occurred. If a parity error has occurred, the parity generator and check circuit 585 passes the positive pulse on the check parity line via the OR circuit 592 to the parity error line to signal the occurrence of the parity error.

Referring now to the Field Modifier circuit 409, let it be assumed that the device message is a formatted message such that the 1st message buffer word presently in the shift register 522 is an attribute word. Accordingly, a positive signal from the 4th stage of the shift register, indicating the presence of the attribute word, is applied to the Field Modifier circuit 409 and, at the proper time, is effective to reset the circuit in preparation for modifying the field associated with the present attribute word in accordance with bits 7 and 8 of the CCC presently stored in the CCC register 452. The combination of these bits indicate the type of data that is to be transferred to the selected "TO" device. Thus, if bits 7, 8 of the CCC are equal to 0, 0 then the CC decoder 408 decodes this condition to apply a positive signal via the ATB ONLY line to the field modifier circuit 409 indicating that all protected or unprotected fields are to be changed to null words so that only attribute words will effectively be copied to the selected "TO" device. If bits 7, 8 of the CCC are equal to 0, 1 then the CCC decoder 408 decodes this condition to apply a positive signal via the ATB & UNPROT line to the field modifier circuit 409 to indicate that only protected fields are to be modified to null words so that only attribute words and unprotected alphanumeric fields will be effectively copied to the selected "TO" device. If bits 7, 8 of the CCC are equal to 1, 0 this condition is detected by the CCC decoder 408 which applies a positive signal via the ATB & PROT line to the Field Modifier circuit 409 to indicate that only unprotected fields are to be modified to null words so that only attribute words and protected alphanumeric fields will effectively be copied to the selected "TO" device. If bits 7, 8 of the CCC are equal to 1, 1 then this condition is detected by the CCC decoder 408 and no positive signals are applied to the Field Modifier circuit 409 which remains in a reset condition to indicate that the entire contents of the message buffer is to be copied to the selected "TO" device. Thus, assuming that the first message buffer word presently stored in the shift register 522 is an attribute word which will be indicated by a 1 bit in the 4th stage of the register which condition is applied to the Field Modifier circuit 409. Whether the field is defined as an unprotected field or protected field is indicated by a 0 bit or 1 bit, respectively, in the 5th stage of the shift register which condition is also applied to the Field Modifier circuit 409. Accordingly, the field modifier circuit 409 in response to the signals or absence of signals from the CCC decoder 408 and the type of field specified by the attribute word, a positive signal or not will be maintained from the field modifier circuit 409 to the AND circuit 428. Thus, for example, if the CCC decoder 408 applies a positive signal via the ATB & PROT line, to the field modifier circuit 409, and the 5th stage of the shift register 522 indicates the field as being an unprotected field, then a positive signal will be applied from the field modifier circuit 409 to the AND circuit 428. On the other hand, if the 5th stage of the shift register indicates the field as being a protected field, then this condition is applied to the Field Modifier circuit 409 to inhibit producing a positive signal to the AND circuit 428. The output condition of the Field Modifier circuit 409 will be maintained during the entire period of the field up until the next attribute word is stored in the shift register 522. The positive signal from the 4th stage indicating that the attribute word is presently stored in the shift register 522 is applied to the inverter 427 where it is inverted to a negative signal to block the AND circuit 428 at this time. However, when successive words of the field are gated into the shift register 522, they will be indicated as being data words rather than attribute words and negative signals will be applied from the 3rd stage of the shift register 522 to the inverter 427 where they will be inverted to positive signals to render the AND circuit 428 effective to apply positive signals to the shift register gating circuit 483. Accordingly, as each message buffer data word of the field is successively stored in the shift register 522, the output condition of the AND circuit 428 is detected and if a positive signal is being applied, then the shift register gating circuits 483 effectively modify the message buffer word to a null word by inserting all 0 bits in the message buffer word positions except for the cursor position. However, if a negative output signal is detected from the AND circuit 428, no modification is made of the message buffer data words for this field.

SEQUENCE 3

At the beginning of the sequence 3 operation, the first message word presently stored in the shift register 522 is checked to determined whether the device message that was transmitted from the "FROM" device is a protected message, i.e., one which cannot be copied to another device. This is accomplished by examining the first message buffer word presently stored in the shift register 522 and determining whether it is an attribute word and if it is, whether it designates the message as a protected alphanumeric message or not as indicated by the conditions of stages 5 and 6 of the shift register 522. Thus, referring to the AND circuit 632, a positive signal on the BAC 0 line indicates that the buffer address counter is at a count of 0 and that the first word of a device message is presently stored in the shift register 522. Also, a positive signal on the CTL line indicates that the message buffer word in the shift register is an attribute word, a positive signal on the U/P line indicates that this is a protected message, and a positive signal on the A/N line indicates that the message contains alphanumeric data, the combination of these positive signals being effective to condition the AND circuit 632. The timing and control 200 applies a timing pulse which passes via the now conditioned AND circuit 632 to signal that the "FROM" device is locked and the device message may not be copied to the selected "TO" device. The data processor is signalled to indicate this condition and the operation of the terminal control unit is immediately aborted. If the message is not a protected alphanumeric message, then the contents of the message buffer 600 is recycled through the shift register gating circuit 483 and the shift register 522 where it may be altered or not in accordance with the CCC presently stored in the CCC register 342 in a manner as previously described. Thus, successive memory cycles are taken during which the message buffer word presently stored in the shift register 522 is shifted back into the message buffer 600 and the buffer address counter is stepped to the next count and the next message buffer word is made available at the output of the message buffer and applied to the shift register gating circuits 483. The timing and control 200 then applies a positive pulse to the clear input line of the shift register to clear the contents of the register after which the timing and control 200 next applies a positive pulse via the load SR line to the shift register gating circuit 483 to cause the next message buffer word to be loaded into the shift register 522. The parity generator and check circuit 583 generates a word parity bit over positions 4–11 of the message buffer word and compares it with the parity bit in the second stage to determine if there is a parity error. The timing and control 200 applies a positive pulse via the check parity line to the parity generator and check circuit 585 to detect whether a parity error had occurred and if so, the pulse is passed via the OR circuit 592 to signal a parity error. Assuming no parity error had been detected, the condition of the AND circuit 428 is now sampled and the message buffer word presently in the shift register 522 is modified or not in accordance with the signal being applied from the AND circuit 428. Each memory cycle operation performs the same sequence and thereby recycles the entire device message through the message buffer 600.

SEQUENCE 4

In the sequence 4 operation, the terminal control unit is switched back to a transmit mode of operation and a 13 bit write poll control word (CW1) is created in a similar manner to that in which the read poll control word was created during sequence 1 except that stage 6 of the shift register 522 has a 1 bit inserted to indicate a write poll rather than a read poll control word. At the time the Buffer Valid latch 598 was turned on, in a manner as previously described, the I/O reg loaded latch 330 was reset causing a negative signal to be applied to decondition the AND circuit 360. Consequently, the AND circuit 360, in turn, applies a negative signal via the GATE "FROM" ADR line to decondition the AND circuit 362 and to the inverter 364 where it is inverted to a positive signal and applied via the GATE "TO" ADR line to condition the AND circuit 366. Thus, the "FROM" address presently stored in the I/O register 328 is blocked from passing via the AND circuit 362 while the "TO" device address presently stored in the address register 302 is passed via the now conditioned AND circuits 366 and the OR circuit 368 to the device adapter where the address is decoded and the connections to the selected "TO" device are enabled to permit transmission between the terminal control unit and the coax cable connected to the selected "TO" device. The 13 bit write poll control word is transferred serial-by-bit from the terminal control unit to the now selected "TO" device in a similar manner to that described for the transmission of the read poll control word. The selected "TO" device upon receiving the write poll control word detects that it is a control word and that a write operation is to be performed. Accordingly, the device switches to the receive mode of operation and prepares to receive the message to be transmitted from the control unit message buffer.

SEQUENCE 5

In the sequence 5 operation, the terminal control unit cycles the message buffer 600 to one word at a time to the shift register 522 where the word is shifted serial-by-bit to the selected "TO" device as a 13 bit control unit data word. This is accomplished by inserting a 1 bit in the busy bit position of the shift register 522, inserting a 0 bit in the second stage of the shift register 522 to designate the word as a data word rather than a control word, and gating the message buffer word from the message buffer 600 into stages 3–11 of the shift register. As the shift register 522 is shifted one position, a 1 bit is entered into the 11th stage of the shift register which will subsequently be used to detect the fact that the 11 bits of the control unit data word has been transferred to the selected "TO" device in a manner as previously described. The parity generator and check circuit 535 keeps track of the number of 1 bits transmitted to the selected "TO" device, in a similar manner to that previously described with respect to the sequence 1 operation, so that at bit 13 time, the proper parity bit is transmitted from the terminal control unit to the selected "TO" device. An additional operation which occurs during this sequence is to cause each successive message buffer word that is transmitted as a control unit data word to the selected "TO" device to be reloaded back into the control unit message buffer 600 so that a copy of the "FROM" device message is being maintained in the control unit message buffer 600. Thus, while the parity bit of a control word unit data word is being transmitted from the control unit to the selected "TO" device, the message buffer word which has just been transmitted as a control unit data word is still maintained at the output of the message buffer 600. Accordingly, the timing and control 200 applies a positive pulse via the load SR line to cause the message buffer word to be gated back into the shift register 522. Following this, a memory cycle is taken during which the timing and control 200 applies a positive pulse to the shift input line of the message buffer 600 causing the message buffer word now reloaded into the shift register 522 to be shifted into the message buffer 600 and the next message buffer word to appear at the output of the message buffer. The positive pulse from the timing and control 200 is also applied to effectively step the buffer address counter 564. Following this, the timing and control 200 applies a positive pulse to the clear input line of the shift reigster 522 clearing the contents of the shift register in preparation for receiving the next message word. The timing and control 200 then applies a positive pulse via the load SR line to the shift register gating circuits 483 to gate the next message buffer word into the shift register in preparation for transmission to the selected "TO" device. In a similar fashion, each successive message buffer word read out of the message buffer 600 is gated into the shift register 522 and a busy bit and data word identifier bit is loaded into the 1st and 2nd stages of the shift register 522 prior to its transmission to the selected "TO" device. The now created control unit data word is then transmitted to the selected "TO" device after which the message buffer word is reloaded into the shift register 522 from the output of the message buffer 600 and then shifted back into the message buffer making the next successive message buffer word to be transmitted to the selected "TO" device available at the output thereof.

SEQUENCE 6

In the sequence 6 operation, the terminal control unit creates a 13 bit control word (CW2) in accordance with bits 3, 4, 5 and 6 of the CCC presently stored in the CCC register 342 and transmits the control word to the selected "TO" device. If transmitted to a printer device, it may designate the format of the printout, i.e., a 40 character print line, a 60 character print line or an 80 character print line and initiate the printout operation. If the control word is transmitted to a display device which contains an audible alarm, then the control word may be used to initiate the operation of the alarm to signal the operator that the copy operation has been completed.

Thus, at the beginning of this sequence, 1 bits are inserted in stages 1, 2, 3 and 10 of the shift register 522, the 1 bit in the first stage indicating the presence of a busy bit, the 1 bit in the 2nd stage indicating the presence of a control word, the 1 bit in the 3rd stage indicating that it is a control word 2 and a 1 bit in the 10th bit indicating that this is an end operation. At the proper time, the shift register gating circuits 483 are rendered effective to pass the bits 3, 4, 5 and 6 of the CCC into stages 6, 7, 8 and 9 of the shift register 522 thereby completing the creation of the control word 2 to be transmitted to the selected "TO" device. Following this, the control word is transmitted serial-by-bit to the selected "TO" device, in a manner previously described for transmitting all 13 bit words, followed by a generated word parity bit for the 12th bit of the control word and then followed by a 0 bit as the 13th bit of the control word. The selected "TO" device receives this control word and detects that it is a control word and more specifically a control word 2 and responds to the conditions designated in bits 6, 7, 8 and 9 as specified in the control word.

This copy operation of the terminal control unit is now completed and all registers, counters and latches are reset in preparation for further operations. A more detailed description of the terminal control unit and its sequential operation will now be provided. FIGS. 4a through 41 taken together comprise a detailed schematic diagram of the terminal control unit and its operation will be described in terms of the sequences of operation. The description of the detailed schematic diagram and its operation in the various sequences should be followed in conjunction with the timing diagrams of FIGS. 5a and 5b for the Sequence 0 and 1 operation, FIGS. 6a and 6b for the Sequence 2 and 3 operation and FIGS. 7a through 7e for the Sequence 4, 5 and 6 operation.

DETAILED DESCRIPTION OF DISCLOSED EMBODIMENT SEQUENCE 0 OPERATION

Sequence 0 is a transmission sequence in which a message consisting of a "TO" address character, a copy command character, a copy control character and a "FROM" address character is transmitted from the data processing system to the control unit.

The "TO" address designates a device attached to the control unit to receive a data message, the "FROM" address designates a device attached to the same control unit to transmit a data message, the copy command designates that the data message presently stored in the message buffer of the selected "FROM" device is to be transferred to the selected "TO" device and the copy control character designates the type of data to be copied and also start print operations, specifies the printout format for those operations and signals an audible alarm to be sounded. In response to the receipt of this message, the control unit creates a 13 bit read poll word for transmission to the "FROM" device to initiate a transfer of the data message from the message buffer of the "FROM" device to the control unit message buffer.

Figure 4A:
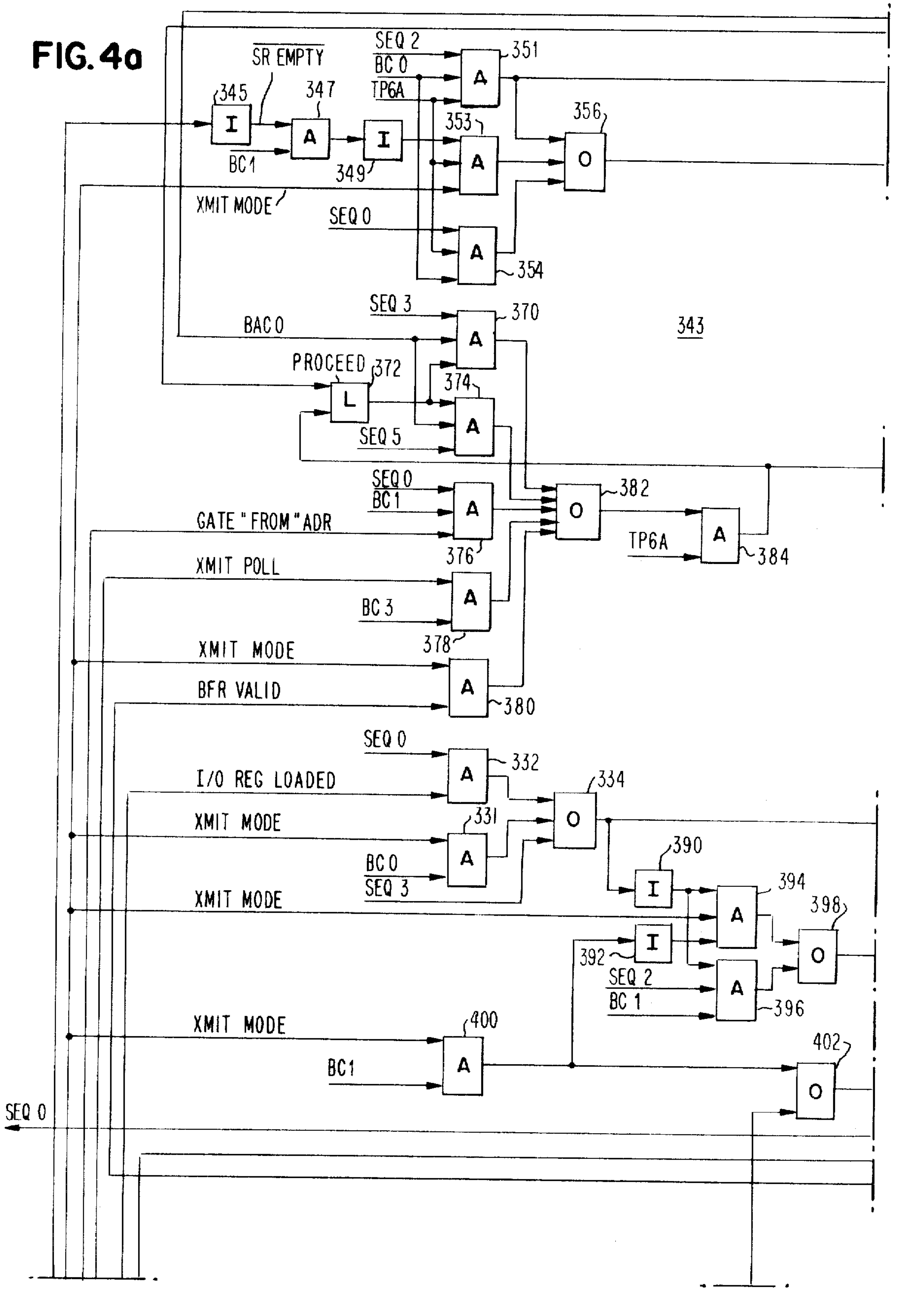
Figure 4B:
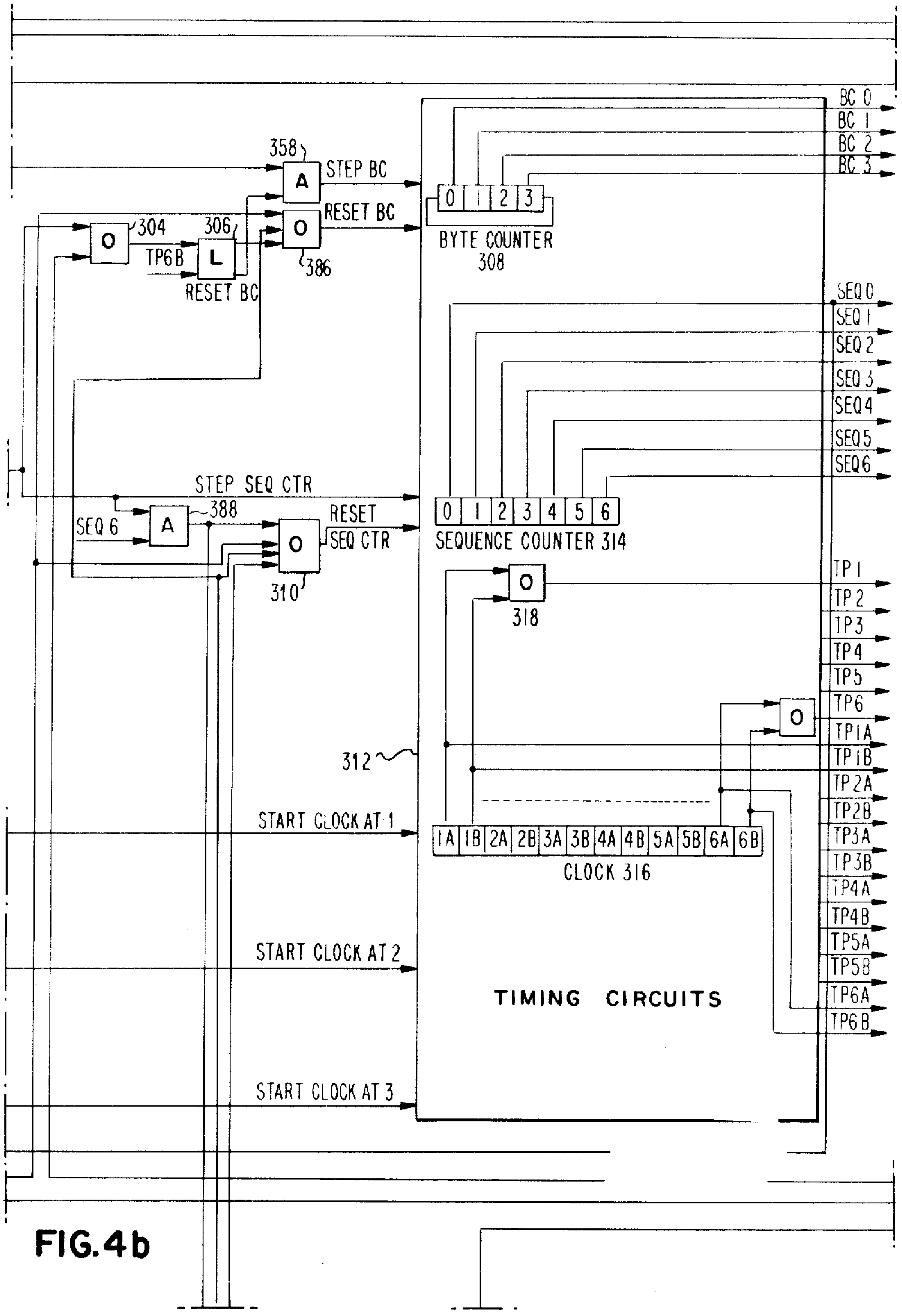
Figure 4C:
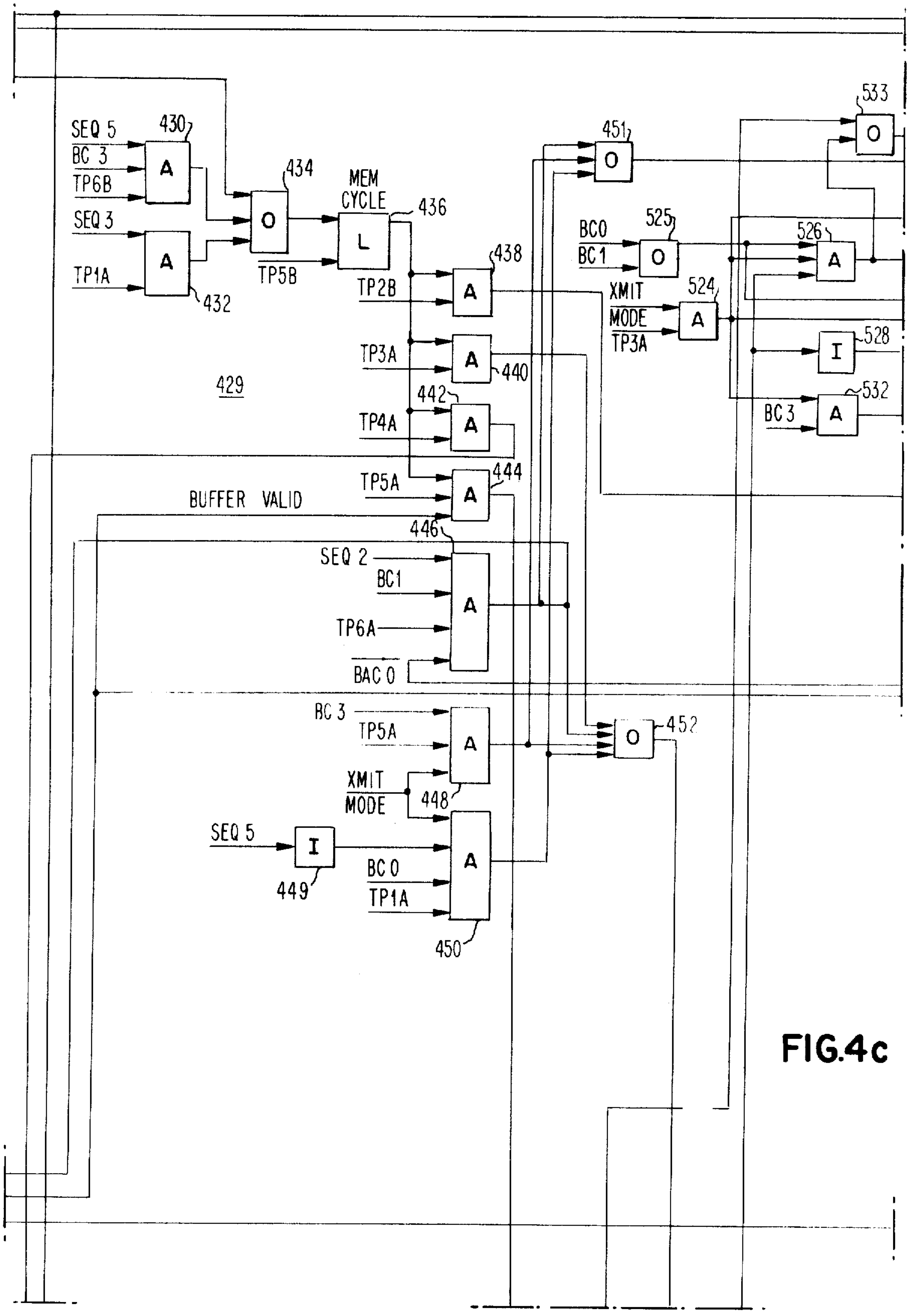
Figure 4D:
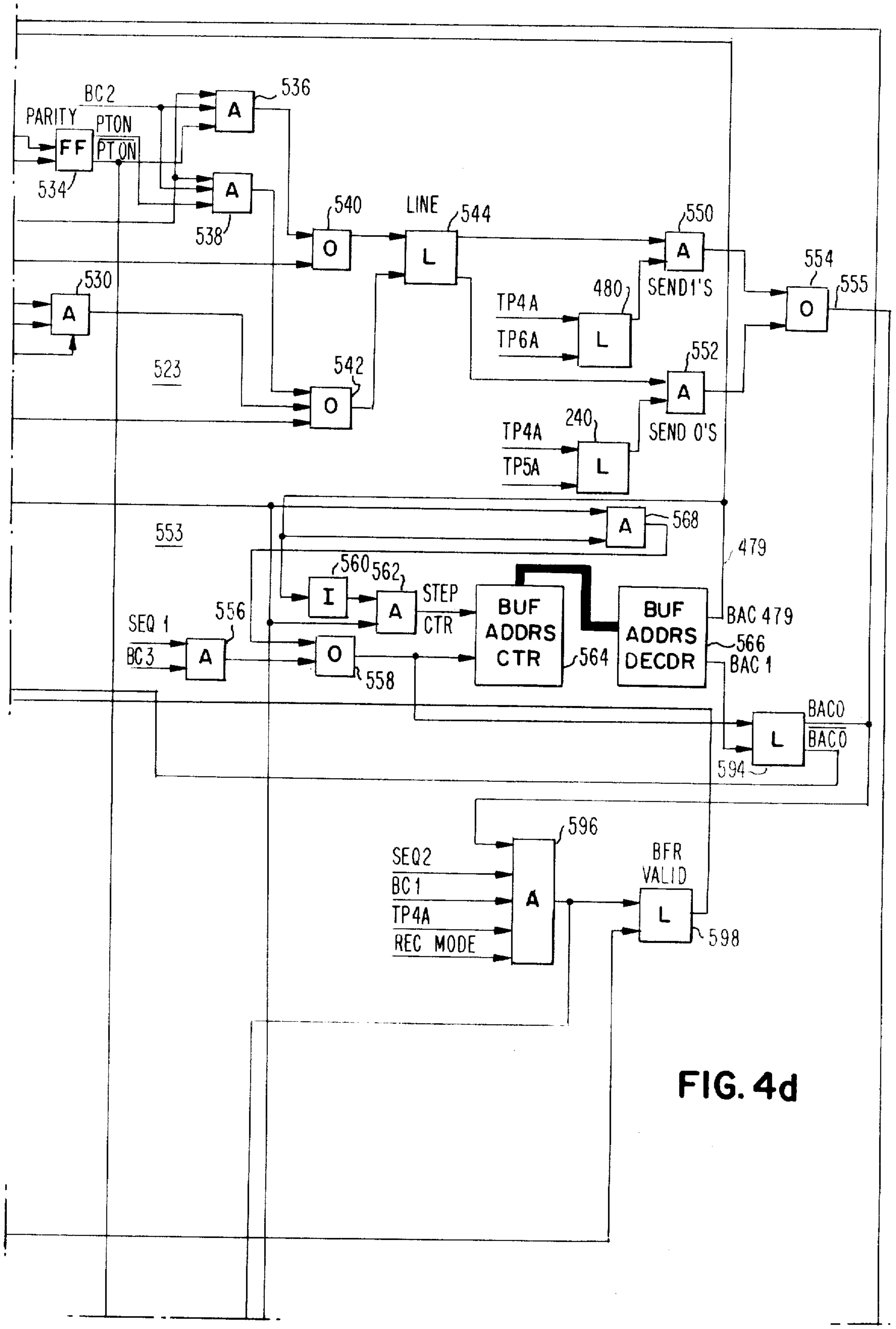
Figure 4E:
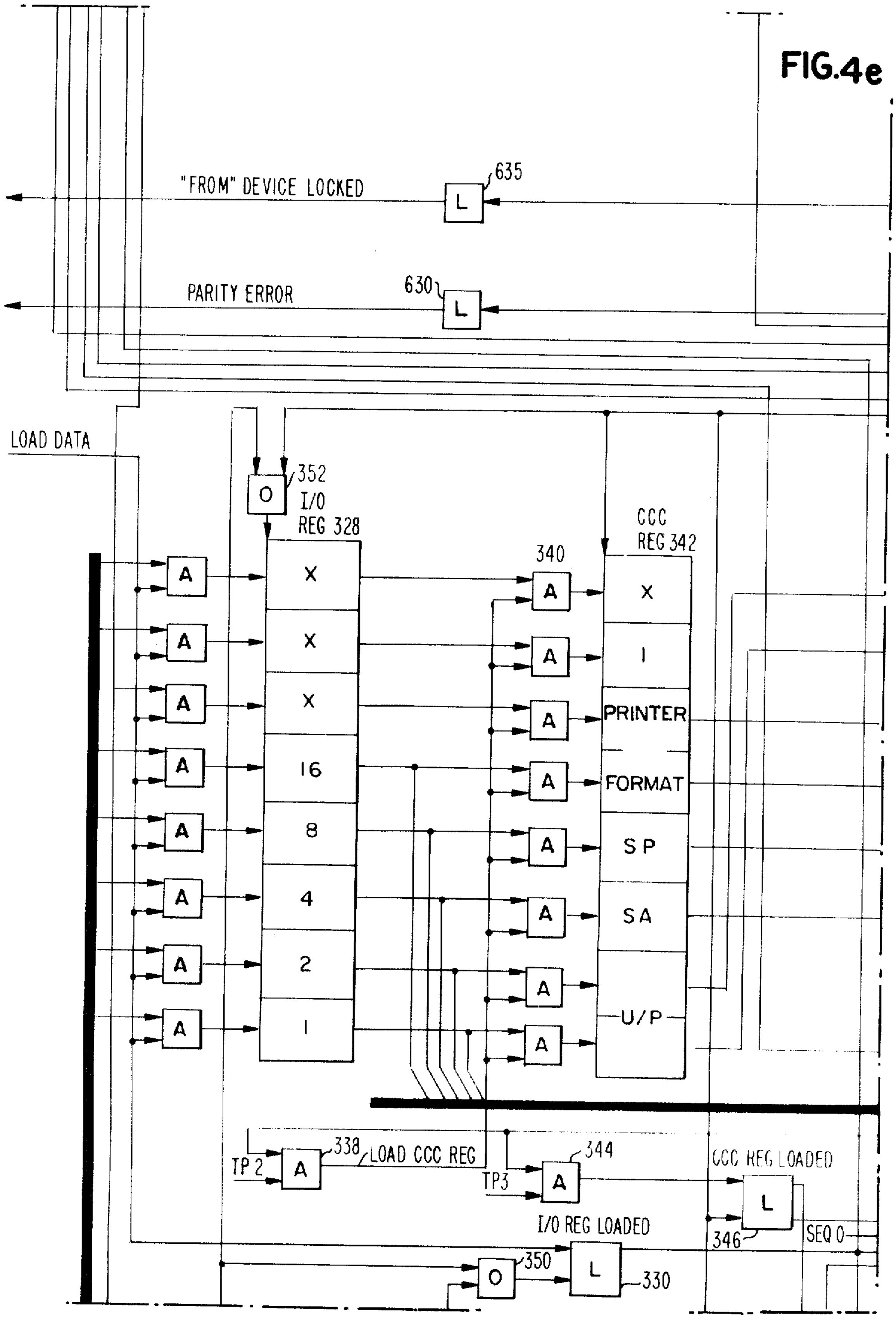
Figure 4F:
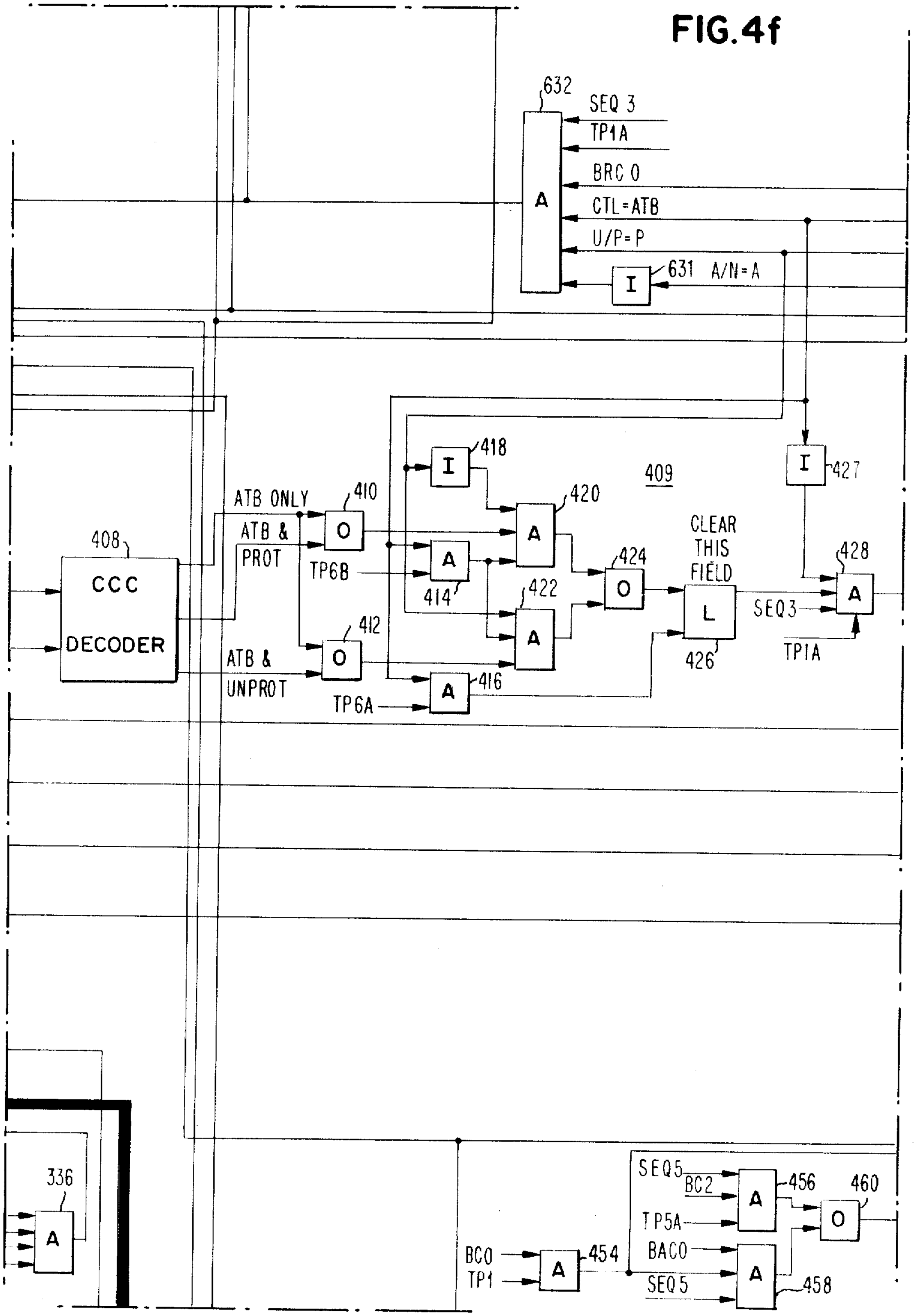
Figure 4G:
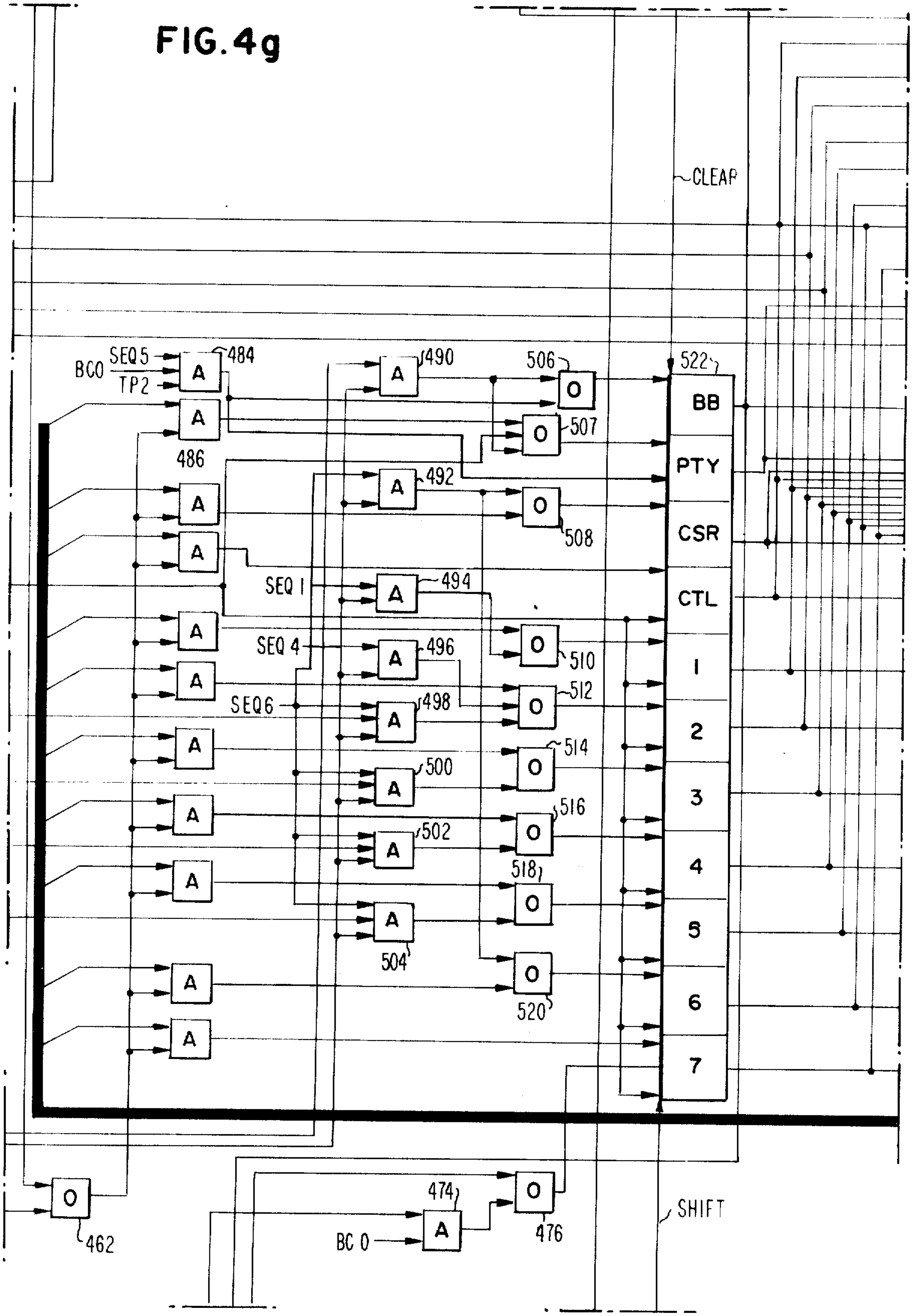
Figure 4H:
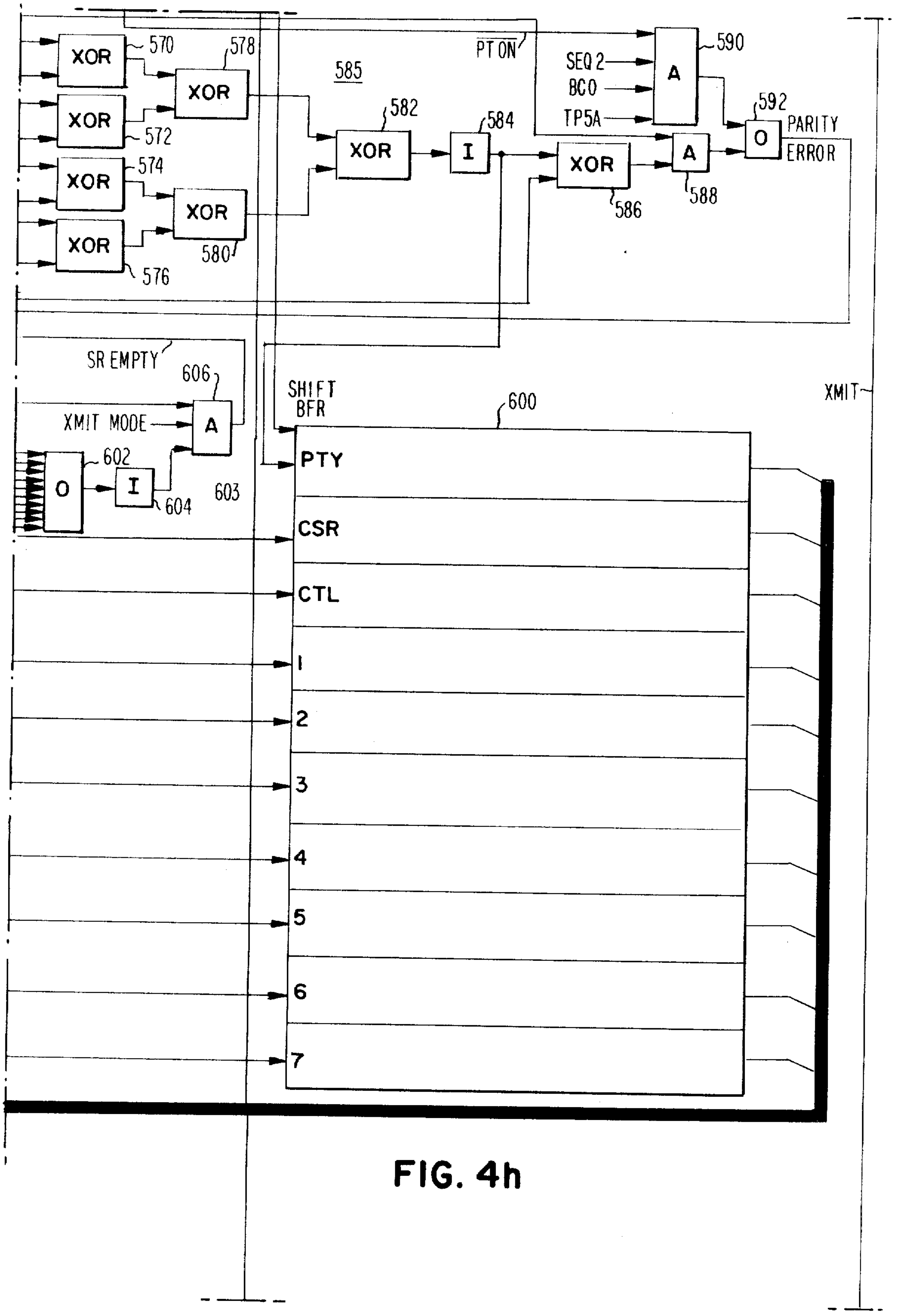
Figures 4, 4I:
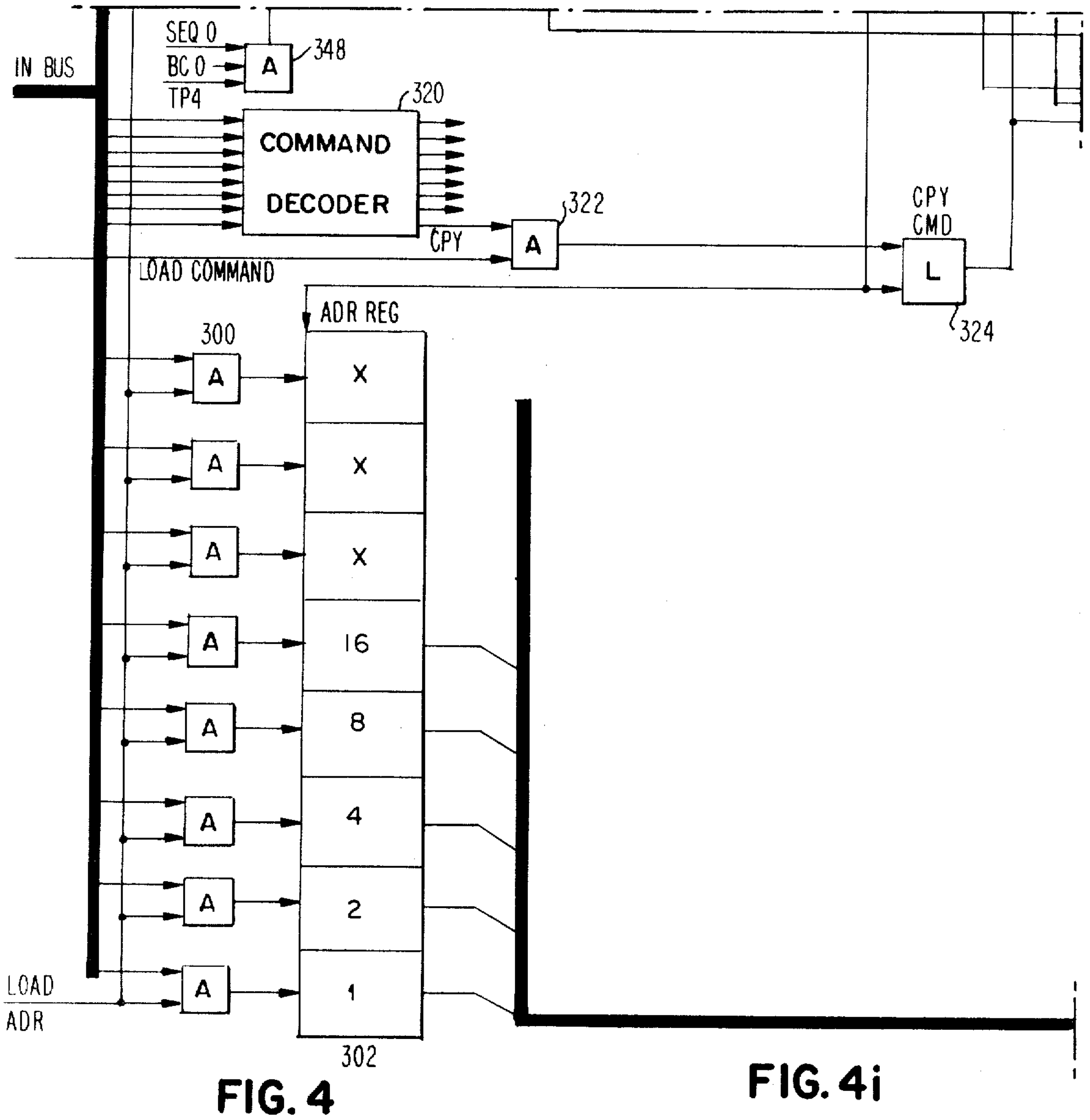
Figure 5A:
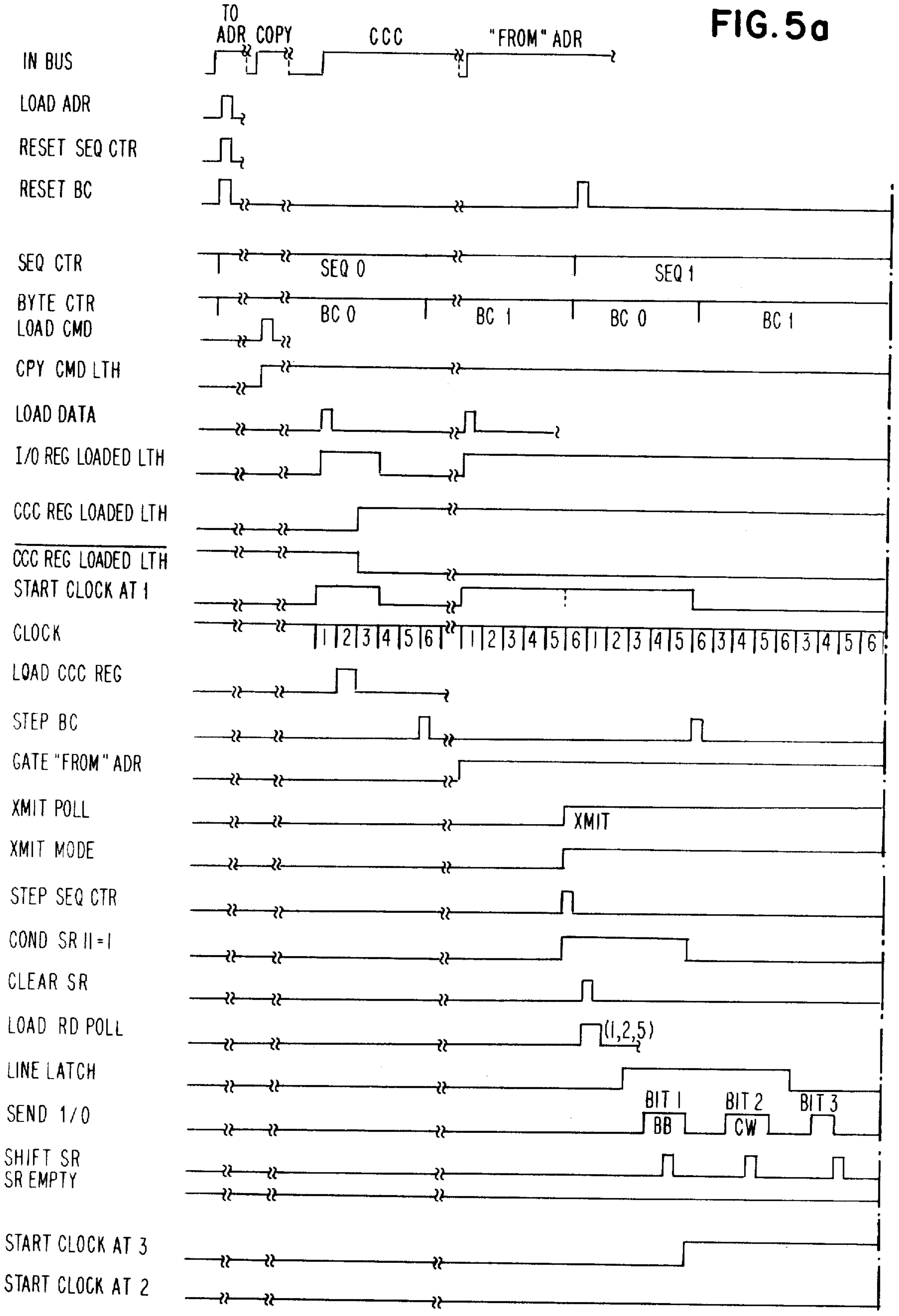
FIGS. 5*a* and 5*b*, taken together, comprise a timing diagram of a Sequence 0 and 1 operation.
Figures 5, 5B:
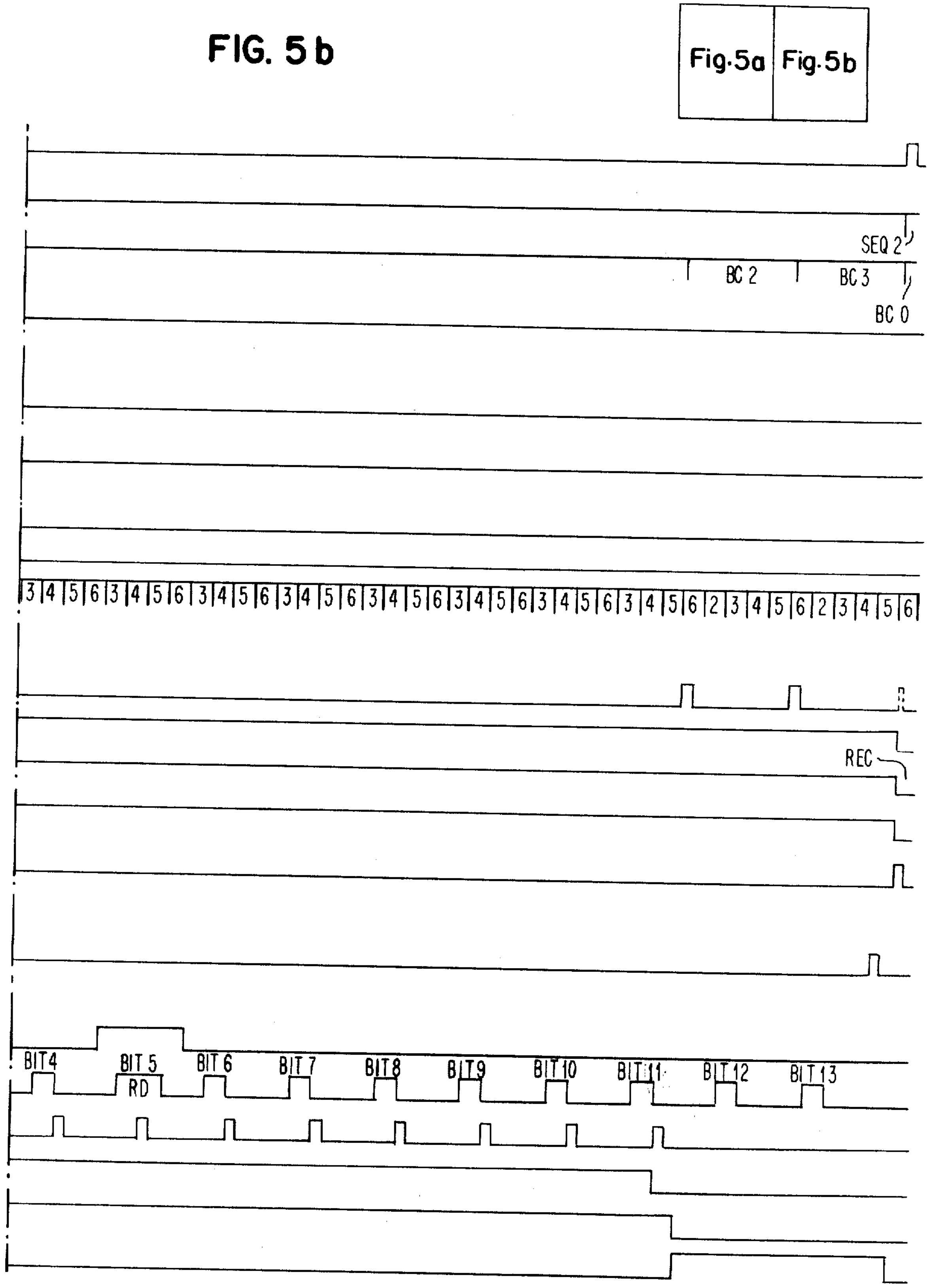
FIG. 5 illustrates how FIGS. 5*a* and 5*b* may be placed to form a composite timing diagram.
Figure 7:
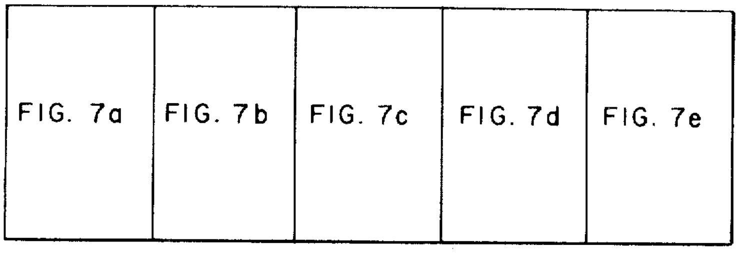
FIG. 7 illustrates how FIGS. 7*a* through 7*e*, inclusive, may be placed to form a composite timing diagram.

Referring now to FIG. 4i and the timing diagram of FIG. 5a, the "TO" address character is applied via the In Bus to condition the AND circuits 300 after which a Load Address pulse is applied to render the AND circuits effective to transfer the "TO" address character to the address register 302. The positive pulse on the load address line is also applied via the OR circuits 310 and 386 in FIG. 4b to the reset SEQ CTR and reset BC line inputs of the timing circuits 312. The timing circuits consist essentially of a byte counter 308, a sequence counter 314 and a clock 316. The byte counter 308 is a four-stage ring counter which feeds back on itself and provides byte count timing signals which are used during word transmissions to be explained hereinafter. The sequence counter is a seven-stage ring counter which does not feed back on itself and provides sequence signals indicating the particular sequence being performed as will be explained hereinafter. The clock is a 12-stage ring counter which does not feed back on itself and may be operated to start at position 1A, position 2A or position 3A as will be explained hereinafter and is effective to produce TpA and TPB timing pulses. The A and B timing pulses are combined via OR circuits such as OR circuit 318 to provide additional timing pulses having a time duration which is twice that of either the A or B timing pulse. Accordingly, the positive pulse on the reset BC line is effective to reset the byte counter to a count of 0 and provide a positive signal on the BC 0 line. Additionally, the positive pulse on the reset SEQ CTR line is also applied to reset the sequence counter 314 to a count of 0 and produce a positive signal on the SEQ 0 line. The presence of the signal on the SEQ 0 line signals the data processing system to continue transmission of the message.

SEQ 0/BC 0

Referring now to FIG. 4i, the data processing system next transmits the copy command character which is received via the In Bus and decoded by the command decoder 320 to provide a positive signal on the copy line indicating the presence of the copy command. A positive pulse is then applied via the Load Command line which in combination with the copy signal renders the AND circuit 322 effective to pass the positive pulse and turn on the copy command latch 324.

Referring now to FIG. 4e, the data processing system next transmits the copy control character which is applied via the In Bus to one input of the AND circuits 326. Following this, a positive pulse is applied via the Load Data line to the other input of the AND circuits 326 to render them effective to cause the copy control character to be transferred to the I/O register 328. The positive pulse on the Load Data line is also applied to turn on the I/O Reg Loaded latch 330 indicating that a character has been loaded into the I/O register 328. Referring now to FIG. 4a, the positive signal output of the I/O reg loaded latch 330 in combination with the positive signal on the SEQ 0 line renders the AND circuit 332 effective to apply a positive signal via the OR circuit 334 to the start clock at 1 line to cause the clock 316 to start operating at TP1A time. The positive signal output of the I/O reg loaded latch 330 is also applied to one input of the AND circuit 336 in FIG. 4f, which in combination with the positive signal on the SEQ 0 line and the positive signal outputs of the copy command latch 324 and the not output of the CCC reg loaded latch 346 render the AND circuit 336 effective to apply a positive signal to one input of the AND circuits 338 and 344. At TP2 time, a positive pulse is passed via the now conditioned AND circuit 338 to the Load CCC Reg line. The positive pulse on the Load CCC Reg line is applied to condition the AND circuits 340 to transfer the copy control character from the I/O register 328 to the CCC register 342. At TP3 time, a positive pulse is passed via the now conditioned AND circuit 344 to turn on the CCC reg loaded latch 346 indicating that a copy control character has been loaded into the CCC register 342. Referring now to FIGS. 4i and 4e, positive signals on the SEQ 0 and the BC 0 lines condition the AND circuit 348 so that at TP4 time a positive pulse is passed via this AND circuit and via the OR circuit 350 to reset the I/O Reg Loaded latch 330 and via the OR circuit 352 to reset the I/O Reg 328 in preparation for receiving the next character from the data processing system. Referring now to FIG. 4a, the positive signals on the SEQ 0 and BC 0 lines condition the AND circuit 354 so that at TP6A time a positive pulse is passed via the AND circuit and the OR circuit 356 to the AND circuit 358 in FIG. 4b. This signal together with the positive signal on the not output line of the Reset BC latch 306 renders the AND circuit 358 effective to apply a positive signal to the STEP BC line. The positive signal on the STEP BC line is applied to step the Byte Counter to a count of 1 and produce a positive output signal on the BC 1 line.

SEQ 0/BC 1

Figure 4J:
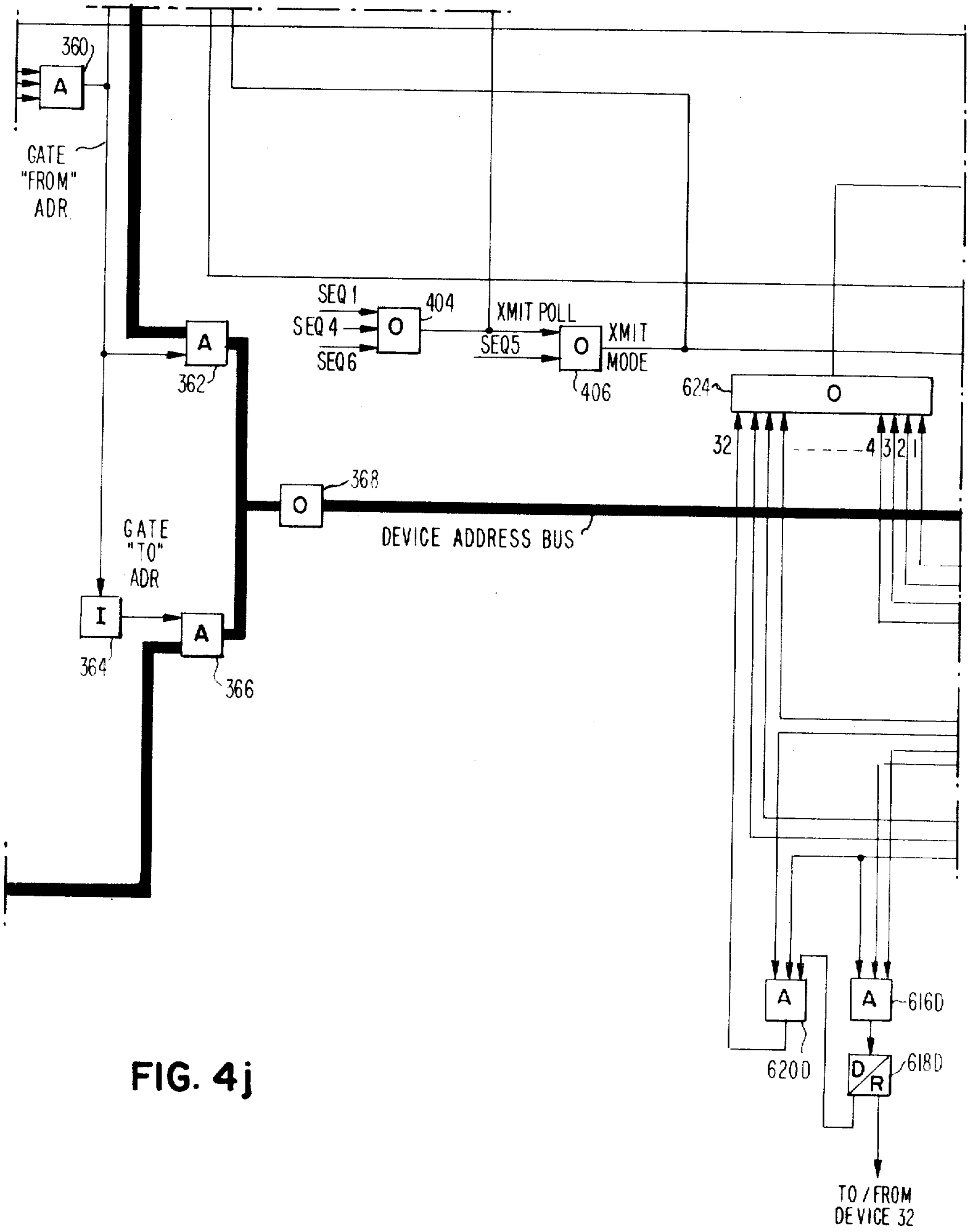

Referring now to FIG. 4e, the data processor next transfers the "FROM" address character to the Control Unit where it is received via the In Bus and applied to the one input of the AND circuits 326. Following this, a positive pulse is applied via the Load Data line to the other input of the AND circuits 326 to render them effective to transfer the "FROM" address character to the I/O register 328. The positive pulse on the Load Data line is also applied to turn on the I/O Reg loaded latch 330 indicating that a character has been loaded into the I/O register 328. Referring now to FIGS. 4*e*, 4*i*, and 4*j*, the positive signal output of the I/O Reg Loaded latch 330 together with positive signal outputs of the Copy Command latch 324 and the CCC Reg Loaded latch 346 render the AND circuit 360 effective to apply a positive signal via the Gate "FROM" ADR line to condition the AND circuits 362 and via inverter 364 to apply a negative signal via the Gate "TO" ADR line to decondition the AND circuits 366. Accordingly, the "TO" address presently stored in the address register 302 is blocked from being transferred to the device adapters while the "FROM" address presently stored in the I/O register 328 is effectively passed via the AND circuits 362, the OR circuits 368 and the device address bus to the device address decoders of the device adapters in preparation for a transmission operation between the control unit and the selected "FROM" device. Referring to FIG. 4*a*, the positive signal output of the I/O Reg Loaded latch 320 in combination with the positive signal on the SEQ 0 line again renders AND circuit 332 effective to apply a positive signal via the OR circuit 334 to the start clock at 1 line in FIG. 4*a* to initiate another cycle of the clock 316 starting at TP1A time. The positive signal output of the AND circuit 360 in FIG. 4*j*, in combination with positive signals on the SEQ 0 and BC 1 lines are applied to render the AND circuit 376 in FIG. 4a effective to apply a positive signal via the OR circuit 382 to one input of the AND circuit 384. At TP6A time, a positive pulse is passed via the now conditioned AND circuit 384 to the STEP SEQ CTR line in FIG. 4*b* to step the Sequence Counter 314 from a count of 0 to a count of 1 producing a positive signal on the SEQ 1 line. The positive pulse from the AND circuit 384 is also applied via the OR circuit 304 to turn on the Reset BC latch 306 which, in being turned on, applies a positive signal via the OR circuit 386 to the Reset BC line to reset the Byte Counter to a count of 0 producing a positive signal on the BC 0 line. At TP6B time, a positive pulse is applied to reset the Reset BC latch 306.

SEQUENCE 1 OPERATION

In the sequence 1 operation, the Control unit is switched to a Transmit Mode of operation and creates a 13 bit read poll word which is transferred from the Control Unit to the selected "FROM" Device to signal the Device to transfer the contents of its message buffer back to the Control Unit. At the end of the transmission of the read poll control word the Control Unit is switched to a Receive mode awaiting reception of the contents of the message buffer of the selected "FROM" device.

SEQ 1/BC 0

Figure 4K:
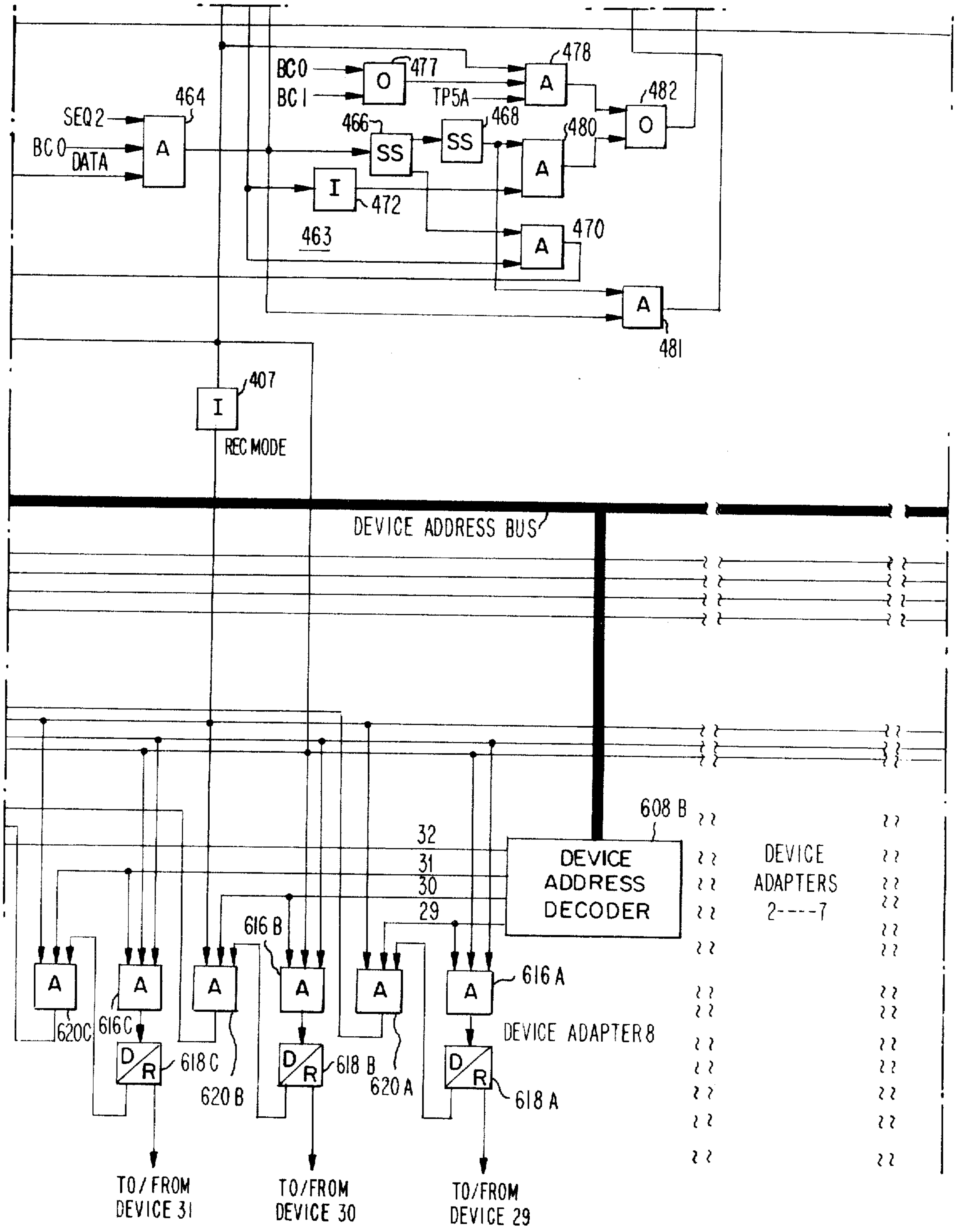
Figure 41:
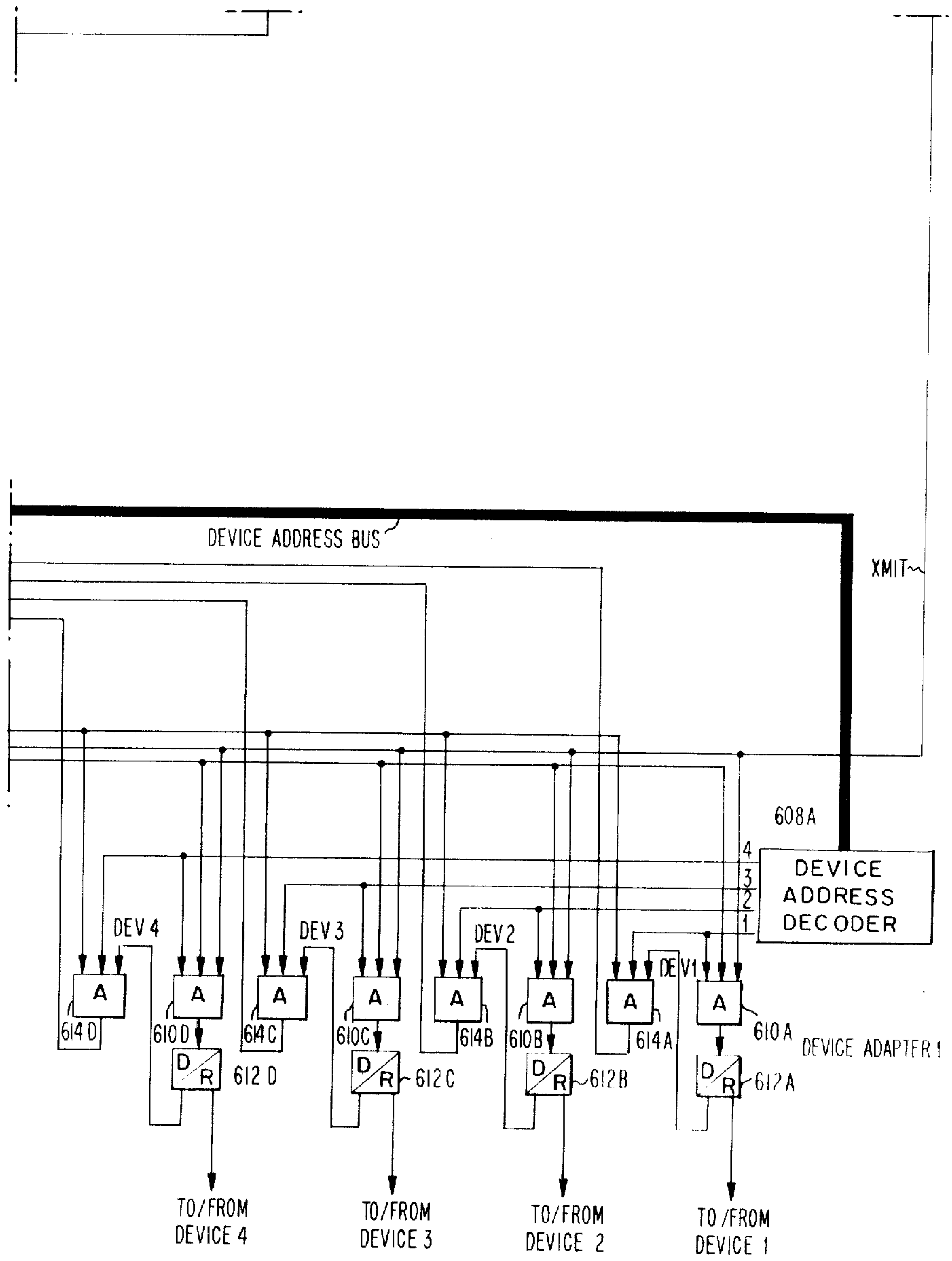

Referring now to FIG. 4*j*, the positive signal on the SEQ 1 line is applied via the OR circuit 404 to the XMIT POLL line and via the OR circuit 406 to the XMIT MODE line. Referring now to FIGS. 4*j*, 4*k*, and 4*l*, the positive signal on the XMIT MODE line is applied to a group of AND circuits in each one of eight device adapters.

Each adapter is associated with four different devices and has identical circuitry which includes a device address decoder 608 to recognize four unique device addresses applied via the device address bus. For example, let it be assumed that the "FROM" device is device 2. Accordingly, device address decoder 608A decodes the device address on the device address bus and applies a unique positive signal via the device 2 line to one input of the transmit AND circuit 610B and the receive AND circuit 614B, respectively, for either a transmit or receive operation. The positive signal on the XMIT MODE line is applied to a second input of the transmit AND circuit 610B thereby conditioning this AND circuit for a transmit operation. The positive signal on the XMIT MODE line is also inverted by inverter 407 to apply a negative signal to the REC MODE line which in turn is applied to decondition all the receive AND circuits including the AND circuit 614B and thereby block a receive operation.

Referring now to FIGS. 4*a* and 4*b*, with the fall of the SEQ 0 line at the input to AND circuit 332, the positive signal on the Start Clock at 1 line would switch to a negative signal. However, the positive signals now on the XMIT MODE and BC 0 lines are applied to render the AND circuit 331 effective to apply a positive signal via the OR circuit 334 to maintain a positive signal on the Start Clock at 1 line to cause the clock 316 to operate through another cycle starting at TP1A time. Referring now to FIG. 4*g*, the positive signals on the XMIT MODE line and the BC 0 line render AND circuit 474 effective to apply a positive signal via the OR circuit 476 to condition the 11th stage of the shift register 522 in preparation for inserting a 1 bit in that stage on the occurrence of a shift pulse. This bit in the 11th stage will be used later to provide an indication of when the shift register 522 is empty as will be explained hereinafter. Referring now to FIG. 4*c*, the AND circuit 450 is conditioned by a positive signal on the XMIT MODE line, a negative signal on the SEQ 5 line which is inverted by inverter 449 to a positive signal and a positive signal on the BC 0 line. Accordingly, at TP 1A time, a positive pulse is passed via the now conditioned AND circuit 450 and the OR circuits 451 and 452 to the clear input of the Parity flip-flop 534 and the shift register 522 (FIG. 4d), respectively, resetting the Parity flip-flop and all stages of the shift register.

Referring now to FIGS. 4*f* and 4*g*, at TP 1 time, a positive pulse is applied to the AND circuit 454 which is conditioned by the positive signal on the BC 0 line. Therefore, the positive pulse passed via the AND circuit 454 to the AND circuits 490 and 494 which are conditioned by the positive signals on the XMIT POLL and SEQ 1 lines, respectively. The positive pulse output of the AND circuit 490 is applied via the OR circuits 506 and 507 to the first and second stages of the shift register 522 while the positive pulse output of the AND circuit 494 is applied via the OR circuit 510 to the fifth stage of the shift register. At the trailing edge of the positive pulses, the first, second and fifth stages of the shift register 522 are turned on to enter a 1 bit in each of the stages. The 1 bit in the first stage indicating the presence of a busy bit, the 1 bit in the second stage indicating that the word being created is a control word and the 1 bit in the fifth stage indicating a read poll. Referring now to FIG. 4*c*, positive signals from the first stage output of the shift register 522 and on the BC 0 line via the OR circuit 525 are applied to condition the AND circuit 526. Accordingly, at TP 3A time, a positive pulse is passed by the AND circuit 524, conditioned by the positive signal on the XMIT MODE line, to the now conditioned AND circuit 526. The positive pulse is passed via the AND circuit 526 and the OR circuits 533 and 540 to set the Parity flip-flop 534 and the Line latch 544, respectively. The Line latch 544 in being set applies a positive signal to one input of the SEND 1's AND circuit 550. At TP4A time, a positive pulse is applied to turn on the 480 latch which, in being turned on, applies a positive signal via the now conditioned SEND 1's AND circuit 550 and OR circuit 554 to the XMIT line 555 which is applied to all of the device adapters in FIGS. 4*j*, 4*k* and 4*l*.

Referring now to FIG. 4*l*, assuming that device 2 is the selected "FROM" device, the 1 bit on the XMIT line is passed via the AND circuit 610B, conditioned in a manner as previously described, to the driver 612B and on to the coax line to device 2. Referring now to the shift control circuit 463 in FIG. 4*k*, the positive signal on the XMIT MODE line and on the BC 0 line via OR circuit 477 condition the AND circuit 478. Consequently, at TP5A time, a positive pulse passes via the now conditioned AND circuit 478 and the OR circuit 482 to the shift input line of the shift register 522. Accordingly, the 1 bit in the second stage of the shift register 522 will be shifted to the first stage and the 1 bit in the fifth stage will be shifted to the fourth stage and at the trailing edge of the shift pulse a 1 bit will be inserted into the 11th stage. The reason for inserting a 1 bit in this stage at this time is to provide a means for determining when the shift register 522 has been completely shifted out. Thus, 10 shift pulses after, the occurrence of the first shift pulse, the 1 bit presently in the 11th stage will appear in the first stage of the shift register and all other stages will contain 0 bits. A shift register empty detection circuit 603, in FIGS. 4*h* and 4*g* is provided to detect this condition and signal the fact that the shift register is in fact empty. This detection circuit consists of OR circuit 602, inverter 604 and AND circuit 606. Thus, if stages 2–11 contain all 0's, negative signals would be applied to the OR circuit 602 which, in turn, applies a negative signal to the inverter 604 where it is inverted to a positive signal and applied to the AND circuit 606. This positive signal together with positive signals on the XMIT MODE line and from the output of the first stage of the shift register 522, due to the presence of a 1 bit which was originally inserted into the 11th stage, renders the AND circuit 606 effective to produce a positive signal on the SR EMPTY line indicating that the shift register 522 is effectively empty and has transmitted 11 of the 13 bit control words.

Returning now to the condition where the 1 bit in the 2nd stage has been shifted into the 1st stage of the shift register 522 and the 1 bit in the 5th stage has been shifted into the 4th stage and a 1 bit has been inserted into the 11th stage, the OR circuit 602 detects positive signals from the 4th and 11th stages and, therefore, applies a positive signal to the inverter 604 where it is inverted to a negative signal to decondition the AND circuit 606. The negative signal output of the AND circuit 606 is applied to inverter 345 of the Timing Control circuits 343 in FIG. 4*a*, where it is inverted to a positive signal on the $\overline{\text{SR EMPTY}}$ line and applied to AND circuit 347 which is presently deconditioned by a negative signal on the BC 1 line. Accordingly, the AND circuit 347 applies a negative signal to the inverter 349 where it is inverted to a positive signal and together with the positive signal on the XMIT MODE line conditions the AND circuit 353. At TP6A time, a positive pulse is applied via the now conditioned AND circuit 353 and the OR circuit 356 to the AND circuit 358 in FIG. 4*b* which is conditioned by a positive signal from the not output of the reset BC latch 306. Consequently, the positive pulse passes via the now conditioned AND circuit 358 to the step BC line to cause the Byte Counter 308 to step from a count of 0 to a count of 1 and produce a positive signal on the BC 1 line. The positive pulse on the TP6A line is also applied in FIG. 4*d*, to reset the 480 latch which, in being reset, deconditioned the SEND 1's AND circuit 550 thereby terminating the positive signal being applied via the OR circuit 554 to the XMIT line 555. It should be apparent that the 1 bit representing the busy bit is present on the XMIT line for the time pulse periods, i.e., from TP4A time to TP6A time.

SEQ 1/BC 1

During the period of this Byte count, the shift register 522 will be shifted 10 more times to shift out the next 10 bits of the control word presently stored in the shift register to the selected "FROM" device.

Referring now to the Timing Control circuit in FIGS. 4a and 4b, the positive signals on the XMIT MODE line and the BC 1 line render the AND circuit 400 effective to apply a positive signal via the OR circuit 402 to the start clock at 3 line to cause the clock 316 to start the next cycle at TP3A time. Referring to the Bit I/O Generator 523 in FIG. 4*c*, at TP3A time, a positive pulse is again passed via the conditioned AND circuit 524 to the AND circuit 526. Since a 1 bit is present in the first stage of the shift register 522, the AND circuit 526 remains conditioned to pass the positive pulse and via the OR circuits 533 and 540 to switch the Parity flip-flop 534 and maintain on the Line latch 544. Since the Line latch 544 had been previously turned on, it will remain on during this pulse period conditioning the SEND 1's AND circuit 550. At TP4A time, a positive pulse is again applied to turn on the 480 latch to apply a positive signal via the conditioned SEND 1's AND circuit 550 and the OR circuit 554 to the XMIT line 555 to initiate transmission of the second bit of the 13 bit control word character. This 1 bit pulse indicates that the word being transmitted to the selected "FROM" device is a control word and is passed to device adapter 1 and out via AND circuit 610B and driver 612B to the coax line connected to device 2. At TP5A time, a positive pulse is passed via the AND circuit 478, which is now conditioned by positive signals on the XMIT MODE line and the BC 1 line via the OR circuit 477, and the OR circuit 482 to the shift input line of the shift register 522. The shift pulse causes the 1 bit present in the 4th and 11th stages of the shift register to be shifted into the 3rd and 10th stages of the register. Since a 1 bit is present in at least one of the stages 2–11 of the shift register 522, the shift register empty detector 603 detects this condition and applies a negative signal from the AND circuit 606 to the SR EMPTY line. Referring now to the Timing Control circuit in FIGS. 4*a* and 4*b*, the negative signal on the SR EMPTY line is applied to the inverter 345 where it is inverted to a positive signal and applied to the $\overline{\text{SR EMPTY}}$ line. The positive signals on the $\overline{\text{SR}}$ EMPTY line together with the positive signal on the BC 1 line renders the AND circuit 347 effective to apply a positive signal to the inverter 349 where it is inverted to a negative signal to decondition the AND circuit 353 and thereby inhibit the stepping of the Byte Counter 308 which therefore remains at a byte count of 1. Referring back to the Bit I/O Generator 523 in FIG. 4*d*, at TP6A time, a positive pulse is applied to reset the 480 latch which, in being reset, deconditions the AND circuit 550 thereby terminating the positive signal being applied to the XMIT line 555. In a similar manner, each successive bit of the control word that was originally stored in the shift register 522 is shifted out of the register and onto the XMIT line and via the appropriate device adapter to the coax cable line connected to the selected "FROM" device. This is illustrated more graphically in the timing diagram shown in FIGS. 5*a* and 5*b*.

Now, let it be assumed that the 11 bits of the control word have been shifted out of the shift register 522 and via the selected device adapter to the selected "FROM" device and that the 1 bit which was inserted into the 11th stage of the shift register 522 after the first shift pulse is present in the first stage of the shift register with all the remaining stages containing 0 bits. This condition is detected by the shift register empty detector 603 in FIG. 4*h*, causing a positive signal to be applied from the AND circuit 606 to the SR EMPTY line. The positive signal on the SR EMPTY line is applied to the Timing Control circuit 343 in FIGS. 4*a* and 4*b*, where it is inverted to a negative signal by inverter 345 to decondition the AND circuit 347. The AND circuit 347 in being deconditioned applies a negative signal to the inverter 349 where it is inverted to a positive signal and applied to the AND circuit 353 which together with the positive signal on the XMIT MODE line conditions AND circuit 353. Accordingly, at TP6A time, a positive pulse is passed via the now conditioned AND circuit 353 and the OR circuit 356 and the AND circuit 358, which is conditioned by the not output of the Reset BC latch 306, to the step BC line to cause the Byte Counter 308 to step from a count of 1 to a count of 2 producing a positive signal on the BC 2 line.

SEQ 1/BC 2

During the period of this Byte count, the parity bit which has been generated over the 11 bits of the Control Word transferred to the selected "FROM" device is now sensed and also transmitted to the selected "FROM" device as the 12th bit of the control word. Referring now to the Timing Control circuit in FIGS. 4*a* and 4*b*, it will be noted that both the AND circuits 331 and 332 are deconditioned due to the presence of a negative signal on the SEQ 0 line and BC 0 line, respectively, causing negative signals to be applied by these AND circuits to the OR circuit 334. Additionally, since a negative signal is also present on the SEQ 3 line, the OR circuit 334 applies a negative signal to the inverter 390 where it is inverted to a positive signal and applied to one input of the AND circuit 394. Additionally, the AND circuit 400 is now deconditioned due to the presence of a negative signal on the BC 1 line causing this AND circuit to apply a negative signal to the inverter 382 where it is inverted to a positive signal applied thereto from the XMIT MODE line thereby rendering the AND circuit 394 effective to apply a positive signal via the OR circuit 398 to the start clock at 2 line to cause the clock 316 to start the next cycle at TP2A time.

At this time, it is necessary to transmit the 12th bit of the control word, namely, the parity bit, and to block any further ouput from the shift register 522. Since the Byte Counter 308 has stepped to a count of 2, the AND circuits 526 and 530 in the Bit I/O Generator 523 in FIGS. 4*d* and 4*c*, are both deconditioned and will not pass a pulse to the Line latch 544 in accordance with the first stage of the shift register 522, but instead the output from the parity flip-flop 534 will be taken to either set or reset the Line latch 534. Since the control word contains only three bits, the parity flip-flop 534 will be in an ON condition after the transmission of the first 11 bits of the control word. Accordingly, the positive signals on the PT ON and BC 2 lines condition AND circuit 538 so that, at TP3A time, a positive pulse is applied via the conditioned AND circuit 524 and the now conditioned AND circuit 538 and via the OR circuit 542 to reset the Line latch 544. The Line latch 544 in being reset applies a positive signal from its not output to condition the AND circuit 552. At TP4A time, a positive pulse is applied to turn on the 240 latch which, in being turned on, applies a positive signal via the now conditioned AND circuit 552 and the OR circuit 554 to the XMIT line 555. At TP5A time, a positive pulse is applied to reset the 280 latch which, in being reset, deconditions the AND circuit 552 to terminate the positive signal being applied via the OR circuit 554 to the XMIT line thereby providing a 0 pulse as the 12th bit of the control word and indicating the parity of the word being transmitted to the selected "FROM" device. Referring to the shift control circuit 463 in FIG. 4*k*, since the Byte Counter 308 is at a count of 2, the AND circuit 478 will be deconditioned to inhibit any further shift pulses being applied to the shift input of the shift register 522. Accordingly, the contents of the shift register remain with a 1 in the first stage and all 0's in the remaining stages. Therefore, the shift register empty detector 603 continues to detect this condition and apply a positive signal to the inverter 345 in the Timing Control circuit 343 in FIGS. 4*a* and 4*b*, where it is inverted to a negative signal to decondition the AND circuit 347 which in being deconditioned applies a negative signal to the inverter 349 where it is inverted to a positive signal and applied to the AND circuit 353 thereby maintaining this AND circuit conditioned. At TP6A time, a positive pulse is passed via the conditioned AND circuit 353 and the OR circuit 356 to the conditioned AND circuit 358 causing a positive signal to be applied to the step BC line to cause the Byte counter to step from a count of 2 to a count of 3 producing a positive signal on the BC 3 line.

SEQ 1/BC 3

During the period of this Byte count, the 13th bit of the 13 bit Control Word is generated and transferred to the selected "FROM" device after which this sequence is ended and the Sequence Counter 314 is stepped to signal the next sequence operation to be performed. Referring now to the Timing Control circuit 343 in FIGS. 4*a* and 4*b*, a positive signal is maintained on the start clock at 2 line, in a manner as previously described, to cause the clock 316 to start the next cycle at TP2A time. Therefore, referring to the Bit I/O Generator 523 in FIGS. 4*d* and 4*c*, the positive signal on the BC 3 line is applied to condition the AND circuit 532 so that, at TP3A time, a positive pulse is applied via the conditioned AND circuit 524 and the now conditioned AND circuit 532 and via the OR circuit 542 to reset input of the Line latch 544. The Line latch 544 is already in a reset condition due to the fact that the parity bit was a 0 bit and therefore no change occurs in the state of the Line Latch 544. The Line latch 544 being in a reset condition conditions AND circuit 552 to permit a 0 bit to be applied via the OR circuit 544 to the XMIT line 555 in accordance with the operation of the 280 latch successively set and reset at TP4A time and then TP5A time, respectively. Therefore, a 0 bit representing the 13th bit of the control word is applied via the XMIT line 555 to device adapter 1 where it is passed via the conditioned AND circuit 610B and the driver 612B to the coax line connected to the selected "FROM" device 2.

Referring now to AND circuit 448 in FIG. 4c, the positive signal on the XMIT MODE and the BC 3 lines are applied to condition the AND circuit so that, at TP5A time, a positive pulse is passed via the now conditioned AND circuit 448 and the OR circuit 451 and 452 to reset the Parity flip-flop 534 and to the clear input line of the shift register 522 clearing all stages of the shift register. Referring now to the AND circuit 556 in FIG. 4*d*, positive signals on the SEQ 1 and BC 3 lines render the AND circuit 556 effective to apply a positive pulse via the OR circuit 558 to the clear input line of the buffer address counter 564 resetting the counter to a count of 0 in preparation for receiving the message from the message buffer of the selected "FROM" device. Referring now to AND circuit 378 in FIG. 4*a*, positive signals on the XMIT POLL and the BC 3 lines render the AND circuit 378 effective to apply a positive signal via the OR circuit 382 to condition the AND circuit 384 so that, at TP6A time, a positive pulse is passed via the AND circuit 384 to the STEP SEQ CTR line to cause the sequence counter 314 to step from a count of 1 to a count of 2 producing a positive signal on the SEQ 2 line. The positive pulse from the AND circuit 384 is also applied via the OR circuit 304 to turn on the reset BC latch 306 which, in being turned on, applies a positive signal via the OR circuit 386 to the reset BC line causing the Byte Counter 308 to be reset to a count of 0 and producing a positive signal on the BC 0 line. Referring now to OR circuit 404 in FIG. 4*j*, the termination of the positive signal on the SEQ 1 line causes a negative signal to be applied to the XMIT POLL line and via the OR circuit 406 causes a negative signal to be applied to the XMIT MODE line. The negative signal on the XMIT MODE line is applied to decondition all the transmit AND circuits in the device adapters to inhibit further transmission from the control unit to any of the devices. The negative signal on the XMIT MODE line is also applied to the inverter 407 in FIG. 4*k* where it is inverted to a positive signal and applied to the REC MODE line which is connected to the receive AND circuits in all of the device adapters. However, for the assumed example of having selected device 2 as the "FROM" device, only AND circuits 614B in device adapter 1 is conditioned to receive information via the coax cable from the selected device 2.

The control unit has now completed the transfer of the 13 bit read poll control word to the selected "FROM" device and has switched to the receive mode awaiting reception of the contents of the message buffer of the selected "FROM" device. The selected "FROM" device receives the 13 bit read poll control word and decodes this word to detect that it is a control word and that a read poll operation is being called for. At the proper time, the selected "FROM" device begins transmitting the contents of its message buffer via the coax cable to the control unit. The data words are transmitted as 13 bit device data words having a format as shown in FIG. 2 in a serial-by-character, serial-by-bit fashion over the coax line connected to the Control Unit.

SEQUENCE 2 OPERATION

In the sequence 2 operation, the control unit receives 480 characters from the message buffer of the selected "FROM" device and loads them successively into the message buffer of the control unit.

SEQ 2/BC 0

During the period of this Byte count the first 12 bits of the first data word is received from the selected "FROM" device, parity checked and the first 11 bits are stored in the shift register 522 in preparation for shifting into the message buffer of the control unit.

Figure 6:
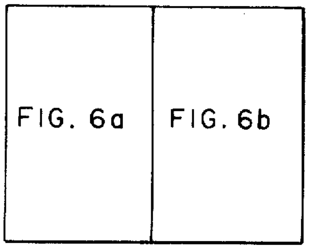
FIG. 6 illustrates how FIGS. 6*a* and 6*b* may be placed to form a composite timing diagram.
Figure 6A:
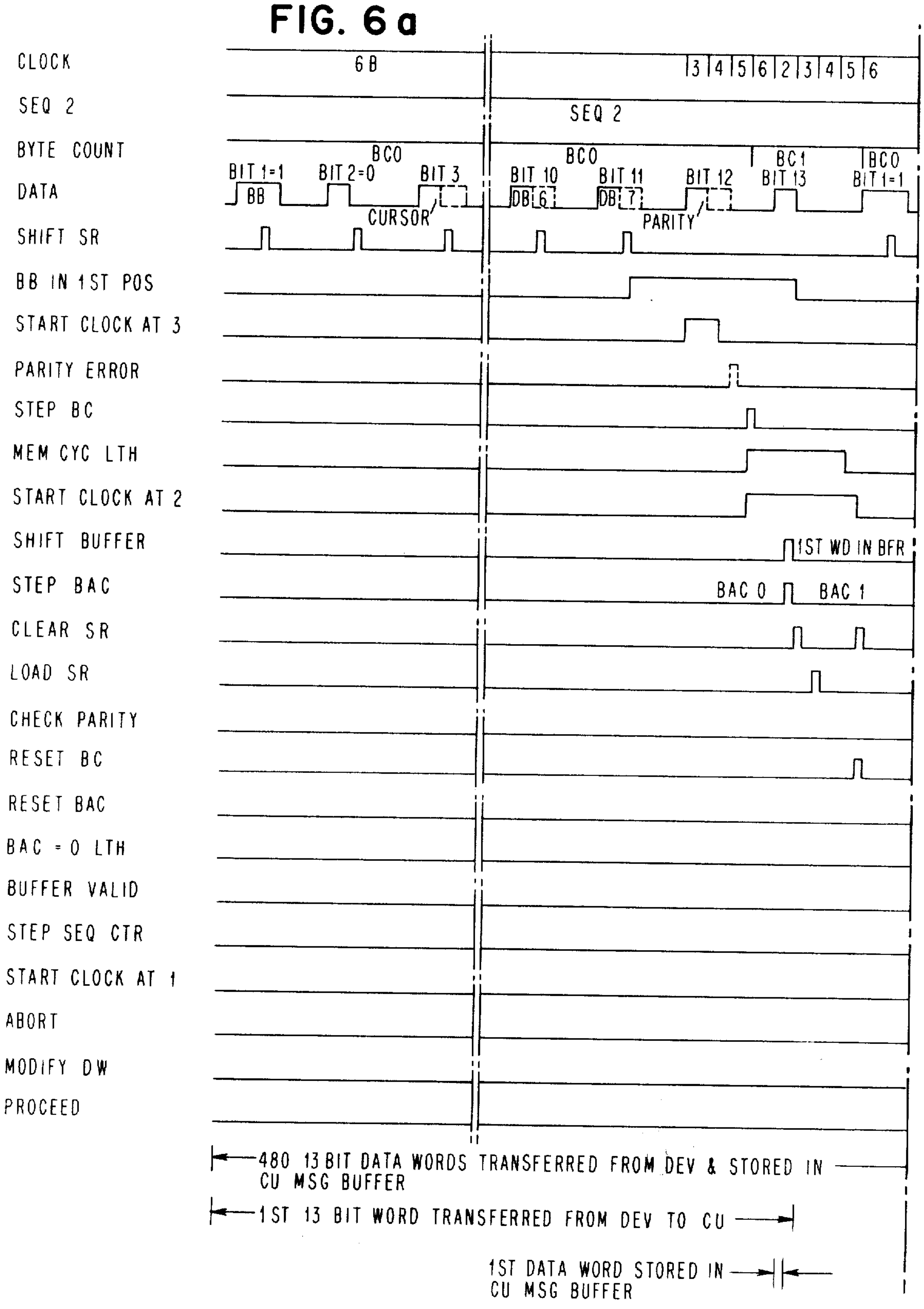
FIGS. 6*a* and 6*b*, taken together, comprise a timing diagram of a Sequence 2 and 3 operation.

Referring now to the Device Adapter 1 in FIG. 4*l* and the timing diagram of FIG. 6*a* and assuming device 2 is the selected "FROM" device, the busy bit of the first data word transmitted from the selected device 2 is applied to the drive/receive unit 612B where it is passed via the now conditioned AND circuit 614B and the OR circuit 524 in FIG. 4*l* to the AND circuit 464 in FIG. 4*k*. AND circuit 464 being conditioned by positive signals now present on the SEQ 2 and the BC 0 lines passes the busy bit to fire the 330ns single shot 466 causing a negative pulse to be applied to the single shot 468. AT the trailing edge of the negative pulse a positive shift is applied to fire the 50ns single shot 468 which, in turn, applies a positive pulse to the AND circuits 480. Since the shift register 522 was previously cleared, a 0 bit is present in the 1st stage of the shift register 522 and a negative signal is applied from the 1st stage to the inverter 472 where it is inverted to a positive signal to condition the AND circuit 480 to pass the positive pulse from the single shot 468 via the OR circuit 482 to the shift input of the shift register 522. The busy bit signal output of the ANd circuit 464 is also applied via the OR circuit 476 to condition the 11st stage of the shift register 522 so that at the trailing edge of the shift pulse the busy bit is shifted into the 11th stage of the shift register 522. Accordingly, in a similar manner, successive bits of the first data word from the selected "FROM" device are serially shifted into the shift register 522. It should be noted, however, that the period of the single shot 466 is chosen such that the shift pulse input to the shift register 522 occurs during the second half of a data 1 bit and subsequent to the occurrence of a data 0 bit as shown more clearly in the timing diagram of FIG. 6*a*. Thus, for example, when the second bit of the data word is received from the selected "FROM" device this bit always being a 0 bit to designate the word as a data word is again applied to the AND circuit 464 where it is passed to condition the 11th stage of the shift register 522. However, by the time the shift pulse is generated and applied to the shift input of the shift register 522 the second bit being a 0 bit has terminated and accordingly a 0 bit will effectively be entered into the 11th stage rather than a 1 bit.

Thus, it should be apparent that the shift pulse for the shift register 522 is initiated by the occurrence of a data bit input to the AND circuit 464 and the absence of a 1 bit in the 1st stage of the shift register 522.

The data bit output of the AND circuit 464 is also applied to the AND circuit 481 which is sampled by the positive pulse from the single shot 468. Because of the timing relationship of the data bit and the positive pulse output of the single shot 468, as described above, the positive pulse will pass via the AND circuit 481 only upon the occurrence of a data 1 bit and be applied to switch the Parity flip-flop 534 in FIG. 4*d*. Thus, it should be apparent that the Parity flip-flop 534 will be switched with every data 1 bit received thereby effectively generating a data word parity bit over the first 11 bits of a data word received from the selected "FROM" device.

After 11 bits of the first data word have been shifted into the shift register 522, the busy bit now appears in the first stage of the shift register 522 causing a positive signal to be applied to condition the AND circuit 470. When the 12th bit, i.e., the data word parity bit, is received from the selected "FROM" device, the single shot 466 is again fired and a positive pulse is now applied from the not output thereof and via the now conditioned AND circuit 470 and the OR circuit 402 in FIG. 4*k* to the start clock at 3 line to cause the clock 316 to start another cycle at TP3A time. At the same time, the single shot 466 applies a negative pulse to the single shot 468 and, at the trailing edge of the pulse, a positive shift is applied to fire the single shot 468 causing a positive pulse to be applied to the AND circuit 480. However, the AND circuit 480 is now deconditioned because of the presence of the busy bit in the 1st stage of the shift register 522 which applied a positive signal to the inverter 472 where it was inverted to a negative signal to decondition the AND circuit 480. Accordingly, no shift input pulse is applied to the shift register 522 and this data bit, i.e., data word parity bit, is not inserted into the shift register. However the parity bit output of the ANd circuit 464 is applied to the AND circuit 481 which is subsequently sampled by the positive pulse output of the single shot 468. If the parity bit is a 1 bit, AND circuit 481 will be conditioned to pass the positive pulse via the OR circuit 533 to switch the parity flip-flop 534. On the other hand, if the parity bit is a 0 bit, the parity bit will have been terminated by the time the positive pulse from the single shot 468 occurs inhibiting the AND circuit 481 from passing a switching pulse via the OR circuit 533 to the parity flip-flop 534. It should be apparent that if no error occurred in the data word transmission from the selected "FROM" device, then an odd number of 1's should have been received by the control unit and the parity flip-flop 534 should now be in an ON condition causing a negative signal to be applied via the $\overline{\text{PT ON}}$ line to decondition the AND circuit 590 in FIG. 4h, thereby inhibiting the production of a parity error signal via the OR circuit 592. On the other hand, if a parity error had occurred, then a positive signal would have been applied from the $\overline{\text{PT ON}}$ line to the AND circuit 590 which in combination with the positive signals from the SEQ 2 and BC 0 lines would condition the AND circuit 590 so that, at TP5A time, a positive pulse would be passed by the conditioned AND circuit 590 and the OR circuit 592 to the parity error line to turn on the parity error latch 630 to signal a parity error to the data processor. The positive pulse on the parity error line is also applied to the Timing Control circuit 343 in FIG. 4*a* where it is passed via the OR circuit 310 and 386 to the RESET SEQ CTR line and the RESET BC line, respectively, to reset the Sequence Counter 314 back to a count of 0 aborting the entire operation and to reset the Byte Counter 308 to a count of 0.

Referring now to the Timing Control circuit 343 in FIGS. 4a and 4*b*, positive signals on the SEQ 2 line and the BC 0 line condition the AND circuit 351 so that at TP6A time, a positive pulse is passed via the now conditioned AND circuit 351 and the OR circuit 356 to the AND circuit 358 which is conditioned by the not output of the reset BC latch 306. Consequently, the AND circuit 358 passes the positive pulse to the step BC line to step the byte counter from a count of 0 to a count of 1 causing a positive signal to be applied to the BC 1 line. The positive pulse output of the AND circuit 351 is also applied via the OR circuit 451 to reset the parity flip-flop 534 and via the OR circuit 434 to turn on the memory cycle latch 436.

SEQ 2/BC 1

During the period of this byte count, a message buffer data word is created from the data word received from the selected "FROM" device and stored in the 0 position of the Control Unit message buffer. Bits 2–10 of the message buffer data word are taken from stages 3–11 of the shift register 522, while a parity bit is generated from stages 4–11 of the shift register 522 and inserted as bit 1 of the message buffer data word.

Referring now to the Timing Control circuit 343, the input conditions to OR circuit 344 for generating a start clock at 1 signal are not present at this time and accordingly, the OR circuit 334 applies a negative signal to the inverter 390 where it is inverted to a positive signal which together with the positive signal on the SEQ 2 line conditions the AND circuit 396. When the positive signal occurs on the BC 1 line, it is passed via the now conditioned AND circuit 396 and the OR circuit 398 to the start clock at 2 line to cause the clock 316 to next cycle starting at TP2A time. Referring now to Timing and Control circuit 429 in FIG. 4*c*, the positive signal output of the memory cycle latch 436 is applied to condition the AND circuit 438 so that, at TP2B time, a positive pulse is passed via the AND circuit 438 to the shift line of the message buffer 600 and to one input of the AND circuit 562 in FIG. 4*d*. The positive signal on the shift input to the message buffer 600 causes the contents of stages 3–11 of the shift register 522 to be parallel transferred into the message buffer 600. Additionally, a parity generator 585 consisting of a plurality of exclusive OR circuits 570–582 and inverter 584 generates a parity bit over the bits in stages 4–11 of the shift register 522 which is also loaded into the message buffer 600. When the first data word of the input message is loaded into the message buffer 600, the last data word of a previous message appears at the output of the message buffer 600 and is applied via the output bus 601 to one input of each of the AND circuits 486.

Since the buffer address counter is presently standing at a count of 0, the buffer address decoder 566 applies a negative signal via the BAC 479 line to the inverter 560 where it is inverted to a positive signal to condition the AND circuit 562. Accordingly, at TP2A time, the positive pulse from the AND circuit 438 is now passed via the conditioned AND circuit 562 to apply a positive signal to step the buffer address counter 464 to a count of 1. The Buffer Address Decoder 566 detects this condition and applies a positive signal via the BAC 1 line to reset the BAC 0 latch 594 producing negative and positive signals on the BAC 0 and $\overline{\text{BAC 0}}$ lines, respectively. At TP3A time, a positive pulse is applied via the AND circuit 490, which is conditioned by the positive signal output of the memory cycle latch 436, and the OR circuit 452 to the clear input of the shift register 522 clearing the register of the first data word received from the selected "FROM" device. At TP4A time, a positive pulse is applied via the AND circuit 442 which is conditioned by the positive signal output from the memory cycle latch 436, and the OR circuit 462 to render the AND circuits 486 effective to pass the last data word of a previous message from the output of the message buffer 600 to the shift register 522. At TP5B time, a positive pulse is applied to reset the memory cycle latch 436. Referring now to the Timing and Control circuit 429 in FIG. 4*c*, positive signals on the SEQ 2 and BC 1 $\overline{\text{BAC 0}}$ lines condition the AND circuit 446 so that, at TP6A time, a positive pulse is passed via the conditioned AND circuit 446 and the OR circuit 452 to the clear input of the shift register 522 clearing the shift register of the data word of a previous message presently stored in the shift register 522 in preparation for receiving the next data word transmitted from the selected "FROM" device. The positive pulse output of the AND circuit 446 is also applied via the OR circuit 451 to reset the parity of flip-flop 534 in preparation for checking the next data word transmitted from the selected "FROM" device. Referring now to the Timing Control circuit 343 in FIGS. 4*a* and 4*b*, a positive pulse from the AND circuit 446 is also applied via the OR circuit 304 to turn on the reset BC latch 306 which, in being turned on, applies a positive signal via the OR circuit 386 to the reset BC line to cause the Byte Counter 308 to be reset by a byte count of 0 producing a positive signal on the BC 0 line. At TP6B time, a positive pulse is applied to reset the reset BC latch 306. In a similar manner, the Control Unit goes through succeeding BC 0 and BC 1 cycles, as described above, causing each succeeding data word received from the selected "FROM" device to be parity checked and then loaded as a message buffer data word into successive positions of the message buffer 600.

SEQ 2/BC 2

Now, let it be assumed that 479 data words of the device message have been received and loaded into the control unit message buffer 600 and that the 480th data word is presently stored in the shift register 522 awaiting transfer to the message buffer 600. At this time, the Buffer Address Counter 564 will be standing at a count of 479 which condition will be detected by the Buffer Address Decoder 566 to produce a positive signal on the BAC 479 line. Accordingly, at BC 1 time of the 480th word cycle, referring to the Timing and Control circuit 429 in FIG. 4c, and the timing diagram of FIG. 6*b*, the memory cycle latch 436 being turned on applied a positive signal to condition the AND circuits 438, 440, 442 and 444. At TP2B time, a positive pulse is passed via the now conditioned AND circuit 438 to the shift input line of the message buffer 500 causing the 480th data word to be loaded into the message buffer 600 and providing the 1st data word of the device message at the output thereof. The positive pulse output of the AND circuit 438 is also applied to the AND circuit 562 in the BAC control circuit 553 in FIG. 4*d*. The positive signal on the BAC 479 line is applied to the inverter 560 where it is inverted to a negative signal to decondition the AND circuit 562 thereby inhibiting the passage of the positive pulses from the AND circuit 438 and the stepping of the Buffer Address Counter 564. The positive pulse output of the AND circuit 438 is also passed via the AND circuit 568, which is conditioned by the positive signal on the BAC 469 line, and the OR circuit 558 to the reset input line of the Buffer Address Counter 564 to reset the counter to a count of 0 and also to turn on the BAC 0 latch 584. After the Buffer Address Counter 564 resets to a count of 0, the Buffer Address Decoder 566 detects this condition and now causes a negative signal to be applied to the BAC 479 line. Referring now to the Timing and Control circuit 429 in FIG. 4c, at Tp3A time, a positive pulse is passed via the now conditioned AND circuit 440 and the OR circuit 452 to the clear input line of the shift register 522 to clear the register of the 480th character presently stored in the shift register. At TP4A time, a positive pulse is passed via the now conditioned ANd circuit 442 and the OR circuit 462 to render the ANd circuits 486 in FIG. 4g effective to pass the first data word of the device message on the data bus 601 into the shift register 522. Referring now to the BAC control circuit 553 in FIG. 4*d*, positive signals on the BC 1 SEQ 2 and the REC MODE lines are applied to condition the AND circuit 596 so that, at TP4A time, a positive pulse is applied via the conditioned AND circuit 596 to turn on the Buffer Valid latch 598 indicating that the message buffer 600 has been validly loaded with the device message and via the OR circuit 350 in FIG. 4e to turn off the I/O reg loaded latch 330. Parity bit Generator and Check circuit 585 senses positions 4–11 of the shift register 522 to generate a parity bit which is compared with the parity bit in stage 2 of the shift register by the exclusive OR circuit 586 and if the parity bits do not match, a positive signal is applied to condition the AND circuit 588. Referring now to the Timing and Control circuit 429 in FIG. 4*c*, positive signals from the Memory Cycle latch 436 and the Buffer Valid latch 598 are applied to condition the AND circuit 444 so that, at TP5A time, a positive pulse is passed via the AND circuit 444 to the AND circuit 588 in the Parity bit Generator and Check circuit 585 in FIG. 4*h*. If the AND circuit 588 is conditioned by a parity error in the shift register 522, a positive signal is passed by the AND circuit 588 and via the OR circuit 592 to signal a parity error. If no parity error had been detected, AND circuit 588 would be deconditioned to block passage of the pulse from the AND circuit 444 and thereby inhibit producing a parity error signal. At TP5B time, a positive pulse is applied to reset the memory cycle latch 436.

Referring now to the Timing Control circuit 343 in FIGS. 4*a* and 4*b*, positive signals on the SEQ 2 line and from the Buffer Valid latch 598 render the AND circuit 380 effective to apply a positive signal via the OR circuit 382 to condition the AND circuit 384. Accordingly, at TP6A time, a positive pulse is passed via the now conditioned AND circuit 384 to the STEP SEQ CTR line to cause the sequence counter 314 to step from a count of 2 to a count of 3 causing a positive signal to be produced on the SEQ 3 line. The positive pulse from the AND circuit 384 is also passed via the OR circuit 304 to turn on the reset BC latch 306 which in being turned on applies a positive signal via the OR circuit 386 to the reset BC line to cause the Byte Counter 308 to be reset to a count of 0 producing a positive signal on the BC 0 line. Referring now to the Field Modifier circuit 409 in FIG. 4*f*, assuming that the device message is a formatted message such that the first data word presently in the shift register is an attribute word, a positive signal from the 4th stage of the shift register, indicating the presence of the attribute word, is applied to condition the AND circuit 416 so that, at TP6A time, a positive pulse is passed via the now conditioned AND circuit 416 to reset the Clear This Field latch 426.

SEQUENCE 3 OPERATION

In the sequence 3 operation, the first data word of the device message is checked to determine whether the device message is a protected message, i.e., one which cannot be copied to another device. This is accomplished by examining the first data word of the device message presently stored in the shift register and determining whether it is an attribute word and if it is, then determining whether it is a protected alphanumeric message or not as indicated by bits 5 and 6 of the attribute word. If the message is a protected alphanumeric message, then the operation is immediately aborted, the data processor is signalled to indicate this condition and the sequence counter is reset. If the message is not a protected alphanumeric message, then the contents of the message buffer is recycled through the shift register where it may be altered or not in accordance with the copy control character CCC presently stored in the CCC register and placed back in the message buffer. If the message is not a protected alphanumeric message but is a formatted message, i.e., one in which word fields are separated by attribute words, then the word fields are modified in accordance with bits 7 and 8 of the CCC. If bits 7,8 of the CCC are equal to 0,0 then all protected or unprotected words of a field are changed to null words so that only attribute words will effectively be transmitted to the selected "TO" device. If bits 7,8 of the CCC are equal to 0,1 then only protected fields are modified to null words and unprotected fields are not modified so that only attribute words and unprotected fields will effectively be transmitted to the selected "TO" device. If bits 7,8 of the CCC are equal to 1,0 then only unprotected fields are modified to null words and protected fields are not modified so that only attribute words and protected fields will effectively be transmitted to the selected "TO" device. If bits 7,8 of the CCC are equal to 1,1 then no fields are modified to null words so that the entire unmodified contents of the message buffer is transferred to the selected "TO" device. If the message is not a protected alphanumeric message and is not a formatted message, i.e., no attribute words are present in the message, then the entire contents of the message buffer, unmodified, is transmitted to the selected "TO" device.

Referring now to the CCC register 342, let it be assumed that bits 7,8 are equal to 0,0 indicating that only attribute words are to be transmitted from the message buffer to the selected "TO" device. Accordingly, CCC decoder 408 decodes these bits and produces a positive signal on the ATB only line which is applied via OR circuits 410 and 412 to one input of the AND circuits 420 and 422. Assuming that the device message is a formatted message, the first data word presently stored in the shift register 522 is an attribute word and the 4th stage of the shift register will contain a 1 bit indicating the presence of an attribute character. Accordingly, a positive signal will be applied from the 4th stage of the shift register to condition the AND circuit 414. Additionally, since the attribute word is present in the shift register 522, the 6th stage of the shift register will contain an indication of whether the field is an unprotected field or a protected field, i.e., stage 6 contains a 0 bit if it is an unprotected field or a 1 bit if is a protected field. Thus, if the field is indicated as being unprotected, a negative signal is applied from the 6th stage to decondition the AND circuit 422 and to the inverter 418 where it is inverted to a positive signal to condition the AND circuit 420. On the other hand, if the field is indicated as a protected field, then a positive signal is applied to condition the AND circuit 422 and via the inverter 418 is inverted to a negative signal to decondition the AND circuit 420. At TP6B time, a positive pulse is passed via the AND circuit 414 and one of the AND circuits 420 or 422 depending on whether the field has been indicated as being unprotected or protected, and via the OR circuit 424 to turn on the Clear This Field latch 426 which, in being turned on, applies a positive signal to one input of the AND circuit 428. Thus, it should be apparent that when the CCC designates that only attribute words are to be copied that the Clear This Field latch will be turned on regardless of whether a field is protected or unprotected. This will cause null words to be inserted in all fields regardless of whether they are protected or unprotected so that subsequently only attribute words will be effectively transmitted from the control unit message buffer to the selected "TO" device, as will be explained in greater detail hereinafter.

If bits 7,8 of the CCC are equal to 0, 1 indicating that only attribute words and unprotected words are to be transferred from the control unit message buffer to the selected "TO" device then it will be necessary to modify all protected fields by inserting null words in such fields. Accordingly, when the CCC Decoder 408 decodes this condition, a positive signal is applied via the ATB & UNPROT line and the OR circuit 412 to one input of the AND circuit 422. Also, if the attribute word presently stored in the shift register 522 contains a 1 bit in the 6th stage indicating that the succeeding field is a protected field, a positive signal is applied from the 6th stage to condition the AND circuit 422. At TP6B time, a positive pulse is passed via the AND circuit 414, which is conditioned by a positive signal from the 4th stage of the shift register 522 indicating the presence of an attribute word, and via the now conditioned AND circuit 422 and the OR circuit 424 to turn on the Clear This Field latch 426 applying a positive signal to one input of the AND circuit 428. It should be apparent therefore that whenever the CCC indicates that only attribute bytes and unprotected words are to be transmitted from the control unit message buffer to the selected "TO" device, that the Clear This Field latch will be turned on whenever an attribute word is detected as being present in the shift register 522 and it is indicated as being a protected field. This will cause all words of protected fields to be modified to null words so that only attribute words and unprotected words are effectively transmitted from the control unit message buffer to the selected "TO" device as will be explained in greater detail hereinafter.

In a similar fashion, if bits 7,8 of the CCC are equal to 1,0 then it indicates that only attribute words and protected words are to be transmitted from the control unit message buffer to the selected "TO" device. Under the condition, it is necessary to modify the words of unprotected fields to null words so that only attribute words and protected words are effectively transmitted from the control unit message buffer to the selected "TO" device. Thus, if the CCC indicates that only attribute words and protected fields are to be transmitted, a positive signal is applied via the ATB & PROT line via the OR circuit 410 to one input of the AND circuit 420. If bit 6 of the attribute word presently stored in the shift register 522 indicates the field as being an unprotected field, a negative signal is applied from this stage to the inverter 418 where it is inverted to a positive signal to condition the AND circuit 240. At TP6B time, a positive pulse is applied to the AND circuit 414 which is conditioned by a positive signal from the 4th stage of the attribute word in the shift register 522 indicating that the data word presently stored in the shift register is an attribute word. The positive pulse from the AND circuit 414 is passed via the now conditioned AND circuit 420 and OR circuit 424 to turn on the Clear This Field latch 426 which, in being turned on, applies a positive signal to one input of the AND circuit 428. Thus, it should be apparent that every time a attribute word is stored in a shift register 522 this condition is detected and all fields indicated as being unprotected will cause the Clear This field latch 426 to be turned on and cause all words in the unprotected field to be modified to null words as will be explained in greater detail hereinafter.

If bits 7,8 of the copy control character are equal to 1,1 this condition will be detected by the copy control decoder 408 to inhibit producing any positive signals on any of the output lines from the decoder. Accordingly, the AND circuits 420 and 422 will both be inhibited so that when an attribute word is detected as being in the shift register 522 it will condition AND circuit 414 to permit a positive pulse to be passed therethrough at TP6B time but this pulse will not be passed via either of the AND circuits 420 or 422 and accordingly the Clear This Field latch 426 will remain in a reset condition producing a negative signal at one input of the AND circuit 428. This will prevent modifying any of the fields of the message and accordingly the entire message in unmodified form will be transferred from the control unit message buffer to the selected "TO" device.

SEQ 3/BC 0

Figure 6B:
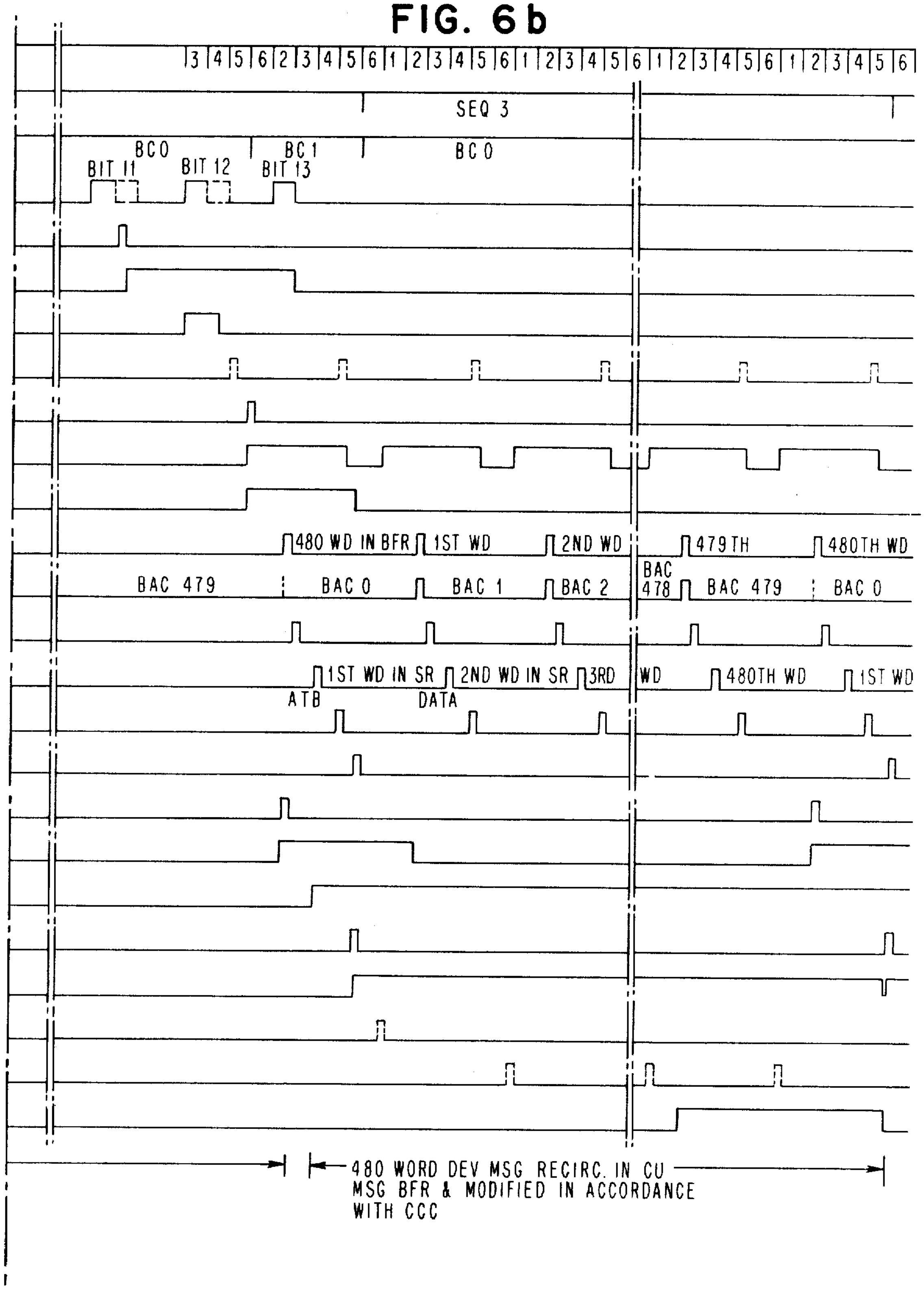

Referring to the Timing Control circuit in FIGS. 4*a* and 4*b* and the timing diagram of FIG. 6*b*, the positive signal on the SEQ 3 line is passed via the OR circuit 334 to the Start Clock at 1 line to cause the Clock 316 to start operating at TP1A time. Since a positive signal is maintained in the SEQ 3 line during the entire sequence 3 operation, the clock will keep recycling starting at 1A time at the beginning of each cycle. Referring now to AND circuit 632 in FIG. 4*f*, if the first data word of a device message indicates that the message is a protected alphanumeric message, then the first data word presently stored in the shift register 522 will be an attribute word as indicated by the presence of a 1 bit in the 4th stage of the shift register and that it is protected, as indicated by the presence of a 1 bit present in the 6th stage of the shift register and that it is alphanumeric, indicated by the presence of a 0 bit in the 7th stage of the shift register 522. Positive signals from the 4th and 6th stages are applied to inputs of the AND circuits 632 while the negative signal from the 7th stage is applied to inverter 631 where it is inverted to a positive signal and applied as an input to the AND circuit 632. Additionally, since this is the first data word of the message, a positive signal is applied via the BAC 0 line as another input to the AND circuit 632 so that at SEQ 3 time, a positive signal is applied to condition the AND circuit 632. At TP1A time, a positive pulse is passed via the now conditioned AND circuit 632 to turn on the "FROM" device locked latch 635 in FIG. 4*e* to signal the data processor that an attempt has been made to copy a message from a protected device. The positive pulse output of the AND circuit 632 is also applied to the Timing Control circuit 343 in FIG. 4*a*, where it is passed via the OR circuit 310 to the RESET SEQ CTR line to reset the Sequence Counter 314 back to a count of 0 aborting the entire operation. It should be noted, however, that if the first data word of the device message is not an attribute word or if it is an attribute word that does not designate a protected message then a copy of the message may be transferred to the selected "TO" device.

Referring now to the Timing and Control circuits 429 in FIG. 4*c*, a positive signal on the SEQ 3 line is applied to condition the AND circuit 432 so that, at TP1A time, a positive pulse is passed via the now conditioned AND circuit and via the OR circuit 434 to turn on the memory cycle latch 436 which, in being turned on, conditions the AND circuits 438, 440, 442 and 444. At TP2B time, a positive pulse is passed via the now conditioned AND circuit 438 to the shift input of the message buffer 600 and to the AND circuit 562 of the BAC Control circuit 553 in FIG. 4*d*. Accordingly, the data word, i.e., the first data word, presently in the shift register 522 is shifted into the message buffer 600 making available at its output the 2nd data word of the device message. Since the Buffer Address Count 564 is not at a count of 479, a negative signal is applied via the BAC 479 line output of the Buffer Address Decoder 566 to the inverter 560 where it is inverted to a positive signal to condition the AND circuit 562 so that the positive pulse on the shift line is passed via the AND circuit 562 to step the Buffer Address Counter 564 to a count of 1. The Buffer Address Decoder 566 detects this condition and applies a positive signal via the BAC 1 line to reset the BAC 0 latch 594. At TP3A time, a positive pulse is passed via the conditioned AND circuit 440 and the OR circuit 452 to the clear input of the shift register 522 clearing the 1st data word out of the shift register in preparation for receiving the 2nd data word of the device message presently at the output of the message buffer 600. At TP4A time, a positive pulse is passed via the conditioned AND circuit 442 and the OR circuit 462 to enable the AND circuits 486 to pass the 2nd word of the device message into the shift register 522. The parity bit generator 585 senses the bits in stages 4–11 and generates a parity bit in accordance with the 2nd data word present in the shift register 522 and compares this generated parity bit with the parity bit in stage 2 of the shift register and conditions AND circuit 588 or not in accordance with the comparison of the two parity bits. At TP5A time, a positive pulse is passed via the AND circuit 444, which is not conditioned by positive signals from the Memory Cycle latch 436 and the Buffer Valid latch 598, to the AND circuit 588 which is conditioned or not in accordance with the parity check to produce or not a parity error signal via the output of the OR circuit 592.

Referring now to the Field Modifier circuit 409 in FIG. 4*f*, let it be assumed that the device message is a formatted message so that the 2nd data word of the message will be the 1st data word following the 1st attribute word of the device message. Accordingly, the 4th stage of the shift register 522 will contain a 0 bit, indicating the presence of a data word, and cause a negative signal to be applied to decondition both of the AND circuits 414 and 416. AND circuit 414 in being deconditioned maintains a negative signal to decondition the AND circuits 420 and 422. At TP6A time, a positive pulse is applied to the deconditioned AND circuit 416 which in turn is prevented from resetting the Clear This Field latch 426. As a matter of fact, it should be apparent that the latch 426 will remain in its present condition during this entire field and until the next attribute word is received in the shift register which will permit the conditioning of the AND circuit 416 to reset the latch in preparation for modifying the next successive field. At TP6B time, a positive pulse is applied to the deconditioned AND circuit 414 and accordingly will not pass this AND circuit and be effective to turn on the Clear This Field latch 426. Accordingly, it should further be apparent that so long as an attribute word is not present in the shift register 522, no change will be effected in the status of the Clear This Field latch 426 until such time as the next attribute word is detected in the shift register 522. Referring now to AND circuit 428, a positive signal is applied via the SEQ 3 line to one input of the AND circuit 428. Also, since the 2nd data word of the message is presently in the shift register 522, a 0 bit is present in the 4th stage, indicating that the word containing data and is not an attribute word, causing a negative signal to be applied to inverter 427 where it is inverted to a positive signal and applied to a second input of the AND circuit 428. Additionally, if the CCC had indicated that this field is to be cleared, the Clear This Field latch 426 would have been turned on, in the manner previously described, to apply a positive signal to a third input of the AND circuit 428 conditioning the AND circuit to be responsive to a positive pulse on the remaining input at TP1A time. Accordingly, the positive pulse output of the AND circuit 428 is applied to reset the 4th–11th stages of the shift register 522 thereby effectively inserting a null word into the shift register 522. The positive pulse output of the AND circuit 428 is also applied via the OR circuit 507 to turn on the 2nd stage of the shift register to effectively enter a 1 bit in the parity bit position of the modified data word. On the other hand, if the CCC had not caused the Clear This Field latch 426 to be turned on, a negative signal would be applied to decondition the AND circuit 428 and inhibit the passage of the positive pulse on the TP1A line. Therefore, the data word in the shift register would remain unmodified.

In a similar manner to that described above, the following events occur. At TP1A time, the memory cycle latch 436 is turned on to initiate another memory cycle. At TP2B time, the message buffer 600 is shifted one position to cause the 2nd word to be loaded into the message buffer and to make available at the output thereof the 3rd word of the device message and the Buffer Address Counter is stepped to a count of 2. At TP3A time, the shift register 522 is cleared and at Tp4A time, the 3rd word of the device message is loaded into the shift register 522 and a parity check is made of this word. At TP5A time, if there had been a parity error, a parity error signal would be produced. At TP5B time, the memory cycle latch 436 is reset. At TP6A time, the Field Modifier circuit 409 detects whether the 3rd word of the device message is an attribute word or not and if it is, the Clear This Field latch is reset; otherwise, no change is made in the status of this latch. At TP6B time, the Field Modifier circuit 408 senses the output of the CCC Decoder 408 and if the word presently in the shift register 522 is an attribute word will turn on or not the Clear This Field latch 426 in accordance with the output of the CCC Decoder 408 and the contents of the attribute word that may be stored in the shift register 522. If the data word in the shift register is not an attribute word, no change is made in the status of the Clear This Field latch 426 so that at TP1A time of the next cycle if a data word is in the shift register 522, it is modified to a null word or not in accordance with the state of the Clear This Field latch 426. In a similar manner as each word of the device message is read out of the message buffer 600 and inserted into the shaft register 522, it is examined and modified or not in accordance with the CCC presently stored in the CCC register 342 and the attribute word preceding each field of data.

Now, let it be assumed that the 479th word of the device message has been shifted back into the message buffer 600 and the Buffer Address Counter 564 is stepped to a count of 479 which would occur at TP2B time. This condition is detected by the Buffer Address Decoder 566 which produces a positive signal on the BAC 479 line which is applied to the Timing Control circuit 343 in FIG. 4*a* to turn on the Proceed latch 372. The Proceed latch 372 in being turned on applies a positive signal to one input of the AND circuit 370. Returning to the Timing and Control circuit 429 in FIG. 4*c*, at TP3A time, a positive pulse passes via the AND circuit 440 and the OR circuit 452 to clear the 479th data word out of the shift register 522. At TP4A time, a positive pulse is passed via the AND circuit 442 and the OR circuit 462 in FIG. 4*c* to render the AND circuits 486 effective to load the 480th word, presently at the output of the message buffer 600, into the shift register 522. At TP5A time, a positive pulse from the AND circuit 444 is applied to the AND circuit 588 in FIG. 4*h* to make a parity check of the 480th word and a parity error signal is produced if a parity error is detected. At TP5B time, a positive pulse is applied to reset the memory cycle latch 436.

At the next TP1A time, the AND circuit 428 of the Field Modifier circuit 409 in FIG. 4*f* detects the presence of a data word in the shift register 522 and modifies the 480th word depending on the state of the Clear This Field latch 426 to insert or not a null word into the shift register 522. Also, at TP1A time, in the Timing and Control circuit 429 of FIG. 4*c*, a positive pulse is applied via the AND circuit 432 and OR circuit 434 to turn on the memory cycle latch 436 to initiate another memory cycle to cause the 480th word to be loaded back into the message buffer 600. Since the Buffer Address Counter 564 in FIG. 4d is presently standing at a count of 479, the Buffer Address Decoder 566 detects this condition and applies a positive signal via the BAC 479 line to the inverter 560 where it is inverted to a negative signal to decondition the AND circuit 562 and block further stepping of the Buffer Address Counter 564. The positive signal on the BAC 479 line is also applied to condition the AND circuit 568 so that, at TP2B time, a positive pulse is passed via the conditioned AND circuit 438 in FIG. 4c and the now conditioned AND circuit 568 in FIG. 4d and via the OR circuit 558 to reset the Buffer Address Counter 564 to a count of 0 and to turn on the BAC 0 latch 594. At TP3A time, a positive pulse is passed via the AND circuit 440 and the OR circuit 452 to the clear input of the shift register 522 to effectively clear the 480th data word out of the shift register 522. At TP4A time, a positive pulse is passed via the AND circuit 442 and the OR circuit 462 in FIG. 4c to render the AND circuits 486 effective to load the first word of the device message which is presently at the output of the message buffer 600 into the shift register 522. The word is parity checked and at TP5A time, a determination is made as to whether there was a parity error or not. At tP5B time, a positive pulse is again applied to reset the memory cycle latch 436.

Referring now to the Timing Control circuit 343 in FIGS. 4a and 4b, positive signals from the BAC 0 latch 594 and the Proceed latch 372 together with the positive signal on the SEQ 3 line render the AND circuit 370 effective to apply a positive signal via the OR circuit 382 to condition the AND cicuit 384. At TP6A time, a positive pulse is passed via the now conditioned AND circuit 384 to the STEP SEQ CTR line to cause the sequence counter 314 to step from a count of 3 to a count of 4 producing a positive signal on the SEQ 4 line. The positive pulse from the AND circuit 384 is also applied via the OR circuit 304 to turn on the reset BC latch 306 which in being turned on applies a positive signal via the OR circuit 386 to the reset BC line to cause the Byte Counter 308 to be reset to a count of 0 producing a positive signal on the BC 0 line.

SEQUENCE 4 OPERATION

In the sequence 4 operation, the control unit is switched to a transmit mode of operation and a 13 bit write poll word is created and transferred from the control unit to the selected "TO" device to signal the device to prepare for the reception of the "FROM" device message presently stored in the control unit message buffer. The selected "TO" device upon receiving the write poll word detects that it is a control word and that a write operation is to be performed. Accordingly, the device switches to the receive mode of operation and prepares to receive the message to be transmitted from the control unit message buffer to the selected "TO" device.

SEQ 4/BC 0

During the period of this Byte Count, the Control Unit is switched to a transmit mode of operation and a write poll control word is created and loaded into the shift register for transmission to the selected "TO" device. Device addressing is now taken from the address register which contains the address of the selected "TO" device and transmission of the control word begins by causing the shift register to be shifted out and a 1 bit inserted in the last stage for subsequent indication as to when the contents of the shift register has been shifted out.

Figure 7A:
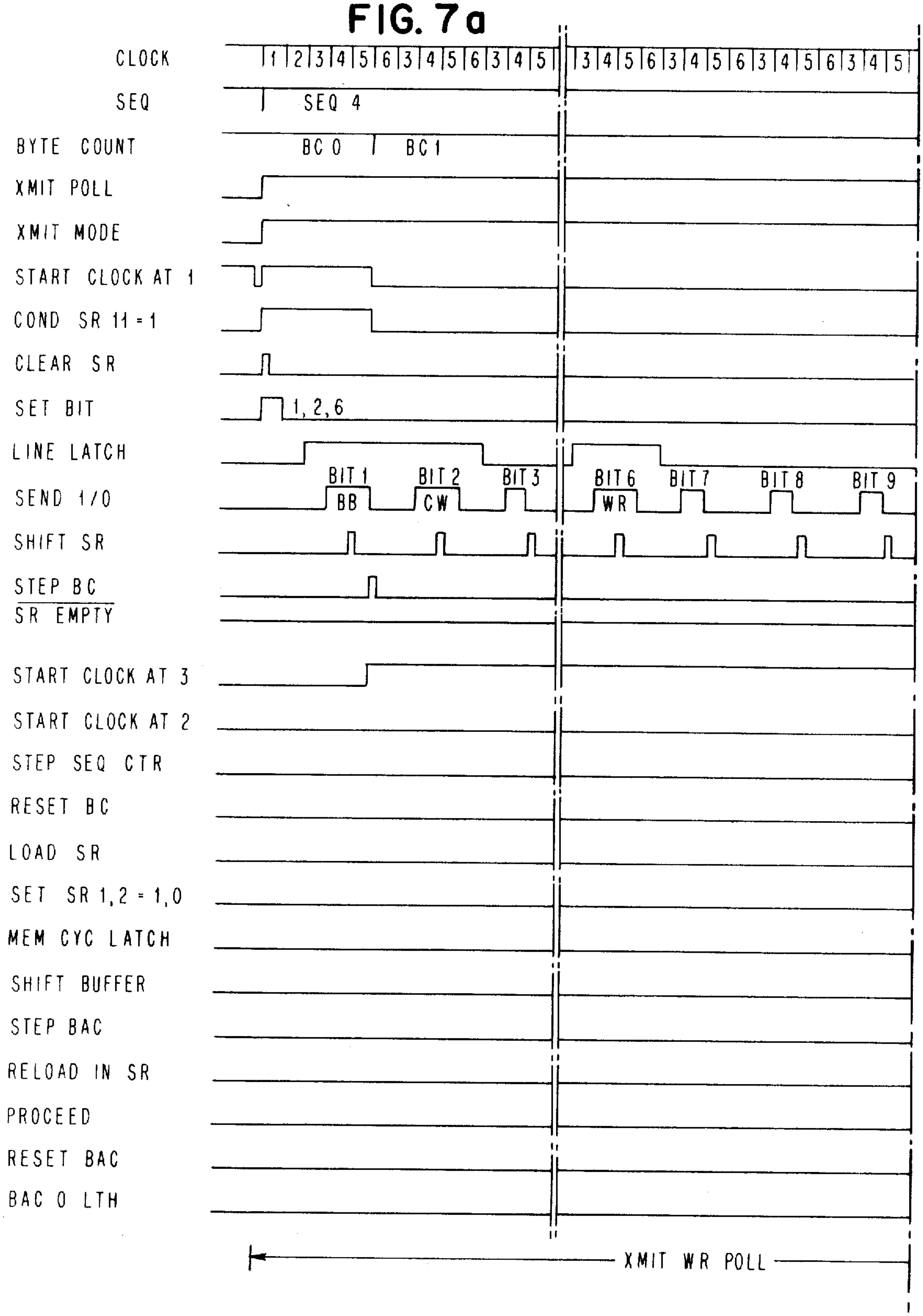
FIGS. 7*a* through 7*e*, taken together, comprise a timing diagram of a Sequence 4, 5 and 6 operation.
Figure 7B:
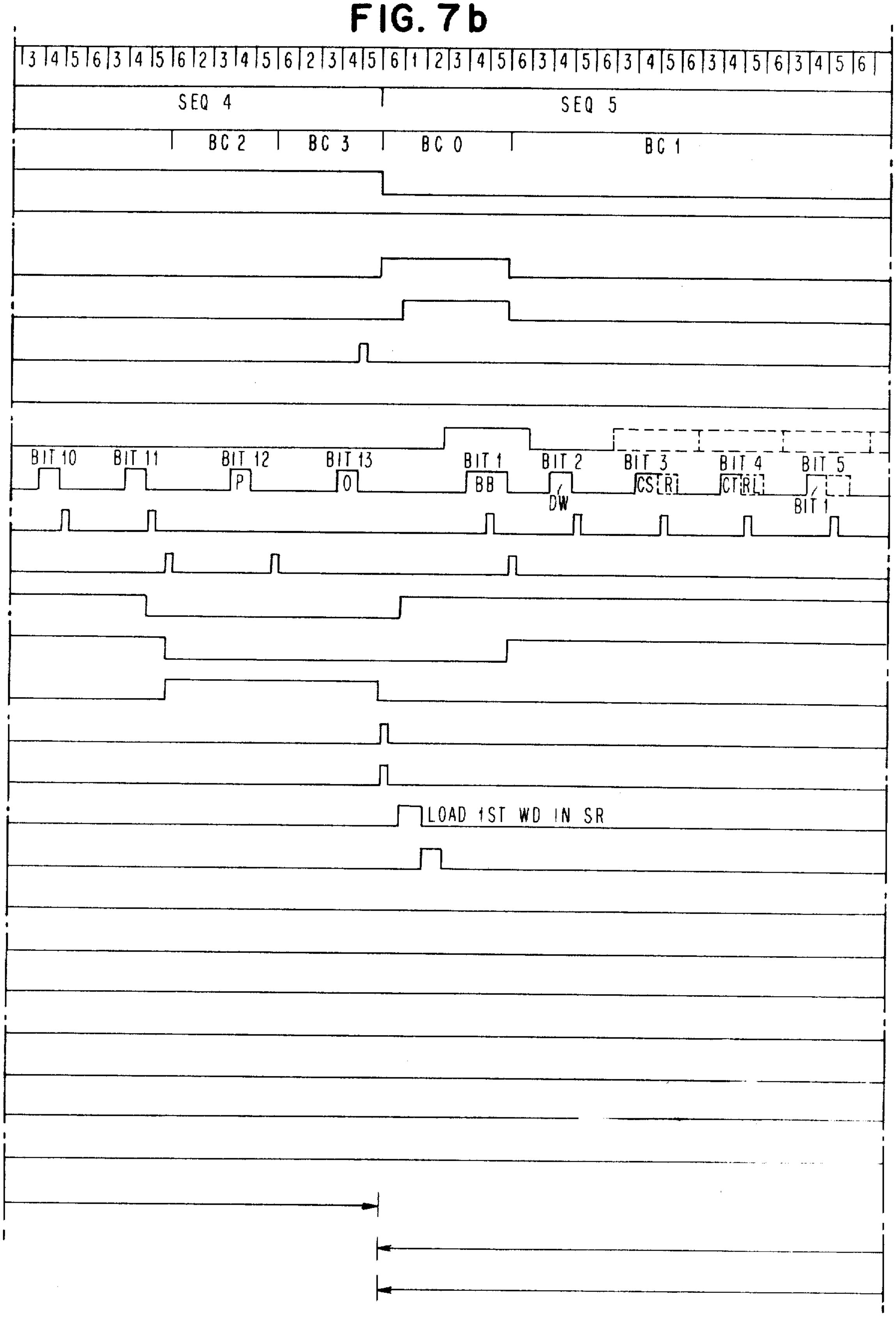

Referring now to FIG. 4k and the timing diagram of FIG. 7a, the positive signal on the SEQ 4 line is passed via the OR circuit 404 to the XMIT POLL line and via the OR circuit 406 to the XMIT MODE line to effectively condition the Control Unit for a transmit operation. Referring now to the Timing Control circuit 343 in FIGS. 4a and 4b, the positive signal on the XMIT MODE line is passed via the OR circuit 334 to the start clock at 1 line to cause the clock 316 to start operating at TP1A time. Referring now to the Timing and Control circuit 429 in FIG. 4c, positive signals on the XMIT MODE line, the BC 0 line and the negative signal on the SEQ 5 line applied to inverter 449 where it is inverted to a positive signal condition the AND circuit 450. AT TP1A time, a positive pulse is passed via the now conditioned AND circuit 450 and the OR circuit 452 to the clear input line of the shift register 522 to clear the data word, i.e., the 1st data word, presently stored in the shift register. Referring now to FIG. 4f, the positive signal on the BC 0 line conditions the AND circuit 454 so that, at TP1 time, a positive pulse passes via this AND circuit to the AND circuits 490 and 496 which are conditioned by positive signals on the XMIT POLL and SEQ 4 lines, respectively. The positive pulse from the AND circuit 490 is applied to turn on the 1st stage of the shift register 522 and via the OR circuit 506 the 2nd stage of the shift register 522 and thereby enter a 1 bit in the 1st and 2nd bit positions indicating the presence of a busy bit and a control word bit. The positive pulse from the AND circuit 496 is passed via the OR circuit 512 to turn on the 6th stage of the shift register 522 and thereby enter a 1 bit in the 6th bit position indicating the presence of a write poll. Accordingly, referring to the format of the control word 1, in FIG. 2, a 1 bit is now present in the BB bit position, in the CW bit position and the WR bit position of the shift register 522 thereby creating a write poll control word to be transmitted to the selected "TO" device.

It will be remembered that at the end of the sequence 2 operation, after the device message had been transferred from the selected "FROM" device to the control unit message buffer 600, a positive pulse was applied to turn on the Buffer Valid latch 598 and via the OR circuit 350 in FIG. 4e to turn off the I/O reg loaded latch 330. The I/O reg loaded latch 330 in being turned off applies a negative signal to decondition the AND circuit 360 in FIG. 4j which, in being deconditioned, applies a negative signal to the Gate "FROM" ADR line to inhibit the AND circuit 362 and via the inverter 364 where it is inverted to a positive signal to Gate "TO" ADR line to condition the AND circuit 366. As a result of this switching operation, the "FROM" device address presently stored in the I/O register 328 is blocked from being applied via the AND circuit 362 and the OR circuit 368 to the device address bus. Now, however, with the AND circuit 366 conditioned, the "TO" device address presently stored in the address register 302 is passed via the conditioned AND circuit 366 and the OR circuit 368 to the device address bus. The device address decoder 608 in the appropriate device adapter will decode this address and condition the appropriate logic associated with the coax line connected to the selected "TO" device so that the generated control word will now be transmitted over the coax line to the selected "TO" device. The transmission of this control word from the control unit to the now selected "TO" device is exactly the same as that previously described in connection with the sequence 1 operation and therefore reference may be made to that description for the details of transmitting a control word from the control unit to the now selected "TO" device.

Referring now to the Timing Control circuit 343 in FIGS. 4*a* and 4*b*, at the end of the sequence 4 operation, when the Byte Counter 308 steps to a count of 3, positive signals on the XMIT POLL line and the BC 3 line render the AND circuit 378 effective to apply a positive signal via the OR circuit 382 to condition the AND circuit 384. At TP6A time, a positive pulse is passed via the now conditioned AND circuit 384 to the STEP SEQ CTR line to step the sequence counter 314 from a count of 4 to a count of 5 causing a positive signal to be applied to the SEQ 5 line. The positive pulse from the AND circuit 384 is also applied via the OR circuit 304 to turn on the reset BC latch 306 which in being turned on applies a positive signal via the OR circuit 386 to the reset BC line to reset the Byte Counter 803 to a count of 0 causing a positive signal to be produced on the BC 0 line. At TP6B time, a positive pulse is applied to reset the reset BC latch 306. The selected "TO" device receives the write poll control word, detects that it is a control word and that a write operation is to be performed. Accordingly, the selected "TO" device is maintained in the receive mode and awaits the "FROM" device message to be transferred from the control unit to the now selected "TO" device.

SEQUENCE 5 OPERATION

In the sequence 5 operation, the control unit cycles the message buffer 600, one word at a time, to the shift register where the word is serially shifted to the selected "TO" device as successive 13 bit data words. This is accomplished by inserting a 1 bit in the busy bit position of the shift register, inserting a 0 bit in the second stage of the shift register to designate the word as a data word rather than a control word and inserting the balance of the word from the message buffer into stages 3–11 of the shift register. As the shift register 522 is shifted one position, a 1 bit is entered into the 11th stage of the shift register which will subsequently be used to detect the fact that the 11 bits of the data word has been transferred to the selected "TO" device, i.e., when the 1 bit which is inserted into the 11th stage during the first shift is shifted to the first stage after 10 more shifts of the shift register and all other stages of the shift register contain 0 bits, it indicates that all bits of the data word have been transferred to the selected "TO" device and that the shift register is effectively empty. The parity flip-flop 534 keeps track of the number of 1's shifted out of the 1st stage of the shift register 522 in a similar manner to that described with respect to the sequence 1 operation. Accordingly, at the proper time in the BC 2 cycle of sequence 5, a parity bit is transmitted from the control unit to the selected "TO" device. The transmission of a 13 bit data word from the control unit message buffer to the selected "TO" device is similar to that of the transmission of the control word previously described in detail with respect to the sequence 1 operation. Accordingly, no detailed description is believed necessary for this transmission and reference may be made to the timing diagram in FIG. 7 which illustrates the signals and their timing relationship for this data word transmission.

An additional operation which occurs during this sequence is to cause each successive data word that is transmitted to the selected "TO" device to be reloaded back into the control unit message buffer so that a copy of the "FROM" device message is maintained in the control unit message buffer. Thus, for example, while the parity bit of the 1st data word is being transferred from the control unit to the selected "TO" device, a copy of the 1st data word is still maintained at the output of the message buffer 600 and the following sequence of operation occurs.

Figure 7C:
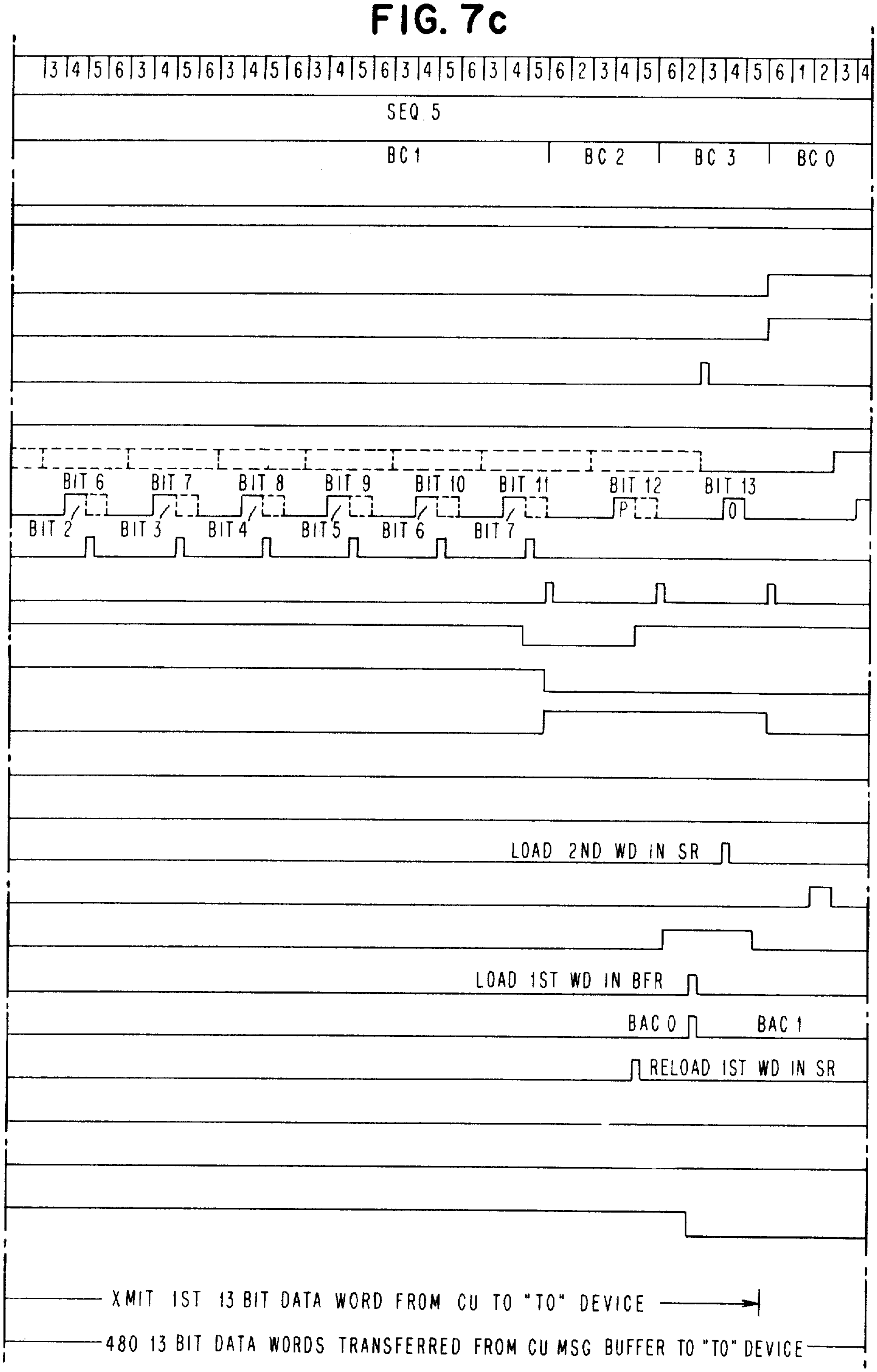

Referring to the gate control circuits in FIG. 4*f* and the timing diagram of FIG. 7*c*, positive signals applied to the SEQ 5 and BC 2 lines condition the AND circuit 456. At TP5A time, a positive pulse is passed via the now conditioned AND circuit 456 and the OR circuits 460 and 462 to render the AND circuits 486 enabled to pass the 1st data word, present at the output of the message buffer 600, to again be set into the shift register 522. Referring now to the Timing Control circuit 343 in FIG. 4*a*, all of the conditions necessary to render AND circuit 353 effective are present so that, at TP6A time, a positive pulse is passed via this AND circuit and the OR circuit 356 to the AND circuit 358 which is conditioned by the not output line of the reset BC latch 306. Therefore, the positive pulse passes via the conditioned AND circuit 358 to the step BC line causing the Byte Counter 308 to step to a count of 3 producing a positive signal on the BC 3 line. Referring now to AND circuits 331, 332 and 400, none of the conditions necessary to render these AND circuits effective are present, thereby causing negative signals to be effectively applied to the inverters 390 and 392 which are inverted to positive signals and together with the positive signal on the XMIT MODE line renders the AND circuits 394 effective to apply a positive signal via the OR circuit 398 to the start clock at 2 line to cause the clock 316 to next cycle at TP2A time. Referring now to the Timing and Control circuit 429 in FIG. 4*c*, positive signals are applied via the SEQ 5 and BC 3 lines to condition the AND circuit 430. At TP6B time, a positive pulse is passed via the now conditioned AND circuit 430 and the OR circuit 434 to turn on the memory cycle latch 436 which, in being turned on, conditions the AND circuits 438, 440, 442 and 444. At TP2B time, a positive pulse is passed via the now conditioned AND circuit 438 to the shift input line of the message buffer 600 and to the AND circuit 562. The positive pulse on the shift input line causes the 1st data word now stored in the shift register 522 to be shifted back into the message buffer 600 and makes the 2nd data word available at the output thereof. Since the Buffer Address Counter 564 is standing at a count of 0, the Buffer Address Decoder 566 detects this condition and applies a negative signal via the BAC 479 line to the inverter 560 where it is inverted to a positive signal to condition the AND circuit 562 to pass the positive pulse from the AND circuit 438 to the step counter line to step the Buffer Address Counter 564 to a count of 1. This condition is detected by the Buffer Address Decoder which applies a positive signal via the BAC 1 line to reset the BAC 0 latch 594. At TP3A time, a positive pulse is passed via the AND circuit 440 and the OR circuit 452 to the clear input of the shift register 522 to clear the 1st data word out of the shift register 522. At TP4A time, a positive pulse is passed via the AND circuit 442 and the OR circuit 462 to render the AND circuits 486 effective to pass the 2nd data word present at the output of the message buffer 600 via the data bus 601 into the shift register 522. At TP5A time, a positive pulse is passed via the AND circuit 444 to the AND circuit 588 which is conditioned or not in accordance with the parity check made on the 2nd data word now stored in the shift register 522. If an error is detected, a positive signal is passed via the OR circuit 592 to the parity error line. At TP5B time, a positive pulse is applied to reset the memory cycle latch 436.

Referring now to the Timing Control circuit 343 in FIG. 4*a*, at TP6A time, a positive pulse is applied to the AND circuit 353, which is presently conditioned to pass the pulse via the OR circuit 356 to the AND circuit 358 which is conditioned by the not output line of the reset BC latch 306. Accordingly, the positive pulse passes via the AND circuit 358 to the step BC line to step the Byte Counter 308 from a count of 3 to a count of 0 causing a positive signal to be produced on the BC 0 line. The positive signal on the BC 0 line together with the positive signal on the XMIT MODE line render the AND circuit 331 effective to apply a positive signal via the OR circuit 334 to the start clock at 1 line to cause the clock 315 to next cycle at TP1A time. Referring now to the gating circuit in FIG. 4*g*, positive signals on the XMIT MODE and BC 0 lines also render AND circuit 474 effective to apply a positive signal via the OR circuit 476 to the 11th stage of the shift register 522 conditioning it to insert a 1 bit upon the occurrence of a shift pulse. Referring now to the Timing and Control circuit 429 in FIG. 4*c*, a positive signal on the SEQ 5 line is applied to the inverter 449 where it is inverted to a negative signal to decondition the AND circuit 450 and thereby block the positive pulse on the TP1A line from being passed to the OR circuit 452 and the clear input line of the shift register 522. Therefore, the 2nd data word remains in the shift register 522 in preparation for transmission to the selected "TO" device. Referring now to AND circuit 484 in FIG. 4*g*, positive signals on the SEQ 5 and BC 0 lines condition this AND circuit so that, at TP2 time, a positive pulse is passed via the now conditioned AND circuit 484 to reset the 2nd stage of the shift register 522 and via the OR circuit 507 to turn on the 1st stage of the shift register 522. Accordingly, a 1 bit set into the 1st stage provides a busy bit indication and the 0 bit set into the 2nd stage provides an indication that this is a data word and the remaining stages of the shift register 522 remain unaltered. The first 11 bits of the 12 bit data word is now ready for transmission to the selected "TO" device. The Byte Counter 308 will be successively stepped to a count of 1 then 2 and then 3 to complete the transfer of the data word to the selected "TO" device. During the transmission of the parity bit for the 2nd data word, the 2nd word still present at the output of the message buffer 600, is reloaded into the shift register 522 and then shifted back into the message buffer while the 3rd data word is made available at the output thereof. In a similar fashion, each successive data word read out of the message buffer 600 is loaded into the shift register 522 and a busy bit and data word bit identifier is loaded into the first and second stages of the shift register 522 prior to its transmission to the selecated "TO" device. The data word is then transmitted to the selected "TO" device after which the word is reloaded into the shift register from the output of the message buffer 600 and then shifted back into the message buffer making the next successive word available at the output thereof.

Figure 7D:
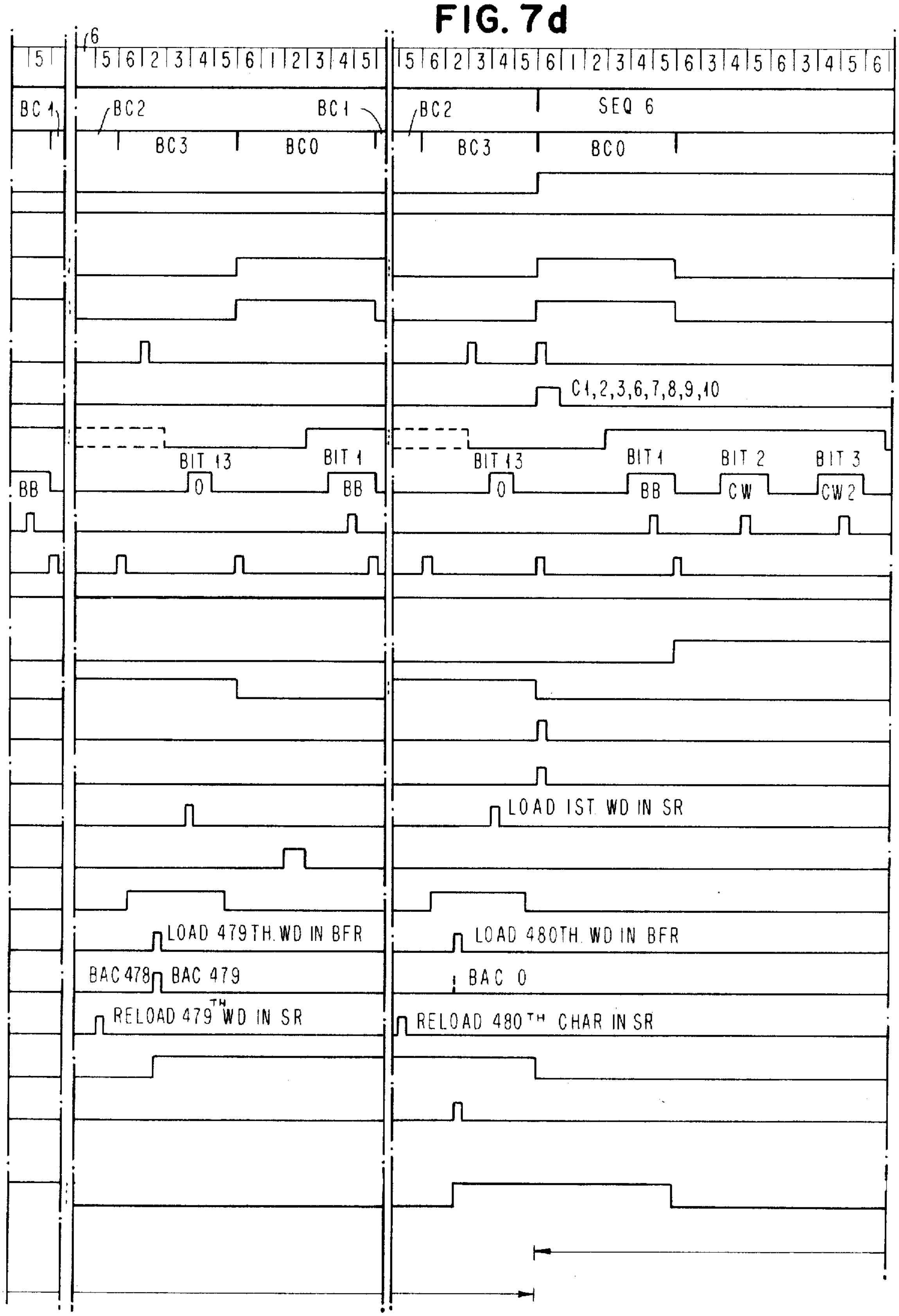
Figure 7E:
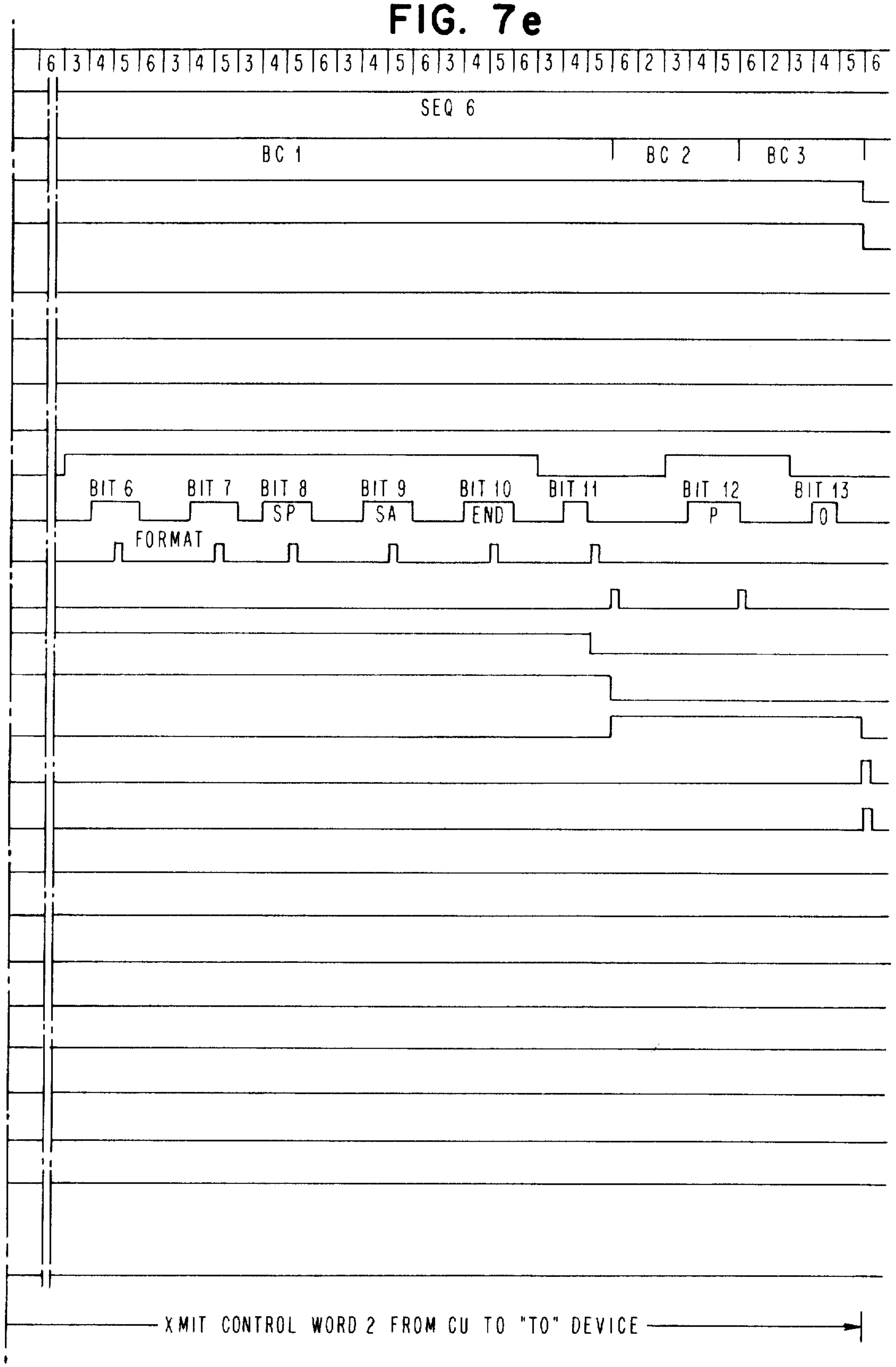

After the 479th word is reloaded into the message buffer 600, the Buffer Address Counter 564 is stepped to a count of 479 as shown in the timing diagram of FIG. 7*d*. This condition is detected by the Buffer Address Decoder 566 to produce a positive signal on the BAC 479 line which is applied to turn on the Proceed latch 372 in FIG. 4*a*. At TP4A time, the 480th word is loaded into the shift register 522 and the appropriate busy bit and data word bit are inserted into the 1st and 2nd stages of the shift register 522 in the manner as previously explained. Following this, the 480th word is serially transferred from the control unit to the selected "TO" device after which the 480th character is again loaded from the message buffer into the shift register 522. A last memory cycle is taken during which the 480th data word is shifted back into the message buffer and the shift pulse is also effective via AND circuit 568 and OR circuit 558 to reset the Buffer Address Counter 564 to a count of 0 and to turn on the BAC 0 latch 594. Referring now to the Timing Control circuit 343 in FIG. 4a, positive signals from the Proceed latch 372 and the BAC 0 latch 594 together with the positive signal on the SEQ 5 line render the AND circuit 374 effective to apply a positive signal via the OR circuit 382 to condition the AND circuit 384. At TP6A time, a positive pulse is passed via the now conditioned AND circuit 384 to the STEP SEQ CTR line to step the sequence counter 314 from a count of 5 to a count of 6 causing a positive signal to be applied to the SEQ 6 line. The positive pulse output of the AND circuit 384 is also applied via the OR circuit 304 to turn on the reset BC latch 306 which, in turn, applies a positive signal via the OR circuit 386 to the reset BC line causing the Byte Counter 308 to be reset to a count of 0 therby producing a positive signal on the BC 0 line. At TP6B time, a positive pulse is applied to reset the reset BC latch 306.

SEQUENCE 6 OPERATION

In the sequence 6 operation, the control unit creates a 13 bit control word which is transferred form the control unit to the selected "TO" device. The control word is constructed in accordance with the contents of the CCC and if transmitted to a printer device it may designate the format of the printout, i.e., a 40 character print line, a 60 character print line or an 80 character print line and initiate the printout operation at the selected "TO" device to indicate that the buffer transfer has been completed. On the other hand, if the control word is being transmitted to a display device which contains an audible alarm, then the control word may be used to initiate the operation of the alarm to signal the operator that the buffer transfer has been completed.

SEQ 6/BC 0

Referring now to FIG. 4*j* and the timing diagram of FIG. 7*d*, a positive signal on the SEQ 6 line is passed via the OR circuit 409 to the XMIT POLL line and via the OR circuit 406 to the XMIT MODE line. Referring now to the Timing Control circuit 343 in FIG. 4*a*, positive signals on the XMIT MODE and BC 0 lines render AND circuit 331 effective to apply a positive signal via the OR circuit 334 to the start clock at 1 line to cause the clock 316 to next cycle at TP1A time. Referring now to the Timing and Control circuit 429 in FIG. 4c, positive signals on the XMIT MODE and BC 0 lines are applied to the AND circuit 450 while a negative signal on the SEQ 5 line is inverted by the inverter 449 to a positive signal to condition the AND circuit 450 so that, at TP1A time, a positive pulse is passed via the conditioned AND circuit 450 and the OR circuit 452 to the clear input line of the shift register 522 to clear the contents there of the data word presently stored therein. Referring now to FIG. 4*f*, a positive signal on the BC 0 line conditions the AND circuit 454 so that at TP1 time a positive pulse is passed by the conditioned AND circuit to the AND circuits 490, 492, 498, 500, 502 and 504. AND circuit 490 is presently conditioned by a positive signal on the XMIT POLL line to permit the pulse to pass via this AND circuit and the OR circuits 506 and 507 to turn on the 1st and 2nd stages of the shift register 522 causing a 1 bit to be set into the 1st stage, indicating the presence of a busy bit and a 1 bit to be set into the 2nd stage indicating the presence of a control word. AND circuit 492 is presently conditioned by a positive signal on the SEQ 6 line to permit the positive pulse to pass therethrough and via the respective OR circuits 508 and 520 to turn on the 3rd and 10th stages, respectively, of the shift register 522 causing a 1 bit to be set into the 3rd stage, indicating the presence of control word 2, and a 1 bit to be set into the 10th stage indicating an end operation. The positive signal on the SEQ 6 line is also applied to one input of each of the AND circuits 498, 500, 502 and 504 and the remaining inputs of each of these AND circuits are conditioned or not in accordance with the contents of positions 3, 4, 5 and 6 of the CCC in the CCC register 342 to pass or not the positive pulse from the AND circuit 454. Thus, assuming that 1 bits are present in each of these positions of the CCC register 342 indicating that the format of the printout is to be 80 character lines, that printer operation is to be initated and that an audible alarm is to be sounded. Positive signals from each of these positions of the CCC register 342 together with the positive signal on the SEQ 6 line conditions these AND circuits to pass the positive pulse from the AND circuit 454 and via the respective OR circuits 512, 514, 516 and 518 to turn on the 6th, 7th, 8th and 9th stages of the shift register 522 thereby inserting 1 bits and completing the creation of the control word to be transmitted to the selected "TO" device which, in this example, would be a printer device. The transmission of this control word from the control unit to the selected "TO" device is similar to that described in connection with the sequence 1 operation and therefore reference may be made to that description together with the timing diagrams shown in FIGS. 7d and 7e for the details of the transmission. Referring now to the Timing Control circuit 343 in FIGS. 4*a* and 4*b*, and during the byte count 3 time of this sequence, positive signals are applied to the XMIT POLL and BC 3 lines to render the AND circuit 378 effective to apply a positive signal via the OR circuit 382 to condition the AND circuit 384. At TP6A time, a positive pulse is passed via the now conditioned AND circuit 384 and the OR circuit 304 to turn on the reset BC latch 306 which, in being turned on, applies a positive signal via the OR circuit 386 to the reset BC line causing the Byte Counter 308 to be reset to a count of 0 producing a positive signal on the BC 0 line. The positive pulse from the AND circuit 384 is also applied to the AND circuit 388 which is presently conditioned by a positive signal on the SEQ 6 line. Accordingly, the positive pulse passes via the conditioned AND circuit 388 and the OR circuit 310 to the RESET SEQ CTR line to reset the sequence counter 314 to a count of 0 producing a positive signal on the SEQ 0 line which, in turn, is applied back to the data processor to indicate the completion of this operation. The positive pulse output of the AND circuit 388 is also used to reset various registers and latches in the control unit, namely, I/0 register 328, CCC register 342, Address Register 302, CCC Reg Loaded latch 346, Copy Command latch 324 and the Buffer Valid latch 598.

While the invention has been particularly shown and described with reference to a preferred embodiment thereof, it will be understood by those skilled in the art that various changes in form and detail may be made therein without departing from the spirit and scope of the invention.

What is claimed is:

1. In a data processing system comprising a data processor and a terminal control unit having a plurality of attached terminal devices with said data processor transmitting a control message to said terminal control unit directing that a data word message be transferred between designated terminal devices including a word selection designation designating which words of the data word message are to be selected for transfer and said terminal control unit being responsive to said control message for controlling the selective transfer of said data word message between the designated terminal devices without further accessing said data processor, said terminal control unit comprising:

means for receiving the control message from said data processor, means responsive to said control message receiving means for producing a first address signal for addressing a first one of said plurality of terminal devices, first signalling means for signalling said first terminal device to transfer a data word message to said terminal control unit, said data word message being formatted into fields of data words with the beginning of a field being identified by a field control word followed by associated data words up to but not including the next field control word, the field control word defining the field characteristics for all the data words contained in the field including identification of the field as being protected from operator modification or unprotected and available for operator modification, storage means for storing the data word message received from said first terminal device, means responsive to said control message receiving means for producing a transfer control signal indicating which words of the data word message are to be selected for transfer from the storage means of said terminal control unit, means for cyclically examining the data word message stored in said storage means a word at a time, said examining means being effective to produce a first signal when the word under examination is a field control word, a second signal when the word under examination is a data word and being further effective when the word under examination is a field control word to produce a third signal when the field of data words following the field control word is a protected field and a fourth signal when the field of data words following the field control word is an unprotected field, modifier means responsive to the signals produced by said examining means and said transfer control signal for selectively modifying the data words of each field, means responsive to said control message receiving means for producing a second address signal for addressing a second one of said plurality of terminal devices, second signalling means for signalling said second terminal device that a data word message is to be transferred from said terminal control unit, and means for transferring the data word message from the storage means of said terminal control unit to said second terminal device.

2. In a data processing system including a terminal control unit as in claim 1 wherein said first terminal device is a display device and said second terminal device is a printer device.

3. In a data processing system including a terminal control unit as in claim 1 wherein said first terminal device is a display device and said second terminal device is another display device.

4. In a data processing system including a terminal control unit as in claim 1 wherein said first terminal device is a printer device and said second terminal device is a display device.

5. In a data processing system including a terminal control unit as in claim 2 wherein said data processor control message further includes a printer control designation designating the print format of the data words to be printed by said printer terminal device, said terminal control unit further including:

means responsive to said control message receiving means and effective after said data word message has been transferred to said printer terminal device for producing a printer control word which includes the printer control designation of said control message, and means for transmitting said printer control word to said printer terminal device.

6. In a data processing system including a terminal control unit as in claim 2 wherein said data processor control message further includes a designation designating the print format of the data words to be printed by said printer terminal device and that the print operation is to be started, said terminal control unit further including:

means responsive to said control message receiving means and effective after said data word message has been transferred to said printer terminal device for producing a printer control word which includes the printer control designation of said control message, and means for transmitting said printer control word to said printer terminal device.

7. In a data processing system including a terminal control unit as in claim 3 wherein said data processor control message further includes a control designation designating that an audible alarm is to be sounded in said second terminal display device, said terminal control unit further including:

means responsive to said control message receiving means and effective after said data word message has been transferred to said second terminal display device for producing a control word which includes the control designation of said control message, and means for transmitting said control word to said second terminal display device.

8. In a data processing system including a terminal control unit as in claim 1, said terminal control unit further including:

means responsive to the signals produced by said examining means when the first word of the message is being examined for producing a signal indicating that the message is a protected message, and means responsive to said signal indicating a protected message for preventing the message from being transferred from the storage means of said terminal control unit.

9. In a data processing system including a terminal control unit as in claim 1 wherein said transfer control signal producing means produces a transfer control signal indicating that only field control words are to be transferred from the storage means of said terminal control unit, said modifier means further including circuit means responsive to said transfer control signal and said signals produced by said examining means when a field control word is under examination for producing a field modify signal indicating that the field of data words following the field control word under examination is to be modified, and means responsive to said field modify signal and to each succeeding said second signal produced by said examining means indicating the presence of succeeding data words of the field for modifying said succeeding data words to null words.

10. In a data processing system including a terminal control unit as in claim 1 wherein said transfer control signal producing means produces a transfer control signal indicating that only field control words are to be transferred from the storage means of said terminal control unit, said modifier means further including circuit means responsive to said transfer control signal and said first and fourth signals produced by said examining means when a field control word is under examination for producing a field modify signal indicating that the unprotected field of data words following the field control word under examination is to be modified, and means responsive to said field modify signal and to each succeeding said second signal produced by said examining means indicating the presence of succeeding data words of the unprotected field for modifying said succeeding data words to null words.

11. In a data processing system including a terminal control unit as in claim 1 wherein said transfer control signal producing means produces a transfer control signal indicating that only field control words are to be transferred from the storage means of said terminal control unit, said modifier means further including circuit means responsive to said transfer control signal and said first and third signals produced by said examining means when a field control word is under examination for selectively producing a field modify signal indicating that the protected field of data words following the field control word under examination is to be modified, and means responsive to said field modify signal and to each succeeding said second signal produced by said examining means indicating the presence of succeeding data words of the protected field for modifying said succeeding data words to null words.

12. In a data processing system including a terminal control unit as in claim 1 wherein said transfer control signal producing means produces a transfer control signal indicating that only field control words and protected fields of data words are to be transferred from the storage means of said terminal control unit, said modifier means further including circuit means responsive to said transfer control signal and said first and fourth signals produced by said examining means when a field control word is under examination for producing a field modify signal indicating that the unprotected field of data words following the field control word under examination is to be modified, and means responsive to said field modify signal and to each succeeding said second signal produced by said examining means indicating the presence of succeeding data words of the unprotected field for modifying said succeeding data words to null words.

13. In a data processing system including a terminal control unit as in claim 12 wherein said circuit means further includes means responsive to said third signal produced by said examining means indicating that the field of data words following the field control word under examination is a protected field for inhibiting said circuit means from producing said field modify signal so that the field of protected data words following the field control word under examination will remain unmodified during examination.

14. In a data processing system including a terminal control unit as in claim 1 wherein said transfer control signal producing means produces a transfer control signal indicating that only field control words and unprotected fields of data words are to be transferred from the storage means of said terminal control unit, said modified means further including circuit means responsive to said transfer control signal and said first and third signals produced by said examining means when a field control word is under examination for producing a field modify signal indicating that the protected field of data words following the field control word under examination is to be modified, and means responsive to said field modify signal and to each succeeding said second signal produced by said examining means indicating the presence of succeeding data words of the protected field for modifying said succeeding data words to null words.

15. In a data processing system including a terminal control unit as in claim 14 wherein said circuit means further includes means responsive to said fourth signal produced by said examining means indicating that the field of data words following the field control word under examination is an unprotected field for inhibiting said circuit means from producing said field modify signal so that the field of unprotected data words following the field control word under examination will remain unmodified during examination.

16. In a data processing system comprising a data processor and a terminal control unit having a plurality of attached terminal devices and a storage means with said data processor transmitting a control message to said terminal control unit directing that a data word message be transferred between designated terminal devices including a designation as to which words of the data word message are to be selected for transfer, the method by which said terminal control unit responds to said control message for controlling the selective transfer of said data word message from a first designated one of said plurality of attached terminal devices to a second designated one of said plurality of attached terminal devices without further accessing said data processor comprising the steps of:

receiving and storing the control message from said data processor, transmitting a control word in accordance with said stored control message from said terminal control unit to signal said first designated terminal device to transmit a data word message to said terminal control unit, said data word message being formatted into fields of data words with the beginning of a field being identified by a field control word followed by associated data words up to but not including the next field control word, the field control word defining the field characteristics for all the data words contained in the field including identification of the field as being protected from operator modification or unprotected and available for operator modification, receiving and storing said data word message in the storage means of said terminal control unit, recycling said data word message in said storage means, examining each word as said data word message is recycled and providing and indication as to whether the word under examination is a field control word or a data word and if a field control word is under examination providing another indication as to whether the field of data words following the field control word is a protected field or an unprotected field, providing a transfer control signal indication in accordance with said control message designation indicating which words of the data word message are to be selected for transfer from the storage means of said terminal control unit, selectively producing a field modify signal in accordance with the field control word indication of the protected or unprotected characteristic of the field and said transfer control signal indication of which words of said data word message are to be selected for transfer, modifying each data word of a field to a null word when a field modify signal is present and said examining indication indicates that a data word is under examination, transmitting a control word in accordance with said control message from said terminal control unit to signal said second designated terminal device that a data word message is to be transmitted from said terminal control unit, and transmitting said data word message from the storage means of said terminal control unit to said second designated terminal device.

* * * * *